(12) United States Patent
Meyer et al.

(10) Patent No.: US 6,915,271 B1
(45) Date of Patent: Jul. 5, 2005

(54) METHOD AND SYSTEM FOR DELIVERING REDEEMING DYNAMICALLY AND ADAPTIVELY CHARACTERIZED PROMOTIONAL INCENTIVES ON A COMPUTER NETWORK

(75) Inventors: Carl Meyer, Saratoga, CA (US); Anthony N. Hoeber, Saratoga, CA (US); Erik A. Kay, Los Altos, CA (US); Stephen W. Bartlett, Los Altos, CA (US)

(73) Assignee: The Product Engine, Inc., Saratoga, CA (US)

( * ) Notice: Subject to any disclaimer, the term of this patent is extended or adjusted under 35 U.S.C. 154(b) by 849 days.

(21) Appl. No.: 09/263,166

(22) Filed: Mar. 5, 1999

Related U.S. Application Data

(60) Provisional application No. 60/077,630, filed on Mar. 11, 1998.

(51) Int. Cl.[7] .............................................. G06F 17/60
(52) U.S. Cl. ....................................................... 705/14
(58) Field of Search ............................................ 705/14

(56) References Cited

U.S. PATENT DOCUMENTS

| | | | |
|---|---|---|---|
| 4,723,212 A | 2/1988 | Mindrum et al. | 705/14 |
| 4,791,281 A | 12/1988 | Johnson et al. | 705/14 |
| 4,882,675 A | 11/1989 | Nichtberger et al. | 705/14 |
| 5,056,019 A | 10/1991 | Schultz et al. | 705/14 |
| 5,093,718 A | 3/1992 | Hoarty et al. | 725/120 |
| 5,173,851 A | 12/1992 | Off et al. | 705/14 |
| 5,220,420 A | 6/1993 | Hoarty et al. | 725/119 |
| 5,287,181 A | 2/1994 | Holman | 348/473 |
| 5,319,455 A | 6/1994 | Hoarty et al. | 725/34 |
| 5,446,919 A | 8/1995 | Wilkins | 725/35 |
| 5,459,306 A | 10/1995 | Stein et al. | 235/383 |
| 5,502,636 A | 3/1996 | Clarke | 705/10 |
| 5,557,721 A | 9/1996 | Fite et al. | 705/14 |
| 5,606,602 A * | 2/1997 | Johnson et al. | 379/115 |
| 5,621,812 A | 4/1997 | Deaton et al. | 382/100 |
| 5,675,662 A | 10/1997 | Deaton et al. | 382/137 |
| 5,710,886 A | 1/1998 | Christensen et al. | 705/14 |
| 5,715,314 A | 2/1998 | Payne et al. | 382/254 |
| 5,761,648 A | 6/1998 | Golden et al. | 705/14 |
| 5,774,869 A | 6/1998 | Toader | 705/10 |
| 5,774,870 A | 6/1998 | Storey | 705/14 |
| 5,794,210 A | 8/1998 | Goldhaber et al. | 705/14 |
| 5,806,045 A | 9/1998 | Biorge et al. | 705/14 |
| 5,855,008 A | 12/1998 | Goldhaber et al. | 705/14 |
| 5,907,830 A | 5/1999 | Engel et al. | 705/14 |

FOREIGN PATENT DOCUMENTS

| | | | |
|---|---|---|---|
| EP | 0679980 A | 11/1996 | |
| EP | 0809202 A | 11/1997 | ........... G06F/17/16 |
| EP | 0822535 | 2/1998 | |
| WO | WO 95/21428 | 8/1995 | |
| WO | WO 9639668 | 12/1996 | |
| WO | WO 97/23838 | 7/1997 | |
| WO | WO 98/19224 | 5/1998 | |

OTHER PUBLICATIONS

"Emaginet", fifteen pages copied on Feb. 16, 1998 from http://www.emaginet.com.*

"E-centives", nine pages copied on Feb. 16, 1998 from http://www.e-centives.com, and three pages copied from http://www.emaginet.com.*

* cited by examiner

Primary Examiner—Donald L. Champagne
(74) Attorney, Agent, or Firm—Dov Rosenfeld; Inventek

(57) ABSTRACT

This invention relates to a system and method for defining, electronically distributing, dynamically displaying to a consumer, redeeming and clearing promotional incentives over a network. One or more parameters of the incentives may be dynamically determined by being dependent on one or more characteristics of the consumer including the location on the network where the incentive is being viewed.

84 Claims, 21 Drawing Sheets

```
// View_Icon executes in process ICON_DSPLY, which is started on
// consumer computer when consumer turns to a page with an icon
BEGIN
access SRVPRVD to get incentive icon info from INCENT-DB;
IF (icon depends on member ID) {
        get member ID from cookie;
        IF (member ID not valid) {
                set icon to default icon;
        } ELSE {
                access ACCTPRVD to get member info from MMBR-DB;
                Get_Incentive_For_Member;
                set icon to dynamically computed icon based on member info;
        }
} ELSE {
        set icon to default icon;
}
display icon;
access SRVPRVD to record view icon event in INCENT-DB: incentive ID, date;
    URL, time, plus member ID if present;
END;
```

Fig. 4    401

```
// View_Incentive on consumer computer when consumer clicks incentive icon
BEGIN
Access SRVPRVD to get incentive template from INCENT-DB;
IF (no incentive display requirements exist) {
        IF (incentive display uses no consumer info) {
                use default incentive characteristics;
        } ELSE { /* use consumer info based characterization */ {
                get member ID from cookie;
                IF (member ID is not valid) /* no cookie present */ {
                        use default incentive characteristics;
                } ELSE {
                        access ACCTPRVD to get member info from MMBR-DB;
                        IF (incentive chars requires missing member info) {
                                use default incentive characteristics;
                        } ELSE {
                                compute incentive characteristics;
                        }
                }
        }
}
```

```
} ELSE */ display requirements */ {
    Get_Member_ID;
    IF (incentive display requires missing member info) {
        Get_Required_Member_Info;
        IF (required member info still missing) {
            IF (missing member info hard requirement) {
                display "Unable to see incentive" message;
                EXIT;
            } ELSE {
                use default incentive characteristics;
            }
        }
    }
    compute incentive characteristics;
}
display incentive;
access SRVPRVD to record view event in INCENT-DB: incentive ID, value, exp.
    date; URL, time, plus member ID if present;
END;
```

Fig. 5B     502

// Clip_Incentive executes in process DSPLY, which is started on
// consumer computer when consumer clicks to clip an incentive

BEGIN

Get_Member_ID;

If (all required member info is not present) {
    Get_Required_Member_Info;
    IF (all required member info is not present) {
        IF (missing member info hard requirement) {
            display "Unable to clip incentive" message;
            EXIT;
        }
    }
} access ACCTPRVD to save incentive in ACCNT-DB;

access SRVPRVD to record clip in INCENT-DB: incentive ID, value, exp. date; URL, time, member ID;

END;

Fig. 6

```
// Get_Member_ID executes in consumer computer as part of process
// DSPLY
BEGIN
get member ID from cookie;
IF (member ID valid) {
        access ACCTPRVD to get member info from MMBR-DB;
} ELSE {
    Sign_On;
    get member ID from cookie;
    IF (member ID valid) {
            access ACCTPRVD to get member info from MMBR-DB;
    } ELSE {
            display error message to consumer;
    }
}
END;
```

Fig. 7      701

```
// Sign_On
BEGIN
pop-up sign-up screen on consumer computer;
get required account info from consumer; including account name and password;
IF (consumer is not a member) {
        in new pop-up request necessary account info from member;
        create new account for consumer;
}
access ACCTPRVD to get member ID from MMBR-DB;
write member ID to cookie;
END;
```

Fig. 8      801

```
// Get_Required_Member_Info
BEGIN
ask member for required info;
for each piece of info requiring external validation
        Validate_External_Member_Info;
END;
```

Fig. 9    901

```
// Validate_External_Member_Info
BEGIN
access SRVPRVD to get external validation process for external member info
    from INCENT-DB;
access external validation process to validate external member info and get
    expiration date;
IF (external member info valid) {
        access ACCTPRVD to store external member info and expiration date in
            MMBR-DB;
}
END;
```

Fig. 10    1001

```
// View_Account starts on consumer computer when consumer clicks
// View Account button;
BEGIN
Get_Member_ID;
IF (member ID not valid) {
        display "Unable to view account" message;
        EXIT;
} ELSE {
        access ACCTPRVD to get contents of member account from ACCNT-DB;
        display member account info;
        access ACCTPRVD to record view in ACCNT-DB: incentive ID, URL,
            time;
}
END;
```

Fig. 11

```
// View_Member_Account_Page starts on a consumer computer when the
// consumer turns to the "view account" page of service provider Web site
BEGIN
access ACCTPRVD to record in ACCNT-DB the URL the member came from;
END;
```

Fig. 12

```
// Buy_Now executes on a consumer computer when consumer clicks
// on the "Buy Now" button
BEGIN
get member ID from cookie
IF ((member ID not valid) OR (incentive not clipped)) {
        Clip_Incentive;
}
display network location for purchasing product;
END;
```

Fig. 13      1301

```
// Adjust_Goods_&_Services_Order is called by the merchant server at the
// time of sale (before final confirmation) and executes in process SRVPRVD
BEGIN
get member ID from merchant-placed cookie;
IF (member ID valid) {
        access ACCTPRVD to get member's clipped incentives;
        match clipped incentives with goods and services order;
        for each match, compute adjusted price based on incentive;
}
END;
```

Fig. 14      1401

```
// Record_Redemption
// called by the merchant server when a sale is done
BEGIN
for each redeemed incentive access SRVCPRVD to record redeem: member ID,
    time, URL
END;
```

Fig. 15      1501

```
// Get_Incentive_For_Member is called from View_Icon;
BEGIN
        Execute the dynamic incentive selection algorithm to set incentive to a
            specific incentive based on member info;
END;
```

```
// Close_Incentive
// consumer clicks "Close" button or attempts to close wndow without
// other action(s)
BEGIN
        take down incentive;
        IF (incentive is further negotiable) {
                Display "I'll negotiate" message asking consumer if they want to
                    negotiate.
                IF (consumer wants to negotiate) {
                    Negotiate;
                }
        }
END;
```

```
// Negotiate
// called when consumer clicks "Negotiate" button
// also called from Close_Incentive;
// also called recursively
BEGIN
        IF (incentive is further negotiable) {
                Modify incentive characteristics based on incentive negotiation
                    formula;
                Display new incentive;
        } ELSE {
                Display "Not further negotiable" message;
        }
END;
```

Fig. 18      1801

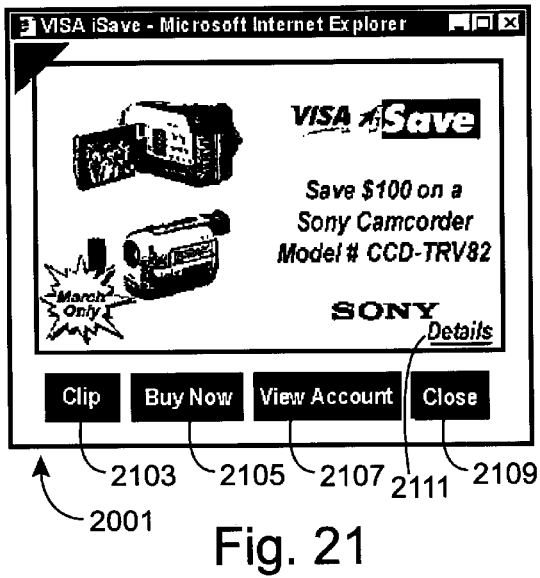
Fig. 21
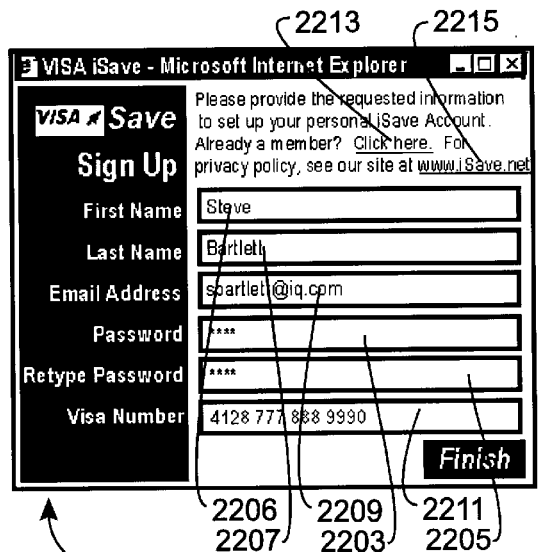
Fig. 22
Fig. 23
Fig. 24

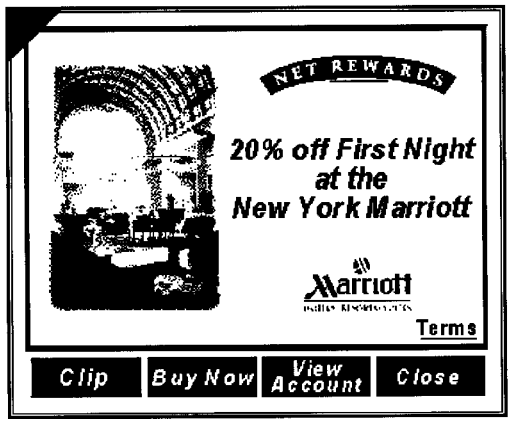
Fig. 25   2501
Fig. 26   2601
Fig. 27   2701
2801   Fig. 28   2803
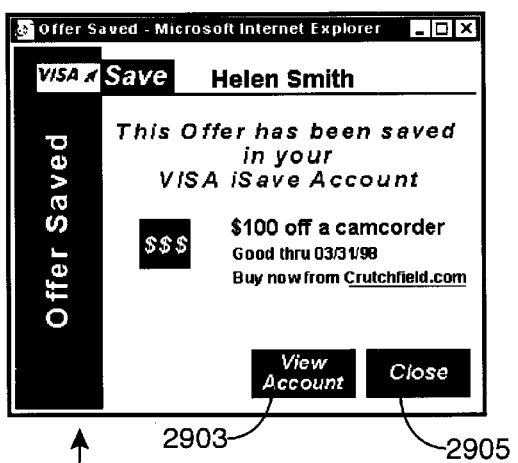
2901   Fig. 29   2903   2905
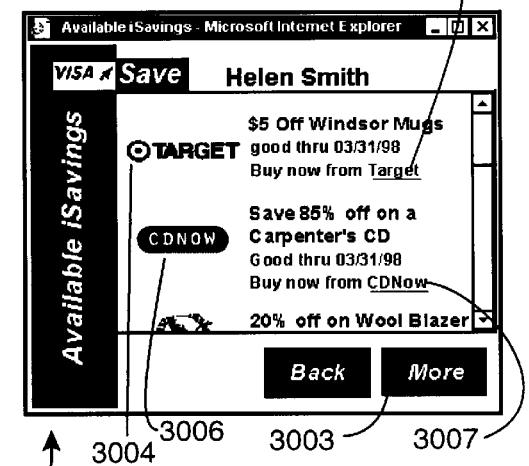
3001   3004 3006   Fig. 30   3003   3005   3007

METHOD AND SYSTEM FOR DELIVERING REDEEMING DYNAMICALLY AND ADAPTIVELY CHARACTERIZED PROMOTIONAL INCENTIVES ON A COMPUTER NETWORK

CROSS-REFERENCE TO RELATED APPLICATION

This application claims the benefit of U.S. Provisional Patent Application Ser. No.: 60/077,630, filed Mar. 11, 1998, to inventors Meyer, Hoeber, Kay, and Bartlett, entitled METHOD AND SYSTEM FOR DELIVERING AND REDEEMING DYNAMICALLY AND ADAPTIVELY CHARACTERIZED PROMOTIONAL INCENTIVES ON A COMPUTER NETWORK (Hereinafter the "Original Description".)

BACKGROUND OF THE INVENTION

1. Field of the Invention

This invention relates to the electronic distribution, redemption and clearing of promotional incentives. More particularly, this invention relates to a method and system for defining, electronically distributing, dynamically displaying to a consumer, redeeming and clearing promotional incentives whose characteristics are adaptively obtained as a function of demographics, behavior history, and other characteristics of the viewing consumer and other such properties.

2. Background Discussion

It is common practice for businesses to provide incentives to consumers to buy products or services or to provide incentive for particular consumer behavior by offering promotions such as discounts, coupons, prizes, etc. Common examples of incentives are discount coupons that consumers can present to claim the discount when they purchase products or services.

Businesses are very concerned with using their promotion budget efficiently. They want to discount products at specific times, to specific consumers in such a way as to maximize the profit when the cost of the promotion and its effect on sales is taken into account. The optimal discount incentive, for example, is the smallest discount that will successfully motivate the consumer to purchase.

The optimal incentive, for example, the optimal discount, is a function of several factors:

Inventory factors may include: the demand for the product which may vary even on a daily basis, for example in the hospitality industry; the cost of carrying the product; the remaining life of the product before it is superseded or upgraded; and so on.

Financial factors include preferred timing for selling the product. For example, in some industries a company is more motivated to make a sale at certain points in the week, the month, the quarter or the year.

Consumer factors include demographic characteristics, stated consumer interest, and past purchasing behavior. A company, for example, may want to provide a more valuable incentive to one type of potential customer (e.g., wealthier, more stable, more loyal, etc.)

In addition, the optimal incentive system needs to be flexible, for example to enable several entities to be involved, and for any particular incentive to have one or more characteristics depend on the characteristics of one or more of these entities.

Alternate Approaches

Alternate approaches, including prior art incentive systems have one or more shortcomings, and using such systems does not enable a company to present incentive offers to individuals taking all the above factors into account in a timely manner. The company could call consumers individually on the telephone to present the offers, but this is expensive and also does not allow the consumer to find the incentives at their own pace.

It is known to distribute incentives electronically. For example, electronic shopping on the Internet is popular, and often an Internet shopping merchant displays an icon on a page that describes an incentive such as a discount coupon in exchange for the consumer providing some useful marketing information via a "registration" process. For an example of an Internet shopping network, see U.S. Pat. No. 5,715,314 to Payne et al. entitled NETWORK SALES SYSTEM.

Described below are several alternate approaches to that of the present invention. While no admission is being made herein that of any of these alternate approaches is prior art, none of these alternates includes all features of the present invention.

Recently, a system called "E-CENTIVES" was introduced by Emaginet, Inc. of Beheads, Maryland (Internet site http://www.imaginet.com) for the distribution of electronic incentives over the Internet with online or offline redemption. It is not clear whether or not the E-CENTIVES system is prior-art, and no admission of the E-CENTIVES system being prior art is made herein.

U.S. Pat. No. 5,794,210 to Goldhaber et al., entitled ATTENTION BROKERAGE, describes a system that provides for the immediate payment to computer and other users for paying attention to an advertisement or other "negatively priced" information distributed over a computer network such as the Internet. A further invention, Orthogonal Sponsorship, allows advertisers to detach their messages from program content and explicitly target their audience. Means are provided to allow users to choose whether they will view an ad or other negatively priced information and receive associated compensation. Targeting users may be provided by reference to a data base of digitally stored demographic profiles of potential users. Information can be routed to users based on demographics, and software agents can be used to actively seek out users on a digital network. Private profiles may be maintained for different users and user information may be released to advertisers and other marketers only based on user permission.

U.S. Pat. No. 5,761,648 to Golden et al., entitled INTERACTIVE MARKETING NETWORK AND PROCESS USING ELECTRONIC CERTIFICATES, describes a data processing system issuing electronic certificates through "online" networks. Each electronic certificate includes transaction data and identification data, and can be printed out on a printing device linked to a consumer's personal input device, or electronically stored. The data processing system identifies and marks each electronic certificate with a code distinguishing it from all other certificates and with another code identifying the user. The certificate can be used for various purposes, including use as a coupon for a discounted price on a product or service. Consumers access the data processing system online, browse among their choices, and make their selections. The data processing system provides reports on the selected certificates and their use following selection. Certificate issuers also have online access to the data processing system and can create or revise offers, and provide various instructions pertaining to the certificates, including limitations as to the number of certificates to be issued in total and to each individual consumer.

U.S. Pat. No. 5,774,870 to Storey entitled FULLY INTEGRATED, ON-LINE INTERACTIVE FREQUENCY AND AWARD REDEMPTION PROGRAM, discloses a fully integrated on-line frequency award program. A user may access the program on-line and may browse a product catalog for shopping. The user may electronically place an order. The program also calculates award points, updates the award account of enrolled users, and communicates that number of awarded points to the user. Enrolled users may browse through an award catalog and electronically redeem an amount of awarded points towards an award. The program then electronically places an award redeeming order with the fulfillment house and updates the user's award account.

U.S. Pat. No. 5,710,886 to Christensen et al. entitled ELECTRIC COUPONING METHOD AND APPARATUS discloses a method and apparatus for distributing, generating, and redeeming discount coupons, rebate or gift certificates or the like tracks each coupon using a consumer ID number printed on the coupon. Coupons may be distributed electronically, for example, in the form of a diskette or CD-ROM software. Software on the diskette or CD-ROM may prompt a consumer to call a 1-800 number for a validation number or code. Once the software is validated, a consumer may print out selected coupons displayed on a Graphical User Interface (GUI). Each coupon may be printed only a limited number of times. Each coupon may be imprinted with a consumer ID number, preferably in the form of a bar code. Once redeemed, consumer ID information and coupon information may be retrieved from coupons forwarded to a coupon clearing house. Accurate data may then be produced illustrating which consumers or groups of consumers are redeeming which coupons. Such data may be used for marketing purposes or to generated further diskettes for distribution targeting specific consumers or groups of consumers with specific classes of coupon offerings. The use of a consumer ID number on the coupon may reduce or prevent the fraudulent copying and redemption of coupons, as multiple redemptions of a single coupon by a consumer may be readily detected from data gathered at the brokerage clearing house.

European Patent publication EP 08222535 to Apte, et al. entitled INTERACTIVE MULTIMEDIA ADVERTISING AND ELECTRONIC COMMERCE ON A HYPERTEXT NETWORK, describes a system and method for providing targeted, multimedia advertisements and electronic commerce capability on a hypertext network. Advertising software from a server is loaded on a user's computer through a browser at the user's request. The display screen of the client computer is partitioned into a browser area, which retains the full functionality of the underlying browser, and advertising area. Controls affecting the presentation and content of the advertisements streamed from the server to the client computer are available to the user in the interactive area, as are secure purchase and electronic coupon controls.

PCT publication WO9819224 to O'Toole et al., entitled CONTROLLED TRANSFER OF INFORMATION IN COMPUTER NETWORKS, relates to techniques for controlling transfers of information in computer networks. One technique involves transmitting smart digital offers based on information such as coupons and purchasing histories stored at the computer receiving the offer. Another technique involves transmitting from a server computer to a client computer a request for a user's personal profile information, and activating a client avatar that compares the request for personal profile information with a security profile of the user limiting access to personal profile information.

U.S. Pat. No. 5,621,812 to Deaton and Gabriel, entitled METHOD AND SYSTEM FOR BUILDING A DATABASE FOR USE WITH SELECTIVE INCENTIVE MARKETING IN RESPONSE TO CUSTOMER SHOPPING HISTORIES generates discounts by printing incentives based on a customer's shopping history as determined at a point of sale using a credit verification apparatus such as a check reader.

PCT publication WO 9723838 to Scroggie et al. entitled SYSTEM AND METHOD FOR PROVIDING SHOPPING AIDS AND INCENTIVES TO CUSTOMERS THROUGH A COMPUTER NETWORK discloses a system and method for delivering purchasing incentives as well as other shopping aids through a computer network by methods such as using e-mail or over the Internet (including the World Wide Web). Customers can log on to a central system and can elect to browse among available purchasing incentive offers, or elect to claim a product rebate or receive product information. The system merges customer supplied information with other purchase incentive data and creates a printable graphic image of the incentive for transmission to the customer. Alternatively, the incentive is not transmitted directly to the customer, but the terms of the incentive are transmitted electronically to a retail store designated by the customer, who then receives either a token to present to the store or an advisory message. The incentives can be targeted to specific consumers based on consumer purchase history, and either e-mailed to the consumer based on e-mail addresses stored in a consumer database, or established for each consumer using a "personal page" established for the consumer in the computer network.

U.S. Pat. No. 5,675,662 to Deaton, et al. entitled METHOD AND SYSTEM FOR BUILDING A DATABASE FOR USE WITH SELECTIVE INCENTIVE MARKETING IN RESPONSE TO CUSTOMER SHOPPING HISTORIES, discloses a system and method for retail store marketing. A memory stores a database of existing customers of the retail store. The database includes a unique customer identification code for each customer. A memory stores a list of unique identification codes for prospective customers of the store who reside in a predetermined geographical area relative to the store. Circuitry compares the unique identification codes in the stored database of existing customers with the stored list of unique identification codes of prospective customers. Circuitry eliminates data from the list of prospective customers relating to the store's existing customers, such that a non-customer database is produced for use in marketing.

U.S. Pat. No. 5,502,636 to Clarke, entitled PERSONALIZED COUPON GENERATING AND PROCESSING SYSTEM, describes a personalized coupon generating and processing system includes a coupon dispensing source that communicates with responsive consumers through a communications interface. The availability of pre-selected coupons is communicated to the consumers by an availability communications means, and consumer responses are communicated to the coupon dispensing source by consumer response means. Consumer requested coupons are personalized and distributed to the responsive consumers. Redemption of the coupons is communicated to the coupon dispensing source by redemption data means.

U.S. Pat. No. 5,459,306 to Stein, et al. entitled METHOD AND SYSTEM FOR DELIVERING ON DEMAND, INDIVIDUALLY TARGETED PROMOTIONS, discloses a method and system for delivering product picks to a prospective individual user. Personal user information is gathered. Information on a user's use of a product during product use is gathered, correlated and stored. A user code provided to the user is correlated with the user information and the use information. The user information and the use information is classified based on use of the product. Classes of information potentially relevant to future purchases are identified. Product picks (promotions and recommendations) are delivered based on the classified information and the user information, responsive to an inquiry on behalf of the user.

U.S. Pat. No. 5,287,181 to Holman, entitled ELECTRONIC REDEEMABLE COUPON SYSTEM AND TELEVISION, discloses an electronic redeemable coupon generating system that includes: an encoder for encoding coupon-related data in a television signal transmission, the transmission including picture information for display on a television monitor screen; a decoder for receiving the television signal transmission and extracting the coupon-related data therefrom; and a recording device for recording the extracted coupon-related data on a recording medium for subsequent readout and redemption. In a preferred embodiment of the invention, the decoder includes a display driver for displaying indicia on a television monitor screen responsive to coupon-related data being encoded in the television signal transmission. Upon observing the indicia on the television monitor screen, the user can manually and selectively extract the coupon-related data from the television signal transmission. After an optional editing function, the extracted coupon-related data is stored on a recording medium such as a magnetically striped card. The decoder may be part of the standard circuitry of a closed-caption adapted or modified television set. Provisions are made for electronically entering paper coupon information into the system.

U.S. Pat. No. 5,173,851 to Off, et al. entitled METHOD AND APPARATUS FOR DISPENSING DISCOUNT COUPONS IN RESPONSE TO THE PURCHASE OF ONE OR MORE PRODUCTS, discloses a system for creating discount coupons in response to purchases of products. Improvements include the printing of a "negative" coupon in response to the failure to purchase a particular product, and the printing of a coupon in response to the purchase of multiple triggering items, either without limitation as to the identification of the items, or with the requirement that the items fall into a predefined trade group. Other features of the invention permit the use of instantly redeemable "coupons", such that an instant discount is applied to a customer bill rather than having a coupon printed, and the logging, without printing, of possible coupon printings for statistical purposes.

U.S. Pat. No. 5,056,019 to Shultz, et al. entitled AUTOMATED PURCHASE REWARD ACCOUNTING SYSTEM AND METHOD, discloses a marketing method for providing manufacturer purchase reward offers by automatically tracking the purchases of member consumers through the use of bar-coded membership cards and using the purchase records in a data processing system to determine if the required purchases have been made to earn a reward. Each member consumer receives a reward booklet disclosing the available reward offers, a periodic status report indicating the member consumer's progress toward earning rewards, and a reward certificate for those rewards earned.

U.S. Pat. No. 4,882,675 to Nichtberger, et al. and entitled PAPERLESS SYSTEM FOR DISTRIBUTING, REDEEMING AND CLEARING MERCHANDISE COUPONS discloses a method and system in which cents-off merchandise coupons are distributed and redeemed immediately and electronically. An electronic display of coupons valid for use in a particular store is presented to customers in that store. When a customer makes a selection of coupons from the display, the selection is recorded. The customer is subsequently identified at a store checkout station as the one who made the selection. In a preferred embodiment, the identification is made by scanning a special card adapted for use with the system. The items purchased in the store by the customer are recorded, and any matches between the coupons selected and the items purchased are determined electronically. The customer is immediately credited in accordance with the terms of the matched coupons. Redeemed coupons are periodically cleared electronically.

U.S. Pat. No. 4,723,212 to Mindrum, et al. and entitled METHOD AND APPARATUS FOR DISPENSING DISCOUNT COUPONS, discloses an apparatus and a corresponding method for creating a discount coupon in response to the purchase of a product other than the one to which the coupon applies. A record pertaining to each item purchased is examined to determine whether the item is intended to trigger the creation of a coupon. If it is, at least one associated coupon deal record is retrieved and a coupon becomes a candidate for printing, subject to a maximum number of coupons per transaction. The apparatus also validates coupons presented for redemption, scanning a list of purchased products to determine whether any falls into the same product group specified on the coupon and also determining whether the coupon date is valid. One limitation of the Mindrum scheme is that the coupons are delivered to the consumer after the purchase is made, and the consumer has to save them and remember to bring them for the next shopping trip. This method does not allow coupons to be discovered online.

SUMMARY

One object of the invention is a system and method for carrying out one or more of defining, electronically distributing, dynamically displaying to a consumer, redeeming and clearing promotional incentives which enables a company to present incentive offers to individuals, taking into account in a timely manner one or more of such factors as inventory factors (e.g., product demand, carrying costs, and remaining product life), financial factors, (e.g., preferred selling timing) and consumer factors (e.g., demographics, stated consumer interests, and past purchasing behavior).

Another object of the invention is a system and method for carrying out one or more of defining, electronically distributing, dynamically displaying to a consumer, redeeming and clearing promotional incentives whose characteristics are adaptively obtained as a function of one or more of demographics, behavior history, and other characteristics of the viewing consumer, or criteria. In one embodiment, the incentive characteristics are defined by a set of parameters. In a particular embodiment in the case of a discount coupon, the parameters include one or more of: the promotion (e.g., the name of the promotion with which the incentive is associated); the incentive name; the ID number (e.g., the ID number of the incentive, which may include a version number); the product (e.g., the list of goods and/or services to which the incentive applies); the issuer (e.g., the manufacturer or supplier); the product category (e.g., the name of the promotion with which the incentive is associated); the description (e.g., the incentive description in words); the terms, called details in some implementations (e.g., the terms and conditions, which include the match criteria that a consumer is to meet to redeem the incentive); the expiration date; the display requirements (e.g., the consumer information that must be available or provided before the incentive is displayed); the clipping requirements (e.g., the consumer information or properties needed for clipping); the view icon requirements (e.g., what icon will be displayed when what information is available or provided); the incentive artwork (e.g., the audiovisual of the incentive); the incentive icon (e.g., the audiovisual displayed to inform that the incentive is available); the account provider logo (e.g., the text or image that of the account provider that is displayed with the incentive artwork) or the service provider logo; the value/incentive formula (e.g., the value of the incentive or the formula used to determine the incentive in the case of an incentive whose value is adaptively determined); the incentive negotiation formula (e.g., the formula used for negotiating the value of an incentive for an incentive whose value is negotiable); and the POS list (e.g., the list of online and/or offline merchants that have the product).

These and other objects are provided for in the various aspects of the disclosed invention.

Briefly, a method is described for distributing incentives over a network, which preferably is the Internet. Examples of incentives include, without limitation, discount coupons, sweepstakes, frequent flier program mileage, promotional points, premiums, free samples, and product tie-ins. The incentives reside on an incentive database coupled to an incentive information computer connected to the network. Each incentive has an incentive template describing a set of parameters of the incentive, including a value. An incentive also may include an "incentive existence message," preferably including an audiovisual or graphical incentive icon, for example in the form of HTML of an incentive icon. The value of the incentive is based on meeting a set of one or more match criteria (terms and conditions). In one particular embodiment, the value is also based on applying an incentive formula. Value here includes the inherent incentive value, which may be, depending on the type of incentive, the amount of discount, an entry in a sweepstakes, a number of frequent flier program miles, a number of promotional points, one or more free samples, a free test drive, or a product tie-in, this list meant to be non-limiting. The method includes, for any particular incentive, publishing a mechanism for selecting the incentive at one or more locations of the network, these locations, for example being Web-pages, or e-mail messages. For example, the selecting mechanism may be an icon which when clicked generates the incentive existence message of the incentive (possibly together with the incentive existence messages of other incentives). Alternatively, the selecting mechanism may be the incentive existence message itself. The published incentive selecting mechanism preferably includes a reference which directly or indirectly points to the whereabouts in the network of the incentive or of one or more parameters of the incentive, the reference being, for example, in the form of the universal resource locator (URL) of the incentive or of the one or more parameters.

A consumer computer connects to the network and accesses one of the locations where the selecting mechanism of the particular incentive exists. Activating the selecting mechanism, which may be automatic when one accesses one of the locations or which may be by consumer interaction, leads to one or more parameters of the particular incentive being displayed on the consumer computer. In the preferred embodiment, the incentive includes an incentive existence message and it is the incentive existence message which is displayed. Displayed in this context includes all means for communicating information to the consumer. One or more of the incentive parameters displayed, for example one of more characteristics of the incentive existence message, are dependent on one or more characteristics of the consumer, including, for example, the location accessed by the consumer computer where the selecting mechanism for the particular incentive exists, the time, or the date. Dependent in this sense does not necessarily mean the only dependency. In a particular embodiment the incentive existence message includes an audiovisual, for example an icon, and the audiovisual characteristics of the incentive existence message (including for example the icon shape, color, text associated with the message, and the wording) are dependent on one or more characteristics of the consumer.

One version of the method of the present invention includes making the consumer a member when the consumer views the one or more incentive parameters if the consumer is not yet a member. Joining includes transmitting consumer identification data via the network to a member information computer connected to the network; and storing consumer identification data of the consumer in a member database coupled to a member information computer connected to the network. In one embodiment, joining includes storing referral data (e.g., a cookie) about the consumer in the consumer computer, the referral data for rapid identification of the consumer, for example for future interactions with the consumer. In one embodiment, the method includes recording occurrence information about displaying the incentive parameter or parameters to the member, and the storing preferably is in the incentive database, and may also include storing in the member database. The occurrence information stored in the incentive database may include the identification of the member, the date and time, the location on the network where the message is being displayed, and one or more parameters about the incentive. When some of the parameters, for example the audiovisual characteristics of the incentive existence message (such as the icon shape, color, text associated, and the wording), are dependent on one or more characteristics of the consumer, the characteristics may include the consumer demographics, the consumer preferences and the consumer purchasing history.

In one version, the incentive existence message includes means for interacting, and the method further includes displaying another one or more of the parameters of the particular incentive on the display device of the consumer computer in response to an action by the consumer, e.g., clicking on the incentive icon. In the preferred embodiment, this action causes a new display window (e.g., a popup window) to appear, the displaying of the parameters occurring therein. In this way, the incentive may be viewed by the consumer without the consumer leaving the window, for example the Web page, where the icon originally appeared. In another version, the displaying of the parameters occurs in the same window where the existence message appeared. In the version that includes the consumer joining, i.e., becoming a member of the inventive system by providing consumer identification data which is then stored in a member database coupled to a member information computer connected to the network, occurrence information about displaying the one or more of the parameters is recorded in one or more of the incentive database and the consumer database. Thus, when means for interaction are presented to the member, for example when the existence message includes interaction means, or displaying more parameters includes displaying another interaction means, occurrence information about any interaction by the consumer is recorded, preferably in the incentive database and in alternate embodiments, in the member database or in both databases.

In another version of the method, when viewing the existence message does not cause the consumer to become a member, the displaying of one or more parameters includes making the consumer a member if he or she is not yet a member.

In the preferred embodiment, at least one of the incentive parameters displayed depends on one or more characteristics of the consumer. Furthermore, for some incentives, negotiating means are presented to the consumer, and the consumer may negotiate one or more of the incentive parameters displayed; this resulting in the negotiated incentive parameters being modified. Furthermore, in some versions of the method, at least one of the incentive parameters displayed depends on one or more of the present time, the present date, and the location accessed by the consumer computer, for example where the incentive existence message generating message of the particular incentive exists.

The displaying of one or more of the parameters typically includes displaying the incentive value to the consumer. Thus, in such a case and when the incentive is negotiable, the consumer may negotiate the incentive value which may then be modified as a result of the negotiating. Also, in some versions, the incentive value displayed depends on one or more characteristics of the consumer as determined by applying an incentive formula. This is for both the case of a negotiable and a non-negotiable value.

In the case of the incentive value depending on consumer characteristic(s) and the consumer being a member, the displayed incentive value may depend on one or more of the consumer identification, the consumer demographics, the consumer purchasing history, the location accessed by the consumer computer where the incentive existence message of the particular incentive was displayed, the present time, and the present date.

In the preferred embodiment, for some incentives, one incentive parameter displayed is a clip button or other means for the consumer to clip the incentive. Clipping may require membership and the consumer may be automatically entered as a member or be required to enter consumer identification information at the consumer computer. When the consumer clips an incentive by interacting with the clipping means, clipping information about the clipped incentive is stored in the member database, for example including the present date, an indicator of the value of the incentive, and characteristics of the consumer, including the consumer identification. The indicator of the value of the incentive in one implementation is the value of the incentive, and in another is the version number of the incentive or a pointer to the version of the incentive. The key here is to be able to recreate a historical record in the case that incentives change over time.

The method further includes a consumer (e.g., a member) viewing one or more characteristics of valid incentives previously clipped by the consumer. This includes, for example, clipped incentives that may still be redeemed by the consumer.

Once a consumer becomes a member, in the preferred embodiment, targeted information is periodically transmitted to the consumer about incentives in the incentive database. The transmission may be by one or more of email, telephone, postal mail, and placement of information on one ore more locations in the network, for example, Web pages. The targeted information if related to an incentive clipped by the consumer may include one or more of information that the specific clipped incentive is soon to expire, information that the value for the specific clipped incentive has changed for the consumer, and information on the existence of new related incentives. alternatively, after clipping, the consumer may be displayed one or more characteristics of some valid (e.g., unexpired) incentives previously clipped by the consumer.

One way of targeting is by using the published selection means. In this, the selection means is programmed to select one or more incentive to display and the parameters of the incentive according to one or more parameters of the member. For example, a Web page may retrieve an incentive for men's clothing when the member is a male and for women's clothing when the member is a female.

After clipping a consumer may redeem the clipped incentive. Typically, redeeming requires satisfying one or more match criteria. For the common discount coupon incentive, the match criteria includes purchasing. Typically, the match criteria depend on the type of incentive and the nature of the value provided. Examples of match criteria include purchasing, joining, completing a survey, and requesting a free sample.

If one of the incentive parameters is an online point of redemption connected to the network, the redeeming causes a redemption display to appear on the consumer computer enabling the consumer to redeem the value upon meeting the match criteria. A version of the method does not require clipping prior to redeeming, allowing the consumer to redeem the incentive after viewing the inventive. If redemption requires purchasing, the online point of redemption is an online point of sale. The redemption display may be in a separate display window (e.g., a popup) or in the same window previously being viewed.

Also described is a system for distributing and redeeming incentives such as discount coupons, sweepstakes, frequent flier program mileage, promotional points, premiums, free samples, and product tie-ins, in which each incentive has an incentive template describing a set of parameters including a value and may also include an incentive existence message, preferably containing an audiovisual or graphical incentive icon, for example in the form of HTML of an incentive icon. The value is based on meeting a set of one or more match criteria, e.g., terms and conditions. Typically, the set of parameters further including one or more of a visual representation, an associated product/service, pointers to related incentives, and pointers to related products/services. The system comprises an incentive information computer connected to a network, e.g., the Internet, with an incentive database capable of containing the incentives coupled to the incentive information computer, means for creating a particular incentive in the incentive database, the creating including entering the data defining the set of parameters; and means for publishing the particular incentive on the network, where publishing includes publishing a mechanism for selecting the particular incentive, the publishing being at one or more locations of the network, for example on one or more Web pages or in email messages. The selecting mechanism may include manual activation means and thus be activated in response to consumer interaction, or may be activated automatically. The published incentive selecting mechanism preferably includes an reference which directly or indirectly points to the whereabouts in the network of the incentive or of one or more parameters of the incentive, the reference being, for example, in the form of the universal resource locator (URL) of the incentive or the one or more parameter(s). Publishing a single incentive includes replicating an incentive selecting mechanism for the incentive at the locations, or in an alternate embodiment, replicating at least one parameter of the incentive, for example, replicating the incentive existence message. In one version, the incentive creating means is connected to the network, while in another, the incentive creating means is directly coupled to the incentive information computer. In the preferred embodiment, the system further comprises a consumer computer which can connect to the network and which includes a display device. It is anticipated that such a computer is operable by a consumer who may view the display device. In this embodiment, the system then includes means for displaying one or more parameters of a particular published incentive on the display device when the consumer computer accesses one of the locations containing the selecting mechanism of the particular incentive. This may occur automatically or as a result of the consumer interacting with some interaction means included in the selecting mechanism. Preferably, the displayed parameters include the incentive existence message. The preferred embodiment system also includes a member information computer connected to the network and to which is coupled a member database that including member information on consumers, including member identification information, identification means for a particular consumer to be identified to the system by transmitting identification information over the network from the consumer computer to the member information computer, and joining means for a consumer to be added to the member database, by joining information being transmitted over the network from the consumer computer to the member information computer. In one version, the joining means comprises means for storing referral data (e.g., a cookie) about the consumer in the consumer computer, and in such a case, the identification means accesses the referral data to determine the identification information for transmission over the network. The identification means also may comprise means for the consumer to identify itself to the system by entering the information at the consumer computer. In one implementation, the joining means comprises means for the particular consumer to voluntarily be added to the member database (e.g., as a result of responding to a request to join), while in other implementations, the joining means comprises means for the particular consumer to be automatically and involuntarily added to the member database as a result of some action by the consumer.

The means for displaying a parameter or parameters of the particular incentive on the display device after the consumer computer accesses one of the of the locations containing the selecting mechanism for the incentive, preferably displays at least the incentive value. One or more parameters depend on the characteristics of the consumer. For example, in one implementation, one or more of the incentive parameters displayed depends on one or more of the present time, the present date, and the location accessed by the consumer computer where the incentive selection mechanism existed. In a further improved implementation, one of the incentive parameters displayed also depends on one or more of the set consisting of the number of responses to-date to the particular incentive, the inventory value of the associated goods/service, and the current currency exchange rate. In yet a further improved implementation, which includes the means for joining, at least one of the incentive parameters displayed depends on one or more characteristics of the member, including one or more of the demographics of the member, the purchasing history of the member, the known preferences of the member, the credit history of the member, the previous incentives viewed by the member, and the previous incentives clipped by the member.

In the case that the incentive existence message is displayed the existence message preferably also includes means for responding. In the preferred embodiment, the means for displaying further displays one or more incentive parameters in response to the consumer responding to the incentive existence message using the means for responding. For example, in the implementation wherein the incentive existence message includes an incentive icon, e.g., a graphic element, the means for responding includes means for the consumer to click on the icon. Preferably, some of the parameters displayed may be one or more means for the consumer to interact with the incentive. In an improved implementation, the characteristics of the incentive existence message, for example the audiovisual characteristics of the icon such as the icon shape, color, and text associated, and the wording, are dependent on one or more characteristics of the consumer. In one version, one of the consumer characteristics on which the characteristics depend is the location accessed by the consumer computer where the selecting mechanism of the particular incentive exists.

Preferably, when the existence message includes means for responding, or the one or more displayed parameters of the incentive includes means for interacting, any interacting by the consumer is recorded. One implementation records the act in the incentive database, while another records in the member database, and a third records in both the member database and the incentive database. In an embodiment described herein, instance particulars of any display of the incentive by the displaying means is recorded in the incentive database. This, for example, may occur automatically or as a result of consumer interaction with the responding means of the existence message (e.g., a click on an icon). In versions that include the member database and the joining means, the instance particulars recorded include the identification of the member, and one or more of the location on the network where the incentive was displayed, the present time and the present date.

In the preferred embodiment, the system includes clipping means for the consumer e.g., a member, to clip the particular incentive, the clipping means including means for storing incentive instance information about the particular incentive in the member database. The clipping means preferably comprises means for saving clipping information, preferably in the incentive database, including the identification of the consumer, incentive instance information including the value of the incentive, and one or more of other characteristics of the consumer, the present time, and the present date.

One implementation of the system includes means for transmitting targeted information about incentives to the member, including targeted information about a clipped incentive. Such information may be that the incentive may soon expire, information that the incentive's value has changed, information on related incentives, and/or information that there are related incentives new since the last clipping. The means for transmission includes one or more of means for sending e-mail, means for making a telephone call, means for sending postal mail, means for placing the targeted information on particular locations related to the member, means for displaying the targeted information whenever the member views an incentive, means for displaying the targeted information whenever the member clips an incentive. The transmitting targeted information may include publishing additional selection means or programming existing selection means to select incentives according to targeting criteria related to one or more characteristics of the member.

The system described also includes redemption means for the member to redeem the clipped particular incentive. The redemption may be online using online redemption means connected to the network. That is, the match criteria may include an online action by the consumer such as filling in a survey or a purchase. For example, in the case of incentives that include purchase of goods/services in the match criteria, and the goods/services associated with the clipped particular incentive are purchasable online, one implementation includes means for online purchase of goods/services, the online purchase means connected to the network. In one implementation, the redemption means is automatically activated upon the member meets the match criteria, for example uses the online purchase means to purchase the goods/services associated with the clipped particular incentive for an incentive involving purchase. In the purchase automatic redemption case, the redemption means includes means for matching a basket of goods and services to the set of clipped incentives stored in the member database for the member, and means for applying the incentives to the basket of goods and services. In a non-automatic redemption version, the redemption means includes activating means that, at the request of the member, in the case of an incentive that has a purchase in the match criteria, matches a basket of goods and services to the clipped incentives stored in the member database for the member and applies the clipped incentive incentives to the basket of goods and services.

Another aspect described is a system that further includes means for modifying one or more parameters of the incentive in the incentive database as a result of displaying the incentive. In the preferred embodiment, the system further includes means for modifying one or more parameters of the incentive in the incentive database as a result of a member clipping the incentive, as well as means for modifying one or more parameters of the incentive in the incentive database as a result of a consumer redeeming the incentive.

In one version, the system includes means for a consumer to reject an incentive, the rejecting including storing the act of rejection, preferably in the incentive database, although in some implementations, this might be in the member database or both databases.

Also described herein is a network-based incentive system, which includes a network; one or more consumer computers able to be connected to a network (e.g., the Internet) and for operation by a consumer, and an incentive database coupled to an incentive information computer connected to the network, the incentive database containing an incentive template describing an incentive that has a value based on applying an incentive formula. In the system, the consumer computer is programmed to display an incentive existence message indicating the existence of the incentive in the incentive system. In the preferred embodiment, the consumer computer is also programmed to receive a consumer displaying request for displaying the incentive and to transmit the consumer displaying request to the incentive information computer. In addition, the incentive information computer is programmed to transmit to the consumer computer incentive information necessary for the display of the incentive, including the value of the incentive on the consumer computer in response to the consumer displaying request. The preferred embodiment also includes a member database containing information on one or more members coupled to a consumer information computer connected to the network.

BRIEF DESCRIPTION OF THE DRAWINGS

The present invention will be more fully understood from the detailed preferred embodiments of the invention, which, however, should not be taken to limit the invention to any specific embodiment but are for explanation and better understanding only. The embodiments in turn are explained with the aid of the following figures:

FIG. 4 shows pseudocode for the View_Icon procedure according to one embodiment of the invention;

FIGS. 5A and 5B show pseudocode for the View_Incentive procedure according to one embodiment of the invention;

FIG. 6 shows pseudocode for the Clip_Incentive procedure according to one embodiment of the invention;

FIG. 7 shows pseudocode for the Get_Member_ID procedure according to one embodiment of the invention;

FIG. 8 shows pseudocode for the Sign_On procedure according to one embodiment of the invention;

FIG. 9 shows pseudocode for the Get_Required_Member_Info procedure according to one embodiment of the invention;

FIG. 10 shows pseudocode for the Validate_External_Member_Info procedure according to one embodiment of the invention;

FIG. 11 shows pseudocode for the View_Account procedure according to one embodiment of the invention;

FIG. 12 shows pseudocode for the View_Member_Account_Page procedure according to one embodiment of the invention;

FIG. 13 shows pseudocode for the Buy_Now procedure according to one embodiment of the invention;

FIG. 14 shows pseudocode for the Adjust_Goods_&_Services_Order procedure according to one embodiment of the invention;

FIG. 15 shows pseudocode for the Record_Redemption procedure according to one embodiment of the invention;

FIG. 16 shows pseudocode for the Get_Incentive_For_Member procedure according to one embodiment of the invention;

FIG. 17 shows pseudocode for the Close_Incentive procedure, including an enabling negotiations, according to one embodiment of the invention;

FIG. 18 shows pseudocode for the Negotiate procedure according to one embodiment of the invention;

FIG. 21 shows the display of the incentive of FIG. 19;

FIG. 22 shows a Sign-Up Screen for signing up a new member or confirming membership of an existing member according to one embodiment of the invention;

FIG. 23 shows the second Pop-Up Screen for signing up a member, shown here filled in for one member, according to one embodiment of the invention;

FIG. 24 also shows the second Pop-Up Screen for signing up a member, shown here filled in for a second member, according to one embodiment of the invention;

FIG. 25 shows the incentive of FIG. 20 applied for the member shown in FIG. 23.

FIG. 26 shows the incentive of FIG. 20 applied for the member shown in FIG. 24.

FIG. 27 shows a pop-up screen for confirming enrollment in the incentive service according to one embodiment of the invention;

FIG. 28 shows a display similar to that defined in FIG. 20, but including a "Negotiate" button according to one embodiment of the invention;

FIG. 29 shows a pop-up screen for confirming the clipping of an incentive according to one embodiment of the invention;

FIG. 30 shows a pop-up screen view of an account, displaying incentives clipped according to one embodiment of the invention;

DETAILED DESCRIPTION OF THE INVENTION

The preferred embodiments of aspects of the present the invention are implemented on the Internet. The scope of those aspects, however, is not limited to the Internet and the embodiments described herein may be modified to run on any network and how to so modify the embodiment would be clear to those of ordinary skill in the art.

A discussion of Internet technology, the World Wide Web (the Web), URLs, HTML, servers, clients, browsers, the JAVA programming language, browser side JAVA applications (applets), server-side JAVA applications (servlets), and cookies, including definition of many of the Internet terms used herein, is provided herein below in the section entitled Details for Implementation on The Internet.

Many aspects of the present invention are preferably embodied as computer instructions written (a) as JavaScript scripts that run on a computer on a JavaScript enabled browser, or (b) as computer instructions in the JAVA language for running either on a consumer's (or other entity's) browser (as an applet) or on a Web server (as a serviet) or for running as a stand alone JAVA application. The equivalent functions may similarly be coded using any computer language such as C++, as would be clear to those of ordinary skill in the art. Clearly, these scripts also may be implemented differently, either in another scripting language, or as programs.

Figure 1:
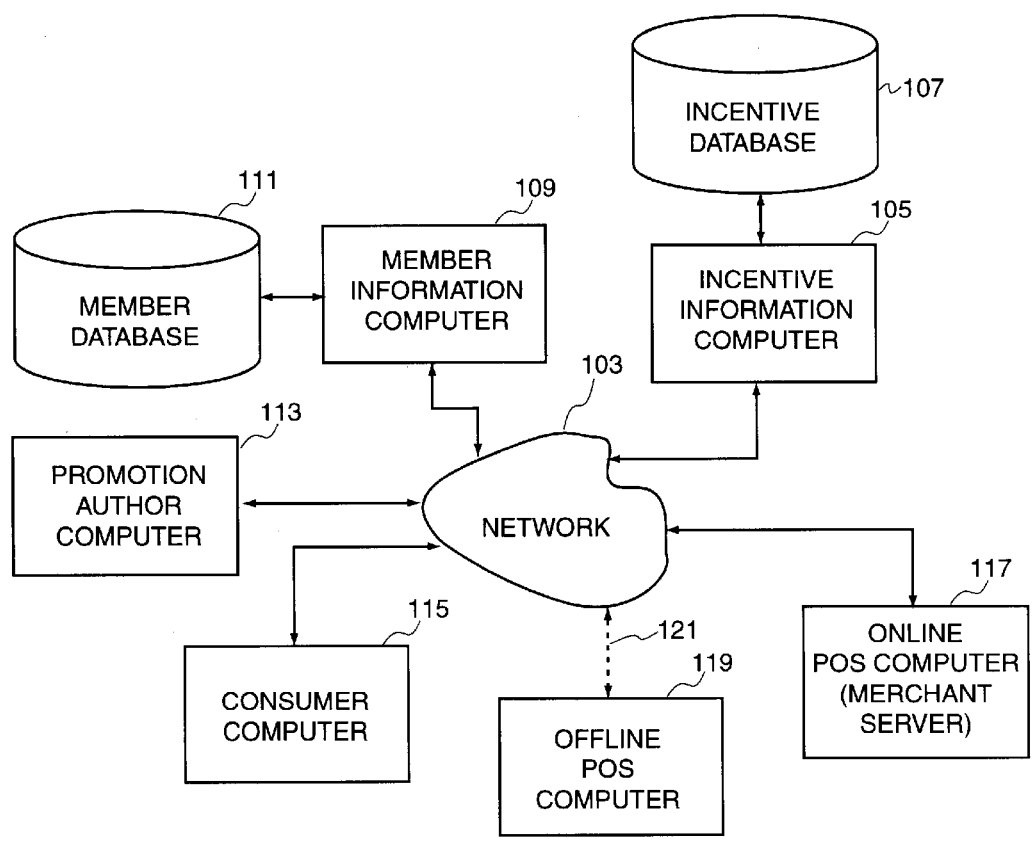
FIG. 1 shows the hardware components of one embodiment of the system of the invention.

The Entities:

FIG. 1 shows the hardware components of one embodiment of the system of the invention. Each of these hardware components belongs to or is run by one of the entities of the system.

An incentive issuer typically is the merchant or manufacturer of the goods or services, for example, SONY®, or CIRCUIT CITY®, or MARRIOTT HOTELS®, etc., that desires to promote its products or services by offering incentives.

An promotion agency is an entity retained by the incentive issuer to carry out a promotion campaign. In other embodiments, the incentive issuer may act as its own promotion agency.

A promotion is the act of promoting a sale or other desirable activity (e.g., increased product or company awareness, increased visits to a particular Web site such as a Web "portal", participation in a particular charity drive, etc.). Thus, in terms of incentives, the promotion includes a collection of incentives. A promotion agency's job thus may include defining and distributing the set of incentives of a promotion on behalf of the incentive issuer.

A promotion author is the entity that defines the promotion, including the incentives in the promotion. The promotion agency typically but not necessarily acts as the promotion author.

A consumer is the entity (such as a person or organization or business) at whom the promotion, including the incentives, is aimed. Thus, while this description talks of a consumer being a person (using terms such as he and she and or his or her), it is to be understood that the consumer may be an entity other than a person.

A member is a consumer that has joined the incentive service by registering.

As a result of a promotion defined by a promotion author, consumers are enrolled by becoming members in the system. An enrolled customer is a member enrolled by a particular promotion. Because an enrolled customer is a member, there are specific data on the activities of such an enrolled customer. Thus, this promotion results in very specific information about the set of customers who have enrolled as a result of a promotion.

A service provider is the entity (typically a company) that runs the incentive system defined herein. There can be more than one service provider in any implementation.

An account provider is an entity that manages data about members, including maintaining all the necessary databases of information about the members. In some embodiments, the account provider may retain the service provider to provide the services of managing data about members. In another embodiment, the account provider and the service provider may be the same organization. Thus, members typically register with the account provider.

A promotion sponsor is an organization that sponsors promotions. Such a sponsor may then use one or more promotions to gather statistics. For sponsorship, the sponsor may require its logo to be used in incentive icons and other incentive displays, or have other requirements. For example, a promotion sponsor may be a chamber of commerce, or a credit card company such as VISA, or an external membership organization, such as the American Automobile Association or a credit card company. The sponsor may sponsor a campaign run directly by an incentive issuer (e.g., a manufacturer) or by a promotion agency. The promotion agency would then select the service provider to use for the promotional campaign. It would be clear that an incentive issuer may run a promotion without using a third party. In such a case, the incentive sponsor is incentive issuer. For example, a merchant such as CIRCUIT CITY may issue a set of promotions related to goods sold at its store, and act as the sponsor of the promotion by requiring certain CIRCUIT CITY logos to be used for these incentives when a consumer views the incentive from CIRCUIT CITY's Website.

A point of sale (POS) (also called a merchant herein) is a vendor location for selling a product or service for which an incentive is applied. For those incentives which do not involve purchase of a product or service for redemption, a point of redemption is a location for redeeming the incentive. So while the description describes points of sale, it should be clear that these terms include points of redemption not involving purchase, and how to modify any part of the description for the non-purchase case would be clear to those in the art. An online POS (also online merchant) is a POS that is on the Internet, while an offline POS (also offline merchant) is a physical POS (e.g., a store) that has some external connection with the service provider via either the Internet or some other means of electronic communication.

In some situations, two types of memberships may be defined. In such situations, membership with the account provider indicates membership in the incentives scheme. Promotion sponsors are defined as above, and such a promotion sponsor may use a promotion agency to run the actual promotion. The promotion sponsor may be an external membership organization that has separate membership from membership in the incentives scheme. Two examples of external membership organizations are the American Automobile Association (AAA) or a particular credit card organization, and for these two examples, external members would be AAA members and holders of the particular credit card, respectively. A promotion of incentives sponsored by the external membership organizations may include any of the following characteristics: different icons for external members and non-members, viewing restricted only to external members, or, in the case of unrestricted viewing, clipping of the incentive being restricted to members of the external membership organization. Other methods of restriction or exclusion also may be used. For example, clipping may be allowed only when accessed from a particular Web site or for people registered with a particular Web-based merchant.

A datamart associated with a promotion or with a promotion author is the set of consumers that have enrolled as a result of the promotion or of one or more promotions by the author, together with the history of what each of these customers has done, including what they've clipped, what they've purchased and their demographics. Also included in the datamart are not only the customers who were enrolled by the author as a result of the promotion, but also information on all other enrolled members who respond to the author's promotion. Thus there are two groups of consumers in a datamart: enrolled customers who are members acquired as a result of a specific promotion, and existing members who responded to a specific promotion.

Note that fewer or more of the above described entities may be involved in any embodiment of an incentive system according to the invention. Other business models and implementations also are possible within the scope of the invention, as would be clear to one of ordinary skill in the art.

Hardware Elements:

Referring to FIG. 1, the following are the hardware entities according to the preferred embodiment:

The consumer computer 115. This is the computer on which a typical consumer views the incentives, for example in the form of an icon which the consumer can view by clicking on the icon to open a pop-up window which displays the incentive, the characteristics of which are adaptively determined according to the particulars of the consumer (including some recent behavior matching some match criteria). While the term computer will be used herein for consumer computer 115, it is to be understood that consumer computer 115 may be a computer, a personal computer, a terminal, an interactive television, a television receiver with computer display facility (or other audio or audio-visual facility), a television set-top box, an intelligent telephone device, or any other device that that is capable of connecting to the network and displaying an incentive. Also, the scope of the terms display devices and displaying as used herein clearly include devices that present information to a consumer in any form, including a non-visual form, and the act of so presenting the information. This includes, for example, presenting information in printed form or in audio or as a combination of forms. Note that the term network appliance sometimes is used to define such a device that is capable of connecting to the network and of displaying (in this general sense) information to a consumer. Any such network appliance is included in our definition of a consumer computer.

The incentive information computer 105 is a computer which holds incentive information, the incentive information in the form of a database (incentive database 107). The incentive information computer typically is run by the service provider. Of course, incentive database 107 could be distributed over several computers in the network, and parts or all of it could on several computers connected to the network. Thus, while this description and the claims attached hereto refer to a single incentive information computer (element 105) to which a single incentive database (element 107) is coupled, these terms also include the case of several computers holding the data in one location or distributed over the network or in redundant form or any combination of these, and how to modify the details to include these multiple computer and multiple databases cases would be straightforward to one of ordinary skill in the art.

The member information computer 109 is a computer which holds consumer information, the consumer information in the form of one or more databases (the member database 111). The member information computer is typically run by the account provider. In some systems, the member information computer 109 may be part of the same computer system as the incentive information computer 105. This would occur, for example, if the account provider retains the service provider to manage accounts, or if the account provider and the service provider are the same entity, which may occur in some configurations. Again, while this description and the claims attached hereto refer to a single member information computer (element 109) to which a single member database (element 111) is coupled, these terms also include the case of several computers holding the data in one location or distributed over the network or in redundant form or any combination of these, and how to modify the details to include these multiple computer and multiple databases cases would be straightforward to one of ordinary skill in the art.

The promotion author computer 113 is a computer (or computer terminal) for managing promotions and incentives, for example for defining and editing incentives, such managing typically carried out remotely by the promotion author. The promotion author computer 113, which typically is situated at the promotion author's site, may also be used for reviewing reports generated by incentive information computer 105 or the member information computer 109 or both. In some implementations, the review function is carried out separately from the creation and editing function.

The network 103 is some means of connecting one or more consumer computers 115 and one or more promotion author computers 113 to the member information computer 109 and to the incentive information computer 105. In the preferred embodiment, the network 103 is the Internet. Clearly, any method for remotely connecting computers may alternatively be used.

Different embodiments may use a single computer system for both the member information computer 109 and the incentive information computer 105, while in other embodiments the member information computer 109 may be separate from the incentive information computer 105. Either of these computers and associated databases may be split amongst several computers, or replicated amongst several computers, and how to modify the system to operate with such distributed or replicated information would be clear to one of ordinary skill in the art.

Software Elements:

The methods implementing the various components of the system are in the form of computer programs, each operating in its corresponding computer of the system. The information normally is stored in databases which are stored in storage systems each connected to the appropriate hardware element of the system.

Figure 3:
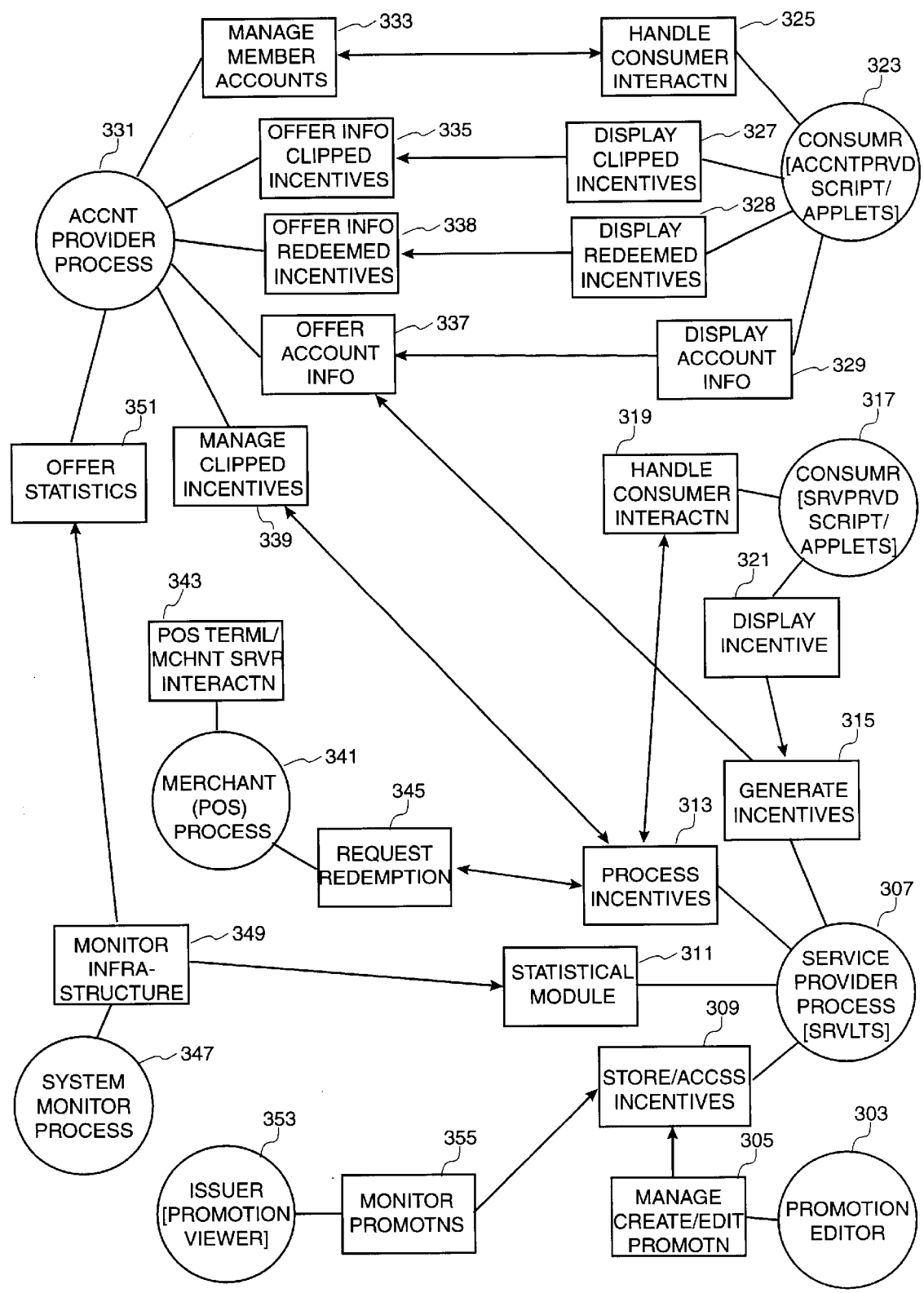
FIG. 3. shows the software components (as circles) together with some of the modules in the software components (as blocks) according to one embodiment of the present invention.

FIG. 3. shows the software components (as circles) together with some of the modules in the software components (as blocks) according to one embodiment of the present invention.

The incentive display process (DISPL) shown in FIG. 3 as the consumer (service provider related scripts/servlets) process 317 is a set of programs for carrying out the incentive interactions that occur at the consumer computer 115 and are managed by the service provider. These operations include viewing and displaying an incentive, shown as module 321, and consumer interactions such as clipping an incentive, the consumer interactions shown as module 319. As described in more detail below and in the accompanying flow chart and pseudocode figures, process 317 preferably is implemented by running JavaScript scripts on consumer computer 115 embedded in the HTML from which the user requests an the interaction, and running servlets on incentive information computer 105 that load HTML into consumer computer 115 from the incentive information computer 105.

The member information display process shown in FIG. 3 as the consumer (account provider scripts/servlets) process 323, a set of programs managed by the account provider for carrying out the interactions that occur at the consumer computer 115. These operations include the consumer interactions of enrolling as a member, etc. (consumer interactions module 325), viewing and displaying account information such as displaying a member's clipped incentives (module 327) and displaying a member's account information (module 329). Process 323 preferably is implemented by running JavaScript scripts on consumer computer 115 preloaded or loaded to run on consumer computer 115 embedded in HTML generated by JAVA servlets that run on the member information computer 109.

The service provider process (SRVPRVD) 307 is a set of computer programs operating on the incentive information computer 105. The process preferably includes a commercial Web server (not shown separately in FIG. 3) for serving HTML objects. The additional programs required are run as JAVA servlets on the Web server used. The different modules include a storing and accessing process 309 for incentives, an incentive generator process 315 which includes determining the characteristics of an incentive such as its icon, appearance, and value adaptively, depending on the member's characteristics obtained by communicating with the appropriate module (offer redeemed incentive account information module 337) of the account provider process 331, a processing clipped incentives process 313 which includes handling redemptions of clipped incentives, clipping incentives, etc., and a statistical module 311 which offers statistics about the incentives. The servlets in the service provider process 307 include components that generate the database commands (preferably SQL language commands) for the incentive database 107.

The incentive database (INCENT-DB) 107 is a database in a storage system coupled to the incentive information computer 105 as shown in FIG. 1. It is mentioned in this software section because its components include both hardware and software.

The account provider process (ACCTPRVD) 331 is a set of computer programs operating on the member information computer 109. In some embodiments, for example ones in which the service provider is contracted by the account provider to run account provider services, or in which the service provider and the account provider are the same entity, the account provider process runs on the same server computer (incentive information computer 105) as the service provider process 307 and includes JAVA servlets that generate the appropriate SQL commands for the member database 111. The modules include a manage member accounts module 333 that interacts with the handle consumer interaction module 325 of consumer (account provider scripts/applets) process 323, an offer clipped incentives process 335 which interacts with the display clipped incentives process 327 of consumer (account provider scripts/applets) process 323, an offer redeemed incentives account information process 338 which interacts with the display redeemed incentives process 328 of consumer (account provider Scripts/applets) process 323, and an offer statistics process 351 for monitoring the system.

The promotion editing and managing process (PROMOEDIT), shown as process 303, including a manage/create/edit promotion module 305, may, in one implementation, be a stand-alone computer program, for example written in JAVA, operating on the promotion author computer 113. Alternatively, in another implementation, defining and editing incentives may be carried out by the promotion author accessing a Web page served to the promotion author by the service provider. One reason a stand-alone program might used is because the creator of an incentive usually would want to have many optional incentive images and advertising images locally stored, and access to locally stored images might be more easily achieved from a stand-alone program than from a browser served from another site. The stand-alone program would then connect to the incentive information computer 105 via the network 103. In the Web page-based arrangement, the connection is carried out by connecting the promotion author computer 113 to the incentive information computer 105 via the Internet at a Web site belonging to the service provider (the service provider site). The Web page for PROMOEDIT is in standard HTML with multipart/form-data form processing capability. Local artwork is uploaded into the Web-based user interface.

While creating and editing the incentives of a promotion, monitoring a promotion such as viewing and reviewing promotion information including as statistical reports preferably is carried out by a different promotion viewer process 353 which includes a promotion monitoring module 355 connecting to a Web page at the service provider site over the Internet.

The merchant process (MRCHNT) 341 is a set of computer programs operating on a merchant's computer 117. A typical online merchant computer operates a specialized Web server called a merchant server. The aspects of the present invention that operate at on an online merchant's computer are preferably a set of modules provided in different forms for different kinds of merchant servers. For example, in one implementation, they are a set of C programs including a module 343 that interacts with the merchant server, and an incentives redemption request module 345 which communicates with the service provider process SRVPRVD 307 and requests that the appropriate module (process clipped incentives module 313) process an order to apply any applicable clipped incentives. Offline merchants operate a similar merchant process 341, with a module 343 that interacts with the point-of-sale terminal which is part of the offline POS computer 119 and a module 345 that communicates as needed with the service provider process (SRVPRVD) 307.

The member database (MMBR-DB) 111 is a database in a storage system coupled to the member information computer 109 as shown in FIG. 1. It is mentioned in this software section because its components include both hardware and software. Part of the member database 111 is the account database (ACCNT-DB) of member incentive histories for each member. For each member, ACCNT-DB includes two lists: a list of all the instances of incentives that the particular member user has clipped, and a list of all the instances of incentives that the particular member user has redeemed through purchases, etc. All other actions by the member, viewing the account, etc., also are recorded. Whenever a member clips an incentive, the incentive instance is automatically added to the history of clipped incentives field for a member's entry in ACCT-DB. Whenever a member redeems an incentive, the incentive instance is automatically added to the history of redeemed incentives field for a member's entry in ACCT-DB. ACCNT-DB also includes a totals by category list which keeps a total of all redemptions by categories (such as electronics, clothing, etc.). In some implementations, all potential savings of clipped incentives may also be maintained. In alternate implementations, other details also may be recorded, for example, the time to respond to an incentive, the act of dismissing an incentive, etc.

In the preferred embodiment, the accounts database information (ACCNT-DB), is included in each member's record in the member database MMBR-DB. Thus, there are only two databases in such an implementation, the incentives database INCENT-DB, and the member database MMBR-DB.

A standard method for connecting to databases in JAVA programs used, for example, in the JAVA servlets implementing the database connectivity parts of the preferred embodiment is to use Database Connectivity (JDBC) standard protocols originally developed by Sun Microsystems, Inc., and described, for example, in Reese, George: *Database Programming with JDBC and Java*, Sebastopol, Calif.: O'Reilly & Associates, 1997.

Creating an Incentive

One of the purposes of the present invention is to provide a great deal of flexibility to someone who wishes to run a promotional campaign using incentives, so that they may design the incentive to meet their particular needs and requirements. At each point in the incentive process, viewing the incentive icon, viewing the incentive (e.g., by popping up a screen), and clipping the incentive, the promotion author needs to be able to specify what the consumer sees, both the icon and the incentive itself, and also any additional screens which request further information from the user or engage the user in related dialog. The present invention has been designed to allow the promoter maximum flexibility in this regard, so as to support a wide variety of promotions and incentives. Thus, while a particular style of incentive is described herein, it will be understood by those of ordinary skill in the art, that other designs also may be used, and incorporating such other designs is relatively straightforward in the framework presented herein.

To create an incentive, the promotion author (typically the promotion agency) runs the promotion editing and viewing process PROMOEDIT 303 on the promotion author computer 113. This process allows the promotion author to specify and later modify a promotion, including defining the type of incentives and the parameters of the incentives of the promotion. PROMOEDIT may be a stand-alone program that can conveniently access and use locally stored images and designs, or PROMOEDIT may be one or more Web pages, including a set of multi-part forms within the Web page or pages. The Web pages enable loading locally stored images and designs. In either implementation, once each promotion, including incentives, is defined, it is loaded by the storing/access promotion information module 309 of the service provider process into database INCENT-DB 107.

Figure 19:
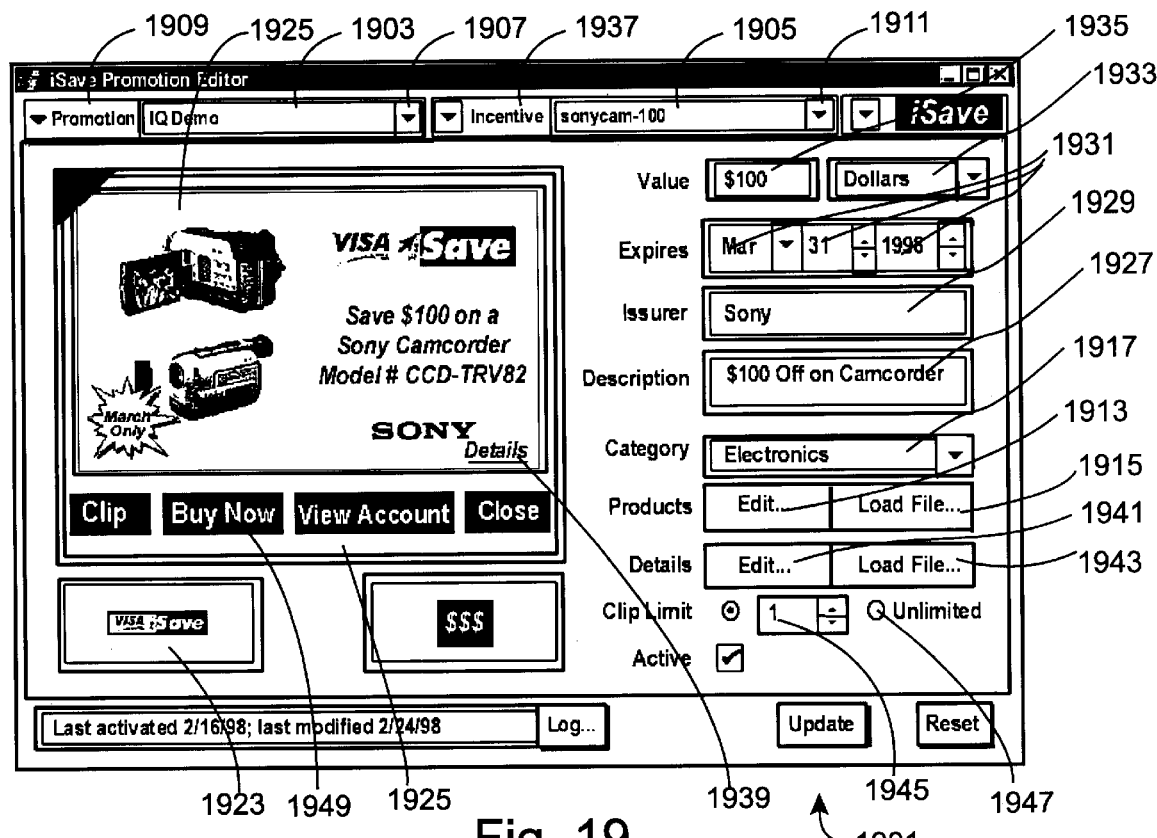
FIG. 19 shows an image of a screen from the promotion editor according to one embodiment of the invention.

FIG. 19 shows one screen 1901 that comes up on promotion author computer 113 when defining an incentive, in this case a discount coupon incentive. Each button/area in screen 1901 can be used for entering various parameters. For example, button 1909 shows that area 1903 is being used for the promotion name. When this button 1909 is selected, other possible uses of area 1903 appear.

Each incentive is defined by an incentive template which is stored in database INCENT-DB 107. The incentive template has characteristics preferably defined by one or more parameters, and the following are the parameters preferably included in an incentive for a discount coupon type of incentive. Note that not all parameters are defined for all types of incentives and for all incentives or a particular type. For example, the list of POSs is not used in one alternate embodiment. The description below will use the screens of process 305 both to describe the incentive template, and to describe how one defines an incentive using the promotion editing and viewing process 303:

Promotion. The name of the promotion for which the incentive applies. This is shown in window 1903. By clicking on button 1907 all the currently defined promotions in the system may be viewed and edited.

Incentive Name. The name of the incentive, in this case "sonycam–100", entered in area 1905. Previously defined incentives in this promotion may be selected either by entering their name in area 1905 or by clicking on button 1911.

ID Number. A number that uniquely identifies the incentive. In the preferred embodiment, the ID number is not explicitly set by the user, but is automatically determined by process PROMOEDIT. Note that the use of ID number in the implementation described herein is different from alternate systems that distribute the incentives in the form of individual electronic certificates, which in some cases may be printed, and which may carry a unique identifier ("unique certificate identifier"), for example to differentiate it from any other certificate of the same incentive. The incentive ID number as defined herein is the unique identifier of the incentive itself, and in an implementation in which uniquely identified electronic certificates were distributed, all the certificates of the same incentive would have the same ID Number, even though the unique certificate identifiers differ for each of these certificates. Note also that version numbers may be used with the incentive in order to keep track of the incentive as it changes over time. For example, the same incentive may be issued several times in different versions. The version number enables one to keep track of historical values of incentives, for example to determine what value a redeemer ought to receive. In the preferred embodiment, the version number is embedded in the ID number. Note that not all implementations need to sue a version number. Historical information may be recorded by noting the value of an incentive in the historical record.

Issuer. The identification of the manufacturer or supplier of the goods or services, entered in area 1929 in FIG. 19.

Product. A list of goods or services to which the incentive applies. In window 1901 this may be specified by clicking on button 1913 or alternatively a file of products may be specified by clicking on button 1915.

Product Category. The category of the product, for example, in the case of FIG. 19, "electronics", shown in area 1917. Examples of other categories include "mortgage services", "food, wine and sprits", etc.

Product Codes: lists of product codes (namespace/code pairs) are now optionally specified, depending on the needs of the specific incentive.

Description. The incentive description in words. In this case "$100 off a cap recorder" as shown in area 1927.

Details. (also called "Terms" in some implementations) The terms and conditions, if any, that describe the incentive (e.g., buy one product at a regular price to get the discount, buy another product to get the discount, etc.). The Details are entered either via a separate window that pops up when the "Details" button 1941 is clicked or by a preloaded file that may be specified by clicking on the details (load file) button 1943. Some of the details may be viewed by the member as part of displaying an incentive or by clicking on a link in the incentive artwork. The Details also includes the match criteria which includes one or more criteria that need to be met by the consumer in order to receive the redemption value.

Expiration Date. The date the offer expires. In window 1901 this is entered as a date in area 1931. In other windows, this may be a calculated date (e.g., two months after the regular priced purchase; Nov. 12, 1999, etc.)

Clip Limit. This may be a number (see Window 1945) or <unlimited> (see button 1947, and prevents a particular member user from using the incentive more than a certain number of times.

Figure 20:
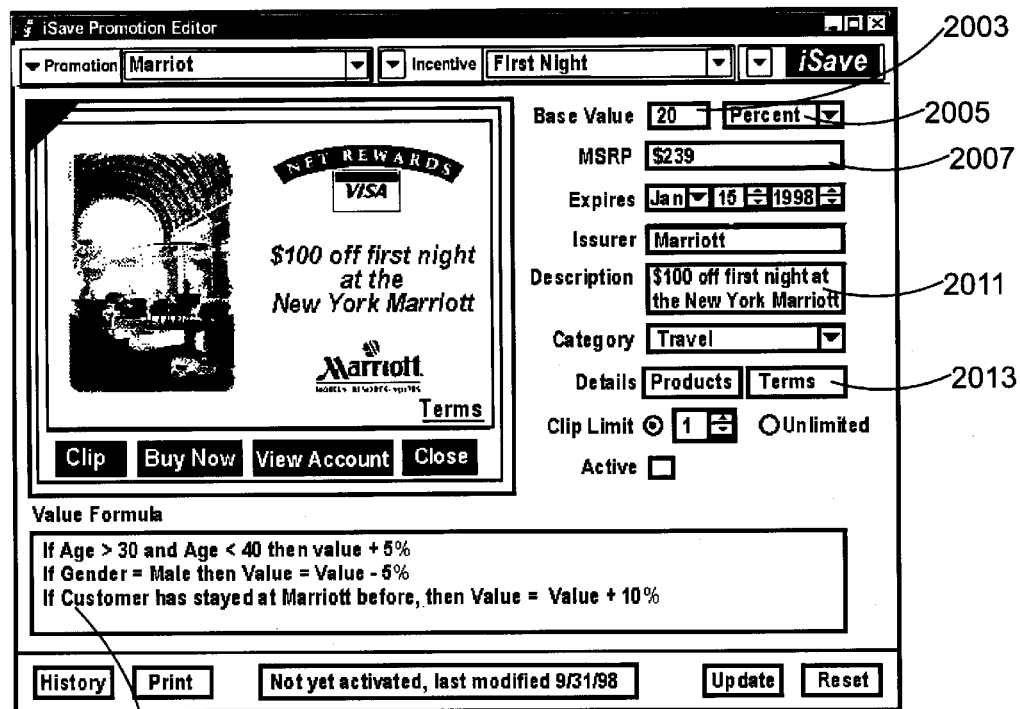
FIG. 20 shows another image of a screen from the promotion editor, this image of a screen for an adaptively determined incentive according to one embodiment of the invention.

Display Requirements. What consumer information (stated interests, demographics, membership in an external membership organization etc.,), if any, must be available before the incentive is displayed to the consumer. One of the aspects of the invention is the dynamic nature of the incentives. Not all incentives or even incentive icons will displayed to everyone. Also, a different version of the same base incentive, including using a different incentive icon or a different incentive artwork or both (see below), may be used according to the characteristics of the consumer. The window 1901 of FIG. 19 is for an incentive that does not include display requirements. Button 1937 can be used to define different types of incentives, including those that have display requirements. FIG. 20 shows another example of a promotion editor window, this time window 2001 is for an incentive that requires membership in an external membership organization for display. The external membership organization in this case is a credit card company sponsoring the promotion, and only members who also are holders of the credit card may view the incentive.

Clipping Requirements. What consumer information (stated interests, demographics, membership in an external membership organization etc.,), if any, must be available before the incentive may be clipped by a consumer. In general, a consumer needs to be a member of the system by having signed up with the account provider. Other optional requirements also may be defined, and these are separate from the display requirements.

View Icon Requirements. What consumer information (stated interests, demographics, membership in an external membership organization etc.,), if any, must be available before the incentive icon is shown to the consumer. One of the aspects of the invention is the dynamic nature of the incentives. Not all incentives or even incentive icons will displayed to anyone. Also, based on, for example, stated consumer interest, different icons may be displayed for different incentives. Also, a different version of the same base incentive icon may be used according to the characteristics of the consumer, including whether or not the consumer is a member or is a member of an external membership organization, and including where on the network the icon is being viewed. The same discount for the same goods/services may have a different icon when viewed at a different Web site. For example, the CIRCUIT CITY logo may be present when the incentive is viewed on the online site of merchant CIRCUIT CITY, while a different icon would appear when the incentive is viewed at a different location on the Web. Similarly, different incentives may appear for different consumers at the same Web site or for the same consumer at different Web sites.

Incentive Artwork. The audiovisual (text and images and possible sounds and movies) describing the incentive. This is shown in FIG. 19 in an area as image 1925. Some of the text may be from other fields, for example, the description. The artwork in the preferred embodiment includes action buttons such as "Clip", "Buy Now", "View Account", and "Close". Also, all the legal "fine print", for example, some of the legal terms and conditions from the "Details" part is included in this image 1925 as a hyperlink 1939 which causes a new window to appear in the consumer computer 115. Some incentives also may include a "Negotiate" button which starts a negotiation process for the value of the incentive according to an incentive negotiation formula as described below. In the preferred embodiment, the artwork is defined as HTML instructions. This permits for example, some areas to be determined from other parameters of the incentive template. For example the expiration date 1931 is used here to show a graphical expiration statement 1945. In one implementation, the artwork is a set of HTML instructions defining the artwork that appears on the consumer computer 115 in selected pages on the Web. In another implementation, the incentive artwork is a set of HTML instructions defining the artwork that appears only in response to some action by the consumer, for example, clicking on the incentive icon defined below. In some implementations, some aspects of the artwork also may be determined by the incentive formula described below. Also, some of the HTML instructions may include parameters obtained from the location where the consumer computer is viewing the incentive, so that the some characteristics of the artwork may be determined depending on where it is being viewed.

Incentive Icon. The audiovisual that appears on the consumer computer to identify existence of the incentive. In the preferred Internet embodiment, this typically is a graphic icon defined by some lines of HTML which are embedded in HTML definitions of pages at various sites on the Internet, or that are displayed when a consumer clicks on some general icon which is published at various sites on the Internet. (e.g., an account provider icon or other icon for the promotion situated at an incentive issuer's or an account provider's Web site, this general icon defined by HTML that generates the appropriate incentive icon HTML). In window 1901, the incentive icon is seen in area 1921. The icon may include a button, or may be a button. Normally, clicking on the icon causes the process DSPLY to display incentive artwork 1925 and other parameters to the consumer, preferably by running embedded JavaScript to open a window on the consumer computer's JavaScript enabled browser, and loading the window with HTML generated by a servlet running on the incentive information computer. Some aspects of the icon also may be determined by the incentive formula described below. Also, some of the HTML instructions may include parameters obtained from the location where the consumer computer is viewing the icon, so that some characteristics of the icon may be determined depending on where it is being viewed.

Account Provider Logo. Text and images describing the account provider, which may appear with the incentive artwork. This is shown as area 1923. It would be clear to those in the art that in some implementations, the service provider logo may also or alternatively be displayed with the incentive artwork. In some implementations, this also may be the HTML for the general icon that generated the Incentive icon. That is, all or part of the HTML that is published in the Internet and that causes the incentive icon to appear.

Value/Incentive Formula. The value of the incentive for a fixed value incentive, or the formula for determining the value in the case of an incentive whose value is adaptively determined. FIG. 19 shows a fixed value incentive, the value specified in areas 1933 and 1935. Note that the value for a discount may be a one or more of a dollar amount, a percentage, a good, a service, promotional points (e.g., airline club mileage), etc. and in window 1901 is determined by value type selection area 1933. FIG. 20 shows an example of a promotion editor window 2001 for an adaptively determined incentive. For such an incentive, the incentive formula is the formula for computing the adaptive incentive value and other parameters each time the incentive is presented (e.g., by displaying the incentive artwork in response to a consumer's clicking on an incentive icon). The formula determines the value as a function of the context—date, consumer ID, other characteristics of the consumer, etc. The formula is computed and updated adaptively according to who is displaying the incentive, the date/time, etc. For example, the value may change as the Expiration Date is approached. A syntax is defined for writing formulae. In the example shown in FIG. 20, the incentive is a discount. A base value is specified in areas 2003 and 2005. In order to determine a dollar value, the MSRP (manufacturers recommended retail price) is specified in area 2007. The incentive formula is entered in area 2009 according to a syntax. In this example, the base value is 20% off the first night's stay at a hotel, and the formula states that if the member is over 30 and under 40 years old, the value increases by 5 percentage points to 25% and if the member is male, than the value decreases by 5 percentage points. To promote loyalty, if the member is someone who has previously stayed a hotel of this hotel chain, than the base value increases by a further 10 percentage points. While the system of the preferred embodiment does not request such loyalty information from a member during sign up, such demographic data typically is available to the account provider through related businesses. For example, if the account provider is a credit card issuer, then such information as whether or not a member has stayed at a particular hotel chain is readily available. In alternate embodiments, more or less information may be obtained during sign up for membership. In addition, an aspect of the invention is collecting data about the purchase and pre-purchase behavior of consumers through the normal operation of the incentive system. In the preferred embodiment, all interactions with the incentive, such as the incentive views, clips, and redeems of a consumer for an incentive are recorded during operation. This might include, for example, recording dismissals of an incentive.

Note that in the formula syntax defined for this embodiment, "%" is percentage points when the incentive base value is a percentage, whereas when the base value is a dollar amount, "%" is a percentage. Any other formula syntax clearly may be used. Note also that FIG. 20 shows an incomplete screen. The Description (area 2011) is shown before completion. An old description is used and edited. In this case, the old description was for a $100 off coupon, and after editing it will say "xx % off First Night", where the actual percentage is adaptively determined according to the incentive formula in area 2009. Also note the "Details" button 2013. Recall also that in this example, the incentive also requires being a holder of the credit card of the credit card organization for viewing the incentive. Note that to accommodate a broad definition of value, a match criterion or match criteria also may be added, being a criterion or set of criteria under which the value will be generated. For a simple discount, the criterion is buy the good to receive the value (the discount). A broader criterion might be "Buy a number N of product X" or "purchase using credit card of brand B", or "purchase item X (or any item) at store S". Clearly the implementation described herein and in the Original Description accommodates these and other match criteria. The match criterion or criteria may be specified in the Details area and/or as part of the Incentive Formula. An additional aspect of the incentive formula are the inclusion, either explicitly or implicitly, of selection criteria. These are criteria that describe the suitability of the incentive for particular consumers. The match criteria are necessary conditions for redemption of an incentive and therefore any subset may be used as selection criteria, while selection criteria describe typical consumer characteristics of a consumer who might beneficially be presented with the incentive.

Incentive Negotiation Formula. The formula used for negotiating the value of an incentive for those incentives that are negotiable. The negotiation formula uses the same formula syntax as the incentive formula in the preferred embodiment. A negotiable incentive may be negotiated either by the artwork including a "Negotiate" button or other means for a member to inform the system that the member is willing to negotiate, or for some incentives, when the member tries to close an incentive either by pressing the "Close" button or by trying to otherwise close the incentive display window.

POS List. Includes a list of online points of sale (POS) which sell the product and a list of offline points of sale (POS) that sell the product. In one implementation such as shown in FIG. 10, the list of merchants is specified during incentive creation and authoring by clicking on the "Buy Now" button on the graphic during the editing process. The URLs and other necessary details of any online POSs are entered at this stage. Other features of the behavior that occurs after the "Buy Now" button is pressed also are entered during incentive creation and authoring by clicking on the "Buy Now" button on the graphic during the editing process. In an improved embodiment, the POS list is a list of points of sale that not only sell the product but also that presently have the product in stock. Of course, one can add improvements such as also displaying prices or the results of carrying out price comparisons using methods known in the art.

While the above incentive parameters are typical for a discount promotion, a discount promotion incentive may include fewer or more or different parameters, other incentives, for example those that provide sweepstakes, frequent flier program mileage, promotional points, premiums, free samples, or product tie-ins, may have fewer or more or different parameters as would be clear to one of ordinary skill in the art. Also, for example, the "point of sale" is the point of redemption in the case of an incentive whose match criterion or criteria is some action other than purchase, and the definition of POS used herein includes any point of redemption.

In the implementation in which PROMOEDIT is a stand alone program, the issuer runs a program that defines what the parameters are for that type of template, and then runs a program that defines the particular values of each the parameters. For some common template types, the issuer defining the type of template to use automatically runs a process which defines many of the parameters of the incentive. The issuer then defines the particular values of the parameters. The promotion editing and viewing process 303 communicates over the Internet with the service provider process (SRVPRVD), which registers the promotion and the incentives of the promotion in the incentive database (INCENT-DB).

In addition to the incentive template, the following information is kept in database INCENT-DB for each incentive Incentive History. Includes a historical log of the data recorded as a result of activities on that incentive. Such activities include who has displayed, clipped, and redeemed the incentive. Thus, each history entry stored in the incentive history includes the URL from which the event took place (if on the Internet), the time, and the member ID, and may include other relevant information.

Displaying An Incentive

Viewing Incentive Icons

Consumers find displays of the incentive icons (or icons that generate incentive icons) in a variety of places on the Internet: manufacturer Web sites where products are described: retailer Web sites where products are sold; affinity Web sites for special interests such as entertainment, sports or travel: ad banners on Web pages and e-mail. When a consumer turns to a Web page that contains an icon, process ICON__DSPLY is started, preferably by running JavaScript that is embedded on the page, or alternatively by an applet loaded from the service provider process, or by a JAVA servlet run as part of the service provider process. Which of these is used is dependent on the complexity of the icon, as would be clear to those of ordinary skill in the art. In the case of a servlet, the display of the incentive icon is implemented in the preferred embodiment by including a URL on the page on the Web where the icon is to be displayed, the URL pointing to the service provider Web site and used to retrieve the image displayed by the incentive icon. The URL points to a general purpose JAVA servlet, specifies that it wants the incentive's icon, and includes an argument with an identifier for the appropriate incentive. For example, http://iq.com/servlet/CouponServlet/icon?incentiveId=IQDemo´sonycam–100 which is for the simple case of a known value discount incentive. The JAVA servlet is run as part of the SRVPRVD process on the incentive information computer. The JAVA servlet may run a more complicated process to determine a different icon to display depending on where the icon is to be displayed, and possibly on who will be viewing the icon. This is the dynamic aspect of the incentive icon further described below. This mechanism also may be used to generate different icons for different consumers or at different locations. That is, as a mechanism for selecting incentives. The HTTP URL syntax for passing parameters may be used here in various ways. For example, the syntax http://path?name1=value1&name2=value2&name3=value3 . . .

where there can be such parameters, or one or more name= value pairs specified. Such additional parameters could be used to indicate such aspects as: specifiers of the overall size or layout of the icon display (e.g., width, height, "large", or "small", etc.); specifiers of the overall audiovisual style of the icon (e.g., "default", "ornate", or "Organization X", etc.). Where each of these names "default", "ornate", or "Organization X", refers to a named style. Organization X style, for example, might be set up for an external organization which is a client of the service, and whenever a viewer views this incentive on a site of this Organization X, this style might appear which includes some specific logo of the external organization. The use of HTTP also allows a script to be run which selects the appropriate parameters based on where on the Web the consumer is located.

In the case that a general icon for selecting and generating the incentive icon is published at the different locations rather than the incentive icon, the above described mechanism may be used to select the incentive, in particular the icon, for example, by selecting which incentive to use, and then selecting the icon and any parameters using the name= value pair mechanism. The selection criteria of incentives may be sued in this process.

For the example of an icon being displayed, FIG. 4 shows pseudocode for the View__Icon procedure 401 which is started on consumer computer from within process ICON__DSPLY.

A note on flowcharts and pseudocode may be in order here. While flowcharts have commonly been used to describe computer programs, procedures, and processes, many practitioners prefer using pseudocode for describing such procedures. Thus, while some of the methods described herein are done so with the aid of a flowchart, others are described in the text or described using pseudocode or both.

The View_Icon procedure 401 starts by accessing process SRVPRVD (the display incentive module 321 of FIG. 3) to get the incentive icon information from database INCENT-DB. SRVPRVD then determines if there are view icon requirements, such as membership, consumer characteristics, etc. That is, it determines if the icon is a dynamically determined icon. If not, the default icon is set and displayed. If yes, SRVPRVD asks the procedure to obtain the member ID by looking for a cookie on the consumer computer 115. If no cookie is present, that is, the member ID is not valid, then the default icon is set and displayed, If the member ID is valid, then the SRVPRVD process accesses the ACCTPRVD process on the account provider computer to get the member information from MMBR-DB. Such member information may include, for example, details of membership in some external membership organization, as well as other demographic information. Then procedure Get_Incentive_For_Member is run. This procedure, shown as 1601 in FIG. 16, executes the dynamic incentive selection algorithm to set the incentive icon or the associated incentive or both to a specific incentive icon or incentive or both, based on member information. The icon is then displayed. For all activities on incentives, the viewing of the icon, whether a member ID-dependent dynamically determined icon, or the default icon, is recorded by accessing SRVPRVD to record view icon event in INCENT-DB. What is recorded includes: incentive ID, date, URL, time, and the member ID if present. More or less information may be recorded in the incentive history in different embodiments. In some implementations, the viewing instance may also be recorded in the MMBR-DB.

Once the consumer views an incentive icon, the consumer may click on an incentive icon to pop up a description of the promotion, which may be an incentive to purchase a particular product, a sweepstakes entry, etc. As described above, in one embodiment what incentives icons appear on a screen is dynamically determined depending on the characteristics of the consumer if the consumer is a member of the system. Furthermore, as described below, when a consumer clicks on an incentive icon (which may be dynamically determined) to pop up a description of the promotion (again, which promotions are associated may be dynamically determined), the characteristics of the incentive such as the value (one or more of monetary value, discount amount, terms and conditions, etc.) or the type of incentive or both the type and the value are adaptively determined dependent on the characteristics of the consumer or to what match criteria hold or both.

What Happens when a Consumer Clicks on an Icon

When an incentive is displayed, either after a user clicks on an icon or when the incentive is included in the icon itself or as a direct online display, the characteristics of the incentive and the environment when the incentive is displayed is called an incentive instance. For example, an incentive instance includes the values the template takes on when displayed, time and date, the URL from which the incentive is displayed, and the member ID of the person displaying the incentive. Some of the characteristics of the incentive that define the instance are adaptively determined. That is, they are determined depending on one or more characteristics of the consumer. Others may only be determined when the consumer carries out certain actions, for example as defined by the match criterion or criteria. Note that incentive instance information such as the values the template takes on when displayed may be defined and stored various ways. On way is by storing the actual incentive parameter values. Another is by storing a reference to the incentive, including the incentive ID which includes the incentive version, and the necessary data on which any dynamically determined values are dependent.

Displaying may be the only action that ever happens when a consumer click on an icon. Alternatively, the consumer may optionally negotiate (if possible), the consumer may clip and further the consumer may optionally purchase the goods or service or otherwise redeem the incentive. That is, clicking on an incentive icon may do nothing more than provide an item of advertising, or may provide another incentive, saying for example, "Congratulations!

You have won Prize X!

Click here to retrieve Your Prize!"

So clicking may lead to more actions.

External Membership Organizations

In some situations, an external membership organization, for example, the American Automobile Association (AAA) or a particular credit card organization (members are defined as holders of the particular credit card), sponsors incentives that, in one case, have different icons than the same incentives viewed elsewhere, and/or in another case can only be viewed by members of the membership organization, and/or in some cases, can be viewed by anyone, but can only be clipped by a member of the external membership organization. The rules as to the icon and incentive displaying requirement and clipping requirements are defined as part of the incentive template. When an incentive is part of a promotion run by an external membership organization, an additional feature of the invention is the adding of members to the organization as part of running the promotion. This feature of validating membership in an external membership organization is implemented as part of the procedure Validate_External_Member_Info shown in FIG. 10 as 1010. The process operates as follows. A membership organization such as, for example, the American Automobile Association (AAA) sponsors incentives that can only be viewed (or can be viewed by anyone but can only be clipped) by members of the membership organization. When the consumer tried to views (or clip) such an incentive, if there is not a AAA account number in the MMBR.-DB for the consumer, the SRVPRVD process calls out to a process running, for example, on the AAA Web site to see if the consumer also is a member of the membership organization. If they are not a member of the membership organization, the membership organization has the opportunity to ask the consumer to sign up. When the sign up process is over, the membership organization process returns to the SRVPRVD code whether the consumer has become a member of the external organization or not. Thus, the advantage here is that the external membership organization has the opportunity of automatically signing up new members in the process of running a promotional campaign aimed at its members.

Viewing an Incentive

The incentive display process is a set of procedures for presenting (displaying the incentive artwork and other parameters) and optionally clipping an incentive which in the preferred embodiment are run on request once the incentive icon (typically a graphic icon or button on an HTML page) is clicked by a consumer. When a user clicks on an incentive icon, embedded JavaScript is run to cause a pop-up window of the incentive to appear. The JavaScript deals with the shape, location, size, etc., The actual contents of the window is HTML determined by a servlet running on the incentive information computer. One of the aspects of the present invention is such use of pop-up windows to display incentives and other information, such use not necessitating the member's leaving whatever page he or she was viewing on the browser on consumer computer 115. The contents of the window are obtained in the preferred embodiment from the same JAVA servlet that was used to determine the incentive icon, this time using a URL specifying that it wants the incentive rather then the icon, and identifying which incentive it wants. For example:

http://iq.com/servlet/CouponServlet/coupon?incentiveId=IQ-Demo˘sonycam−100.

Figure 2:
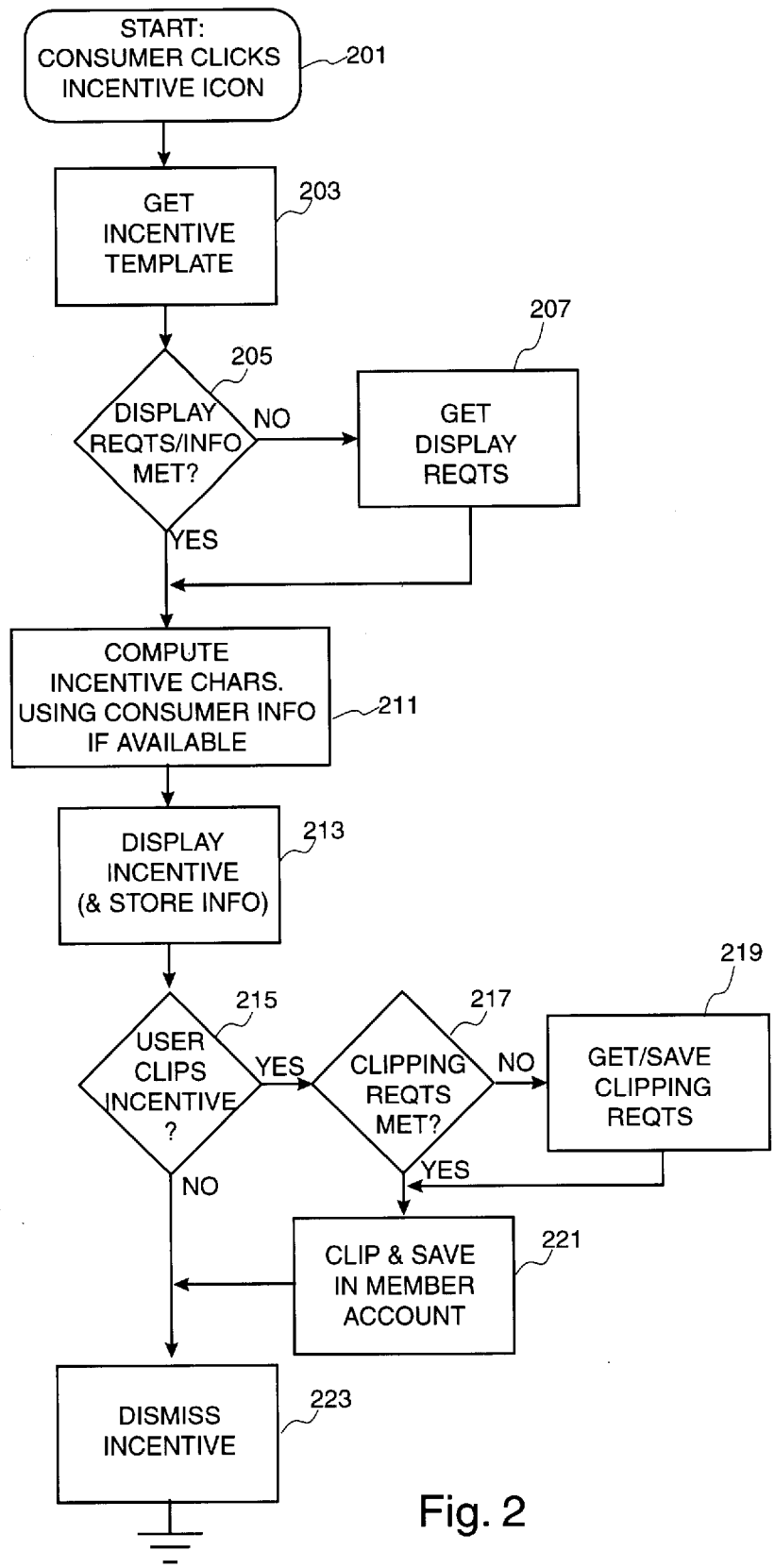
FIG. 2. shows the flowchart for the operation of process DSPLY for displaying an incentive on the consumer computer and for clipping the incentive.

One implementation of the incentive display process is included in FIG. 2 which shows a flowchart for the joint operation of the applicable modules of the account provider based consumer process 323 and of the service provider based consumer process 317 on consumer computer 115, modules of process SRVPRVD on the service provider computer (also called incentive information computer) 105, and process ACCTPRVD on the account provider computer (also called the member information computer) 109. The flow chart shows the preferred embodiment for displaying and possibly clipping an incentive in response to the consumer clicking on an icon. It is assumes at start time that the consumer has requested a display by clicking on the incentive icon. Step 201 indicates the start of the process DSPLY. Step 203 involves connecting to process SRVPRVD via the Internet and obtaining the display requirements and other incentive information from the incentive template. Step 205 then determines if the display requirements or consumer information dependency are met, and if not, the information needed for the display of the incentive and to determine the display, such as the display requirements, artwork, description, expiration data, account provider logo (or service provider logo), value, etc. which are obtained in step 207. As described below in the detailed description of the procedures involved, steps 205 or 207 may involve setting a flag to use the default incentive characteristics when sufficient consumer information is not available or the incentive is not dependent on consumer information or when a particular match criterion is not yet met. Also, steps 205 or 207 may involve indicating that display is not possible because the display requirements cannot be met. Step 211 now determines the incentive characteristics and includes process SRVPRVD executing the incentive formula, such execution including requesting the time and date from the system clock if these parameters are required for executing the incentive formula and giving as inputs to the formula all required items, such as the time/date, the consumer information (if any and if the use default flag from steps 205 or 207 is not set), the URL from which the consumer requested the incentive, etc., depending on the formula.

Once the value of the incentive is computed in step 211 (by process SRVPRVD), it is returned to process DISPL which displays it to the consumer in step 213. In addition, process SRVPRVD records the fact that the consumer has displayed the incentive in the incentive history log of the incentive entry in database INCENT-DB. In particular, what is stored includes: the identity of the consumer, the determined value of the incentive when displayed the by consumer, the location (e.g., URL) where the consumer displayed the incentive, and the incentive ID that identifies the incentive template.

The consumer then has the option of clipping the incentive for use at a later date (see step 215).

An implementation for steps 203, 205, 207, 211, and 213 is now described in detail by procedure View_Incentive shown as 501 in FIG. 5A and continuing as 503 in FIG. 5B. The SRVPRVD process 307 is first accessed to obtain the incentive template from INCENT-DB. It is then determined if there are display requirements for displaying the incentive, for example, a requirement for the consumer to disclose their age, or shopping habit, or a requirement for membership in an external membership organization. Note that there is a difference between a requirement and the dependency of some of the incentive display characteristics on information, for example, consumer information. In this implementation, if there are no requirements, then some incentive always is displayed with minimal intervention required of the consumer, while if there are requirements, membership always is required, and there are situations where a display is denied. In alternate implementations, different logic may be used, for example requiring a minimal sign-up for display even if there are no requirements described in the incentive template. Alternatively, in some implementations, the consumer is automatically signed up as a member whenever an incentive is viewed.

In procedure steps 501 of FIG. 5A, if the incentive has no display requirements, then it is determined if the incentive display (e.g., the formula) does or does not take any consumer information into account. If not, then the default incentive characteristics are used. Otherwise, the procedure checks if the consumer is a member preferably by looking for the presence of a cookie on consumer computer 115. As would be clear to one of ordinary skill in the art, using cookies is one of many possible means that can be used to determine membership. If the consumer is not a member, then the default incentive characteristics are used, this including using the base value of any formula that may be used to determine the value of the incentive. If the user is a member, then the member ID is used, and the ACCTPRVD process is accessed to obtain the required membership information from the database MMBR-DB 111. A check is made to make sure all the member information for characterizing the display is available. If not, the default incentive characteristics are used. Otherwise, the incentive characteristics such as applying the incentive formula, etc., are adaptively computed and procedure continues (see FIG. 5B) by displaying the incentive for the user.

Referring now to steps 502 in FIG. 2, if there are some requirements for display, for example, an external membership requirement, or a requirement to disclose a demographic piece of information, or a check made on one or more particular pieces of demographic information, the procedure obtains the member ID and stored member information (including, if necessary, signing up a non-member) by calling on procedure Get_Member_ID shown as 701 in FIG. 7.

Get_Member_ID first checks if the consumer is a member by looking for the presence of a cookie on consumer computer 115. If the consumer is a valid member (indicated by a valid cookie present), then the ACCTPRVD process is accessed to obtain the member information from database MMBR-DB. Otherwise, procedure Sign_On shown as 801 in FIG. 8 is called to enroll the new member.

In the implementation described herein, Sign_On causes a sign-on screen to pop-up on computer 115, the pop-up screen asking the consumer for membership information, including the member's account name and preferably an e-mail address and a password. In the preferred embodiment, the screen also has a link to indicate if the consumer is already a member of the service, and also a FAQ ("frequently asked questions") hyperlink describing the service, including the service's privacy and security policy. An example of such a sign-up pop-up screen is shown in FIG. 22. This example includes hyperlink 2213 to indicate membership, areas 2206, 2207, and 2209 to indicate the name and e-mail address, and two areas 2203 and 2205 to indicate the password twice. A FAQ hyperlink 2215 also is shown. The particular example of FIG. 22 is for incentives sponsored by a credit card external membership organization, and space 2211 is provided for the member or potential new member to indicate membership in this external membership organization. Note that in any of the procedures described herein, when any information is collected from the consumer, the particular part of the process loops until either valid information has been entered or the user exits. For example, in the Sign on procedure 801, if the consumer is a member of the service and the consumer clicks on the member hyperlink 2213, the process loops until the consumer either enters a valid account name and password or exits.

In Sign_On, if the consumer indicates he or she is not a member, for example, by the consumer clicking the "finish" button, more information is requested from the user by opening a dialog and providing information Two examples of such a dialog are shown in FIGS. 23 and 24. Not shown in these screens is the fact that both Smiths also hold a credit card in the credit card external membership organization. Once the member information is entered, an account is set up for the member, the ACCTPRVD process is accessed to assign a member ID and to store the member information in MMBR-DB. The member ID is sent from MMBR-DB, and a cookie is written in consumer computer 115.

At the conclusion of the sign up process, in the preferred embodiment, a confirmation screen pops up on consumer computer 115 to confirm membership sign-up has been successful. FIG. 27 shows such a sign-up confirmation screen 2701.

Alternate implementations may automatically sign-up a consumer if he or she is not yet a member and place a cookie in the consumer computer 115. More information may later be requested if it is required now or at some other point, for example to determine the incentive value or some other characteristics of the incentive.

Back to procedure Get_Member_ID (FIG. 7), once the member is signed on, the member ID is obtained from the cookie in the member computer. If there is no valid cookie, an error message is displayed, otherwise the ACCTPRVD process is accessed to assign a member ID and to store the member information in MMBR-DB.

Back in procedure View_Incentive (FIG. 5B), once the member information from database MMBR-DB is obtained, it is checked for sufficiency. The particular incentive may require a demographic characteristic not normally stored in the member database MMBR-DB 111, including, for example, a requirement to be a member of an external membership organization. If some such information is missing, a procedure Get_Required_Member_Info is run. Get_Required_Member_Info procedure 901 is described in FIG. 9, and includes asking the member for the required information. Some information, for example, checking membership in an external membership organization, requires external validation. For each such piece of information requiring external validation, the Validate_External_Member_Info procedure shown as 1001 in FIG. 10 is called to get external validation. Process SRVPRVD is accessed to get an external validation process from INCENT-DB to run locally, the external validation process for validating the external member information. The external validation process is then run to validate the external membership information and to get the expiration date for the external membership. For some incentive designs, this allows for the membership organization to sign-up new members in the external membership organization, as described above. If the external membership information is valid, ACCTPRVD is accessed and the external membership information and expiration date are stored in MMBR-DB. The next time the member tries to display or otherwise interact with an incentive with such external membership validation required for display, the external membership information would be readily available.

Note that while the preferred embodiment obtains the consumer information needed to meet the viewing requirements (and view icon requirements, and clip requirements, and the parameters of any incentive formulae), in an improved embodiment, rather than this information being only obtained from MMBR-DB, the account provider system may obtain the information from a third party, for example a point of sale, or a company whose business it is to collect and provide data on consumers, such a credit bureau, or specialty consumer profiling companies such as Engage Technologies, Inc., of Andover, Mass. (www.engage.com) and Net perceptions, Inc., of Eden Prairie, Minn. (www.netperception.com).

Back in procedure View_Incentive (FIG. 5), a check is made to see if some of the required-for-display member information still is missing. If so, it is now determined if the still missing requirement is a "hard" or a "soft" requirement. The requirement is called soft if the action still is permitted when some information still is missing. In some cases the action only will be possible in a limited way. For example, not all the information of the incentive formula may be available, or the view may not include a membership organization's logo. If the missing requirement is soft then the incentive characteristics are set to the default characteristics available without such information. Otherwise, for a missing hard requirement, an "Unable to View Incentive" message is displayed to the consumer and the procedure exits. When all the information is available, the incentive characteristics such as applying the incentive formula to determine the value and if adaptive, the audiovisual appearance of the incentive are adaptively computed and the incentive is displayed for the user.

Once the incentive is displayed (whether a default incentive or an adaptively determined incentive), the SRVPRVD process 307 is accessed to record the view event in the incentive history log for the incentive in database INCENT-DB 107. In particular, the incentive ID, an indicator of the displayed value, the expiration date, the URL (Web page) where viewed, the time, and, if a member ID is present (i.e., the incentive needed membership, for example because it was adaptively determined), the member ID are recorded. The indicator of the displayed value of the incentive in one implementation is the value of the incentive, and in another is the version number of the incentive or a pointer to the version of the incentive. The key here is to be able to recreate a historical record in the case that incentives change over time. More or fewer parameters of the incentive instance are recorded in the incentive history part of database INCENT-DB 107. Note that in alternate embodiments, this information may be stored in the member database.

When an incentive is displayed, the user has several options of interacting with the particular incentive, including, for example, buying (the "Buy Now" button) or clipping (the "Clip" button) or dismissing the incentive (the "Close" button). The member also may view his or her other clipped or redeemed incentives) the "View Account" button, or may ask to view other incentives (the "Everywhere" button.) For negotiable incentives, a "Negotiate" button also may be viewed and clicked for the consumer to try and negotiate to change the value of the incentive. Not all incentives have all buttons, and the implementation is part of the creative design of the artwork.

Alternatively, when the member tries to dismiss an incentive after viewing, a pop-up window may appear into which the service provider process may send a negotiation dialog to negotiate with the user by offering better terms or additional incentives. In other implementation, a pop-up window may appear to conduct some other kind of dialog with the consumer.

All actions by the user may such as interactions with any of these buttons, and even how long it takes a user to react to being presented with the incentive are, in an improved embodiment, recorded.

An example of an incentive display 2101 for a discount incentive is shown in FIG. 21. This corresponds to the incentive template of the example illustrated in FIG. 19, which is a fixed value ($100) discount incentive. The artwork 1925 previously defined provides for the four buttons: Clip button 2103, Buy Now button 2105, View Account button 2107 and Close button 2109, as well as the Details hyperlink 2111.

Two more examples of an incentive display are shown in FIGS. 25 and 26 for the incentive described herein above and shown in FIG. 20. This is an adaptively determined incentive with a display requirement of membership in an external (credit card) membership organization. Consider two examples of hypothetical members whose sign-up information screens are shown in FIGS. 23 and 24, respectively. Recall that Helen Smith (FIG. 23) and Janet Smith (FIG. 24) also both hold a credit card in the credit card external membership organization. Suppose that Janet Smith also has previously stayed at a hotel of the hotel chain that issued this incentive, and that Janet Smith used the particular credit card when staying at the hotel. FIG. 25 shows the display of the incentive as it would appear for Helen Smith (FIG. 23) who is a member. The value is shown as 20%. This is obtained by applying the incentive formula (2009 in FIG. 20). The age does not warrant an extra 5 percentage points, and the gender leaves the value unchanged. While Helen Smith is a member of the incentives service and also the external membership organization, there is no record that she has previously stayed at the particular hotel chain's hotel. Thus the value remains the base value of 20% off the standard price. FIG. 25 shows the display of the incentive as it would appear for Janet Smith (FIG. 25) who meets the age criterion for an extra 5 percentage points and, as determined during running the Validate_External_Member_Info procedure (1001 in FIG. 10), also has stayed at the required hotel to qualify for an extra ten percentage points. The validation in this case would involve looking up the external membership record (credit card records) that show Janet Smith's having previously charges a stay at that hotel to the credit card.

Negotiating an Incentive

Another aspect of the invention is a provision to enable a consumer to negotiate some of the characteristics of an incentive. Some incentives also may include a "Negotiate" button which starts a negotiation process for the value of the incentive according to an incentive negotiation formula as described above. FIG. 28 shows a displayed version 2801 of an incentive similar to that shown in FIG. 20, but with an additional "Negotiate" button 2803. With such a display, when the consumer clicks on the Negotiate button 2803, the DSPLY process calls on procedure Negotiate shown as 1801 in FIG. 18 to further negotiate the incentive. Other means may be used to indicate to the system to start a negotiation, including other explicit means for the consumer to inform the system, and also, for incentives so designed, when the consumer tries to close the incentive display. In such a system, attempting to close the display, causes procedure Close_Incentive shown as 1701 in FIG. 17 to be called. Procedure Close_Incentive first closes the incentive and then, if the incentive is further negotiable, displayed an "I'll negotiate" message asking the consumer if he or she is willing to negotiate. If the consumer indicates willingness, procedure Negotiate (FIG. 18) is called. Negotiate thus is called from Close_Window or by pressing the "Negotiate" button that may exists on an incentive display. The negotiation procedure Negotiate also is called recursively until no further negotiation is allowed for. Thus, referring to FIG. 18, procedure Negotiate starts by checking if the incentive is further negotiable. If yes, the incentive characteristics then are modified based on the incentive negotiation formula. The new incentive then is displayed. If no further negotiation is possible, the procedure displays a "Not further negotiable" message.

Clipping an Incentive

The following description is geared to the clipping of a discount incentive, for example, by clicking the "clip" button 2103 shown in incentive display 2101 for the discount incentive shown in FIG. 21. For other types of incentives, e.g., a sweepstakes, changes would need to be made to the flow chart and procedures described herein below. For example, promotional points may be given, or a number of tickets in a sweepstakes may be entered on behalf of the consumer. How to make the necessary changes to the modules described herein to accommodate different types of incentives would be straightforward for one of ordinary skill in the art.

In general, the buttons on the incentive display point to a URL of the appropriate servlet in the incentive information computer. For example, the Clip button may use the URL:

http://iq.com/servlet/CouponServlet/clip

No parameters identifying the incentive are needed in this case because the system knows within which incentive it is operating.

Referring again to FIG. 2, if after the incentive is displayed, the consumer, in step 215 decides to make use of the incentive for a future purchase, the consumer starts to "clip" the incentive, preferably by clicking on a button (also part of step 215). Several things happen after the consumer starts the process of clipping the incentive. Process DISPL communicates the consumer information to process SRVPRVD. Any clipping requirements are examined in step 217, and if not met, such requirements are obtained and saved in step 219. This step 219 may include obtaining both required and optional information from the consumer. After all the clipping requirement information is obtained from the consumer, in step 221, process DSPLY communicates the clipping to process SRVPRVD, and process SRVPRVD in turn transmits a copy of the clipped incentive to the account provider ACCTPRVD process which records the clipped incentive in the ACCNT-DB part of MMBR-DB database 111. Thus, in the preferred embodiment, the full information for each clipped incentive is stored in the consumer's incentive account which resides in the MMBR-DB database.

Note that in some alternate implementations, this information may be stored also in other locations, for example, on behalf of merchants. In the preferred embodiment, upon completion of the clipping process, also in step 221, process DISPL communicates to process SRVPRVD, and SRVPRVD records some data of the incentive clipping instance in the incentive history log for this incentive in database INCENT-DB. The instance includes an indicator of the value of the incentive which in one implementation is the value of the incentive, and in another is the version number of the incentive or a pointer to the version of the incentive. The key here is to be able to recreate a historical record in the case that incentives change over time.

An implementation of the clipping part of the flowchart of FIG. 2 is now described in more detail with the aid of the pseudocode procedure Clip_Incentive shown as 601 in FIG. 6. In the preferred embodiment, membership is required to clip an incentive. Thus, as a first step, the member ID and the member information that may be required to meet the clipping requirements for the incentive are obtained by calling procedure Get_Member_ID shown as 701 in FIG. 7 and described herein above. This information is now checked for sufficiency. The particular incentive may require a demographic characteristic not normally stored in the member database MMBR-DB 111, including, for example, a requirement to be a member of an external membership organization, before clipping is possible. If some such information is missing, the hereinabove described procedure Get_Required_Member_Info (FIG. 9) is run, and this includes asking the member for the required information, and possibly externally validating the information. A check is then made to see if some of the required-for-clipping member information still is missing. If so, it is now determined if the still missing requirement is a "hard" or a "soft" requirement. Like the display requirement, a clipping requirement is called soft if the clipping still is permitted when some information to meet that information still is missing. If the missing requirement is hard then an "Unable to Clip Incentive" message is displayed to the consumer and the procedure exits. Otherwise the procedure proceeds with clipping. A copy of the clipped incentive is sent via process SRVPRVD to the account provider ACCTPRVD process which records the clipped incentive in the ACCNT-DB part if MMBR-DB database 111. Process SRVPRVD also records some data of the incentive clipping instance in the incentive history log for this incentive in database INCENT-DB. In particular, the incentive ID, the incentive value as clipped, the expiration date, the URL, the time and date, and the member ID are recorded. More or fewer items of information may be stored.

Once the clipping is complete, in the preferred embodiment, a confirmation screen pops up showing the member the clipped incentive. FIG. 29 shows such a screen 2901. Pop-up screen 2901 also includes a View Account button 2903 and Close button 2905.

From time to time, the service provider can transmit targeted information to members about the incentives they have clipped, for example by sending e-mail or making a telephone call, or sending postal mail to the members. This information also may be displayed to a member whenever the member accesses certain Web pages, for example related to the member's account on the incentive system. The information also may be displayed to the user whenever the member requests viewing an incentive or whenever the member clips an incentive or whenever a member clicks on a general icon. The targeted information on a clipped incentive typically includes that the incentive may expire soon, that there are new related incentives (e.g., other incentives in the same category), etc. The targeted information may also be that the value of the incentive has changed, for example as a result of approaching the Expiration Date.

Note that the targeting described herein also may be used to target new incentives to consumers. That is, HTML is published in various locations that includes the URL of a servlet that selects one or more incentives and displays the incentive icons according to one or more characteristics of the consumer. This may include, for example, using the selection criteria of incentives. For example, a Web page may retrieve and display an incentive icon for men's clothing when the member is a male and for women's clothing when the member is a female.

For alternate types of incentives, for example, for a sweepstakes, the display and clipping may take a different form. For example, when a consumer requests display of a sweepstakes incentive, the incentive artwork with application of the incentive formula may take the form of a display that states "Congratulations! You have won this 25 inch TV" with a picture of a television receiver and a button that states "Click here to acknowledge winning". Clicking on that button would then be the "clipping" activity. In such a case no further redemption of the incentive would be required, whereas with a discount, a redemption of the discount would need to take place for the consumer to get the complete benefit. Similarly, as another example, when the consumer requests display of a sweepstakes incentive, the display might state "Congratulations! You have just been awarded 25 new entries in our sweepstakes" with button that states "Click here to accept". Again, no further redemption is required.

In the preferred embodiment, for security reasons, only the service provider and the member have access to clipped incentives (see the "Security Aspects of the Invention" section herein below). In an alternate embodiment, whenever any incentive is clipped, upon being clipped, a copy of the clipped incentive (as an Incentive-ID or other sufficient information to enable a merchant to match an incentive and a member) is transmitted (pushed) to each of the online merchants in the online merchant list in the incentive template via the Internet. The incentive template in database INCENT-DB has previously been loaded with a list of offline points of sale which stock the product. For offline merchants, again, in an alternate embodiment, each offline point of sale periodically contacts the service provider by dialing into process SRVPRVD via the Internet or by some other external means, for example, by using a modem and telephone line. The POS then accesses INCENT-DB to determine download the incentive Ids of the clipped incentives for products the offline POS stocks. These determined incentives IDs are then downloaded.

Viewing Account Information

In the preferred embodiment, there are two ways for a member to be able to view his or her account. The first is by pressing the "View Account" button that may exist on some of the screens during the display, clipping, negotiation, clipping confirmation, sign-up confirmation, etc., according to the particular design used in the HTML pages and screens. The second account viewing procedure is accomplished by accessing the Web site of the service provider.

FIG. 11 shows an embodiment 1101 of the first method in the form of procedure View_Account which may be initiated by the URL on the button to access the appropriate servlet, for example, http://iq.com/servlet/CouponServlet/viewAccount.

View_Account starts by calling the above described procedure Get_Member_ID to which get the member ID from the cookie or from signing on a member. Unless the member ID is not valid, in which case an "Unable to View Account" message is displayed, the procedure accesses process ACCTPRVD to get the contents of the member account from the ACCNT-DB part of MMBR-DB database 111. A pop-up window appears (implemented using a JavaScript script), and the member's information (from the history of clipped incentivesfield in the preferred embodiment). The use pop-up window aspect of the invention enables the user to view the account without being moved from whatever place the member was on the Web browser on consumer computer 115. Once the display occurs, the ACCTDB part of MMBR-DB is accessed, the view account action, like all actions, is recorded. In particular, the Incentive ID from where viewed, the URL where viewed, and the date/time are recorded.

FIG. 30 shows such a pop-up window display of an account, the pop-up generated by the member having clicked the View Account button on an incentive. Note that several buttons are available, including viewing more clipped incentives by clicking on the More button 3003. Also, for any clipped incentive, an icon and a hyperlink are provided to enable the member to transfer to the Buy Now procedure for a particular merchant of the goods or services. For example, icons 3004 and 3006 and respective hyperlinks 3005 and 3007 in FIG. 30. The use of a general markup language (such as HTML or XML) aspect of the invention enables such features to be easily added.

Figure 31:
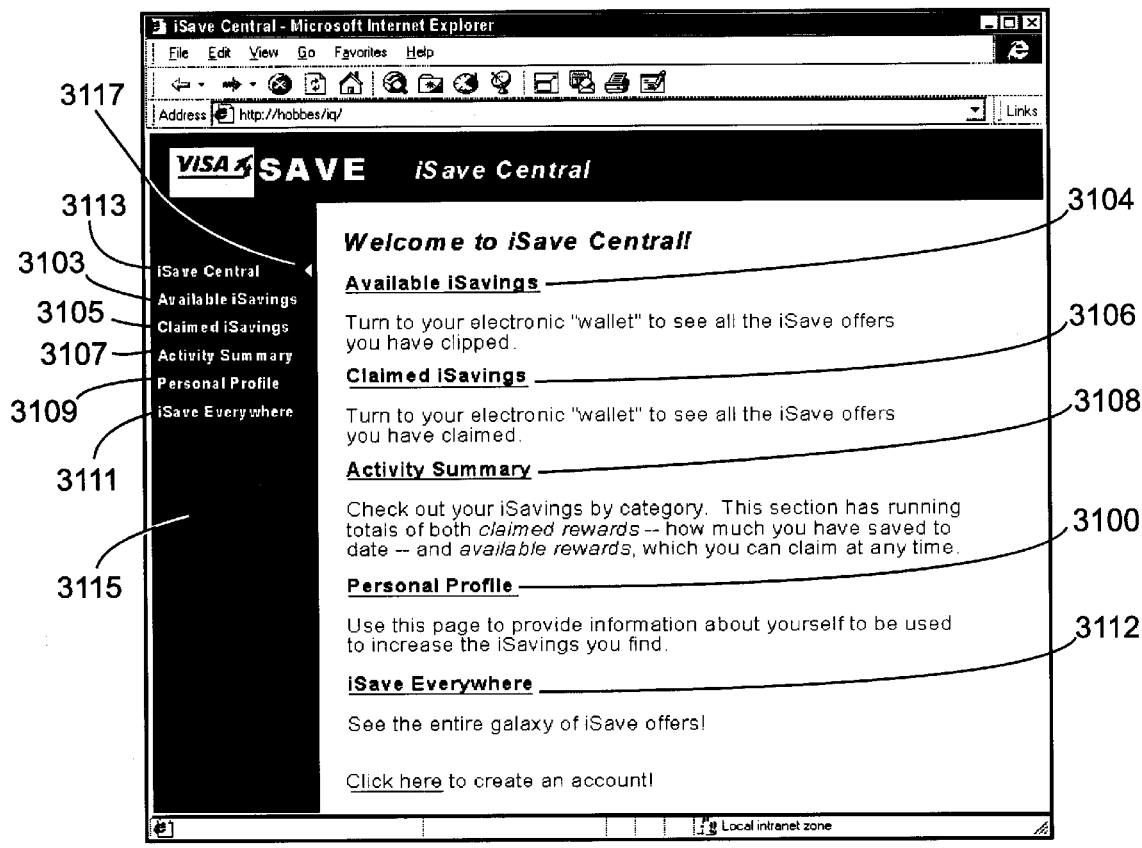
FIG. 31 shows an image of an account page accessed via the service provider site according to one embodiment of the invention.
Figure 32:
FIG. 32 shows a pop-up log-on screen according to one embodiment of the invention.

In the second method, a member has access to the MMBR-DB information kept on the member information computer 109 and available for viewing by the member via the service provider site using a standard Web browser. Under such access, a member first goes to the service provider's home page and asks to view the accounts page. FIG. 31 shows an example 3101 of such an accounts Web page. When the member accesses such a page, the cookie (if present) is sent and then after the member ID is verified, procedure View_Member_Account_Page shown as 1201 in FIG. 12 is called to record the URL from which the member is viewing the account in the member's entry in the MMBR-DR part of database MMBR-DB 111. If the user does not have a valid member ID or no cookie, the user is asked to log on whenever he or she tries to access any account information. This log-on is accomplished by a pop-up window such as shown in FIG. 32 as window 3201. The member now enters the account e-mail address as an identifier (Other identifiers may alternatively or additionally be used) and the password. The service provider now accesses the ACCNTPRVD process to verify membership by examining database MMBR-DB 111. Once membership is established, a cookie is stored in consumer computer 115 and full access is enabled. In some implementations, a procedure similar to Sign_On (FIG. 8) or Get_Member_ID (FIG. 7) alternatively may be run to enable non-members to sign on.

Figure 33:
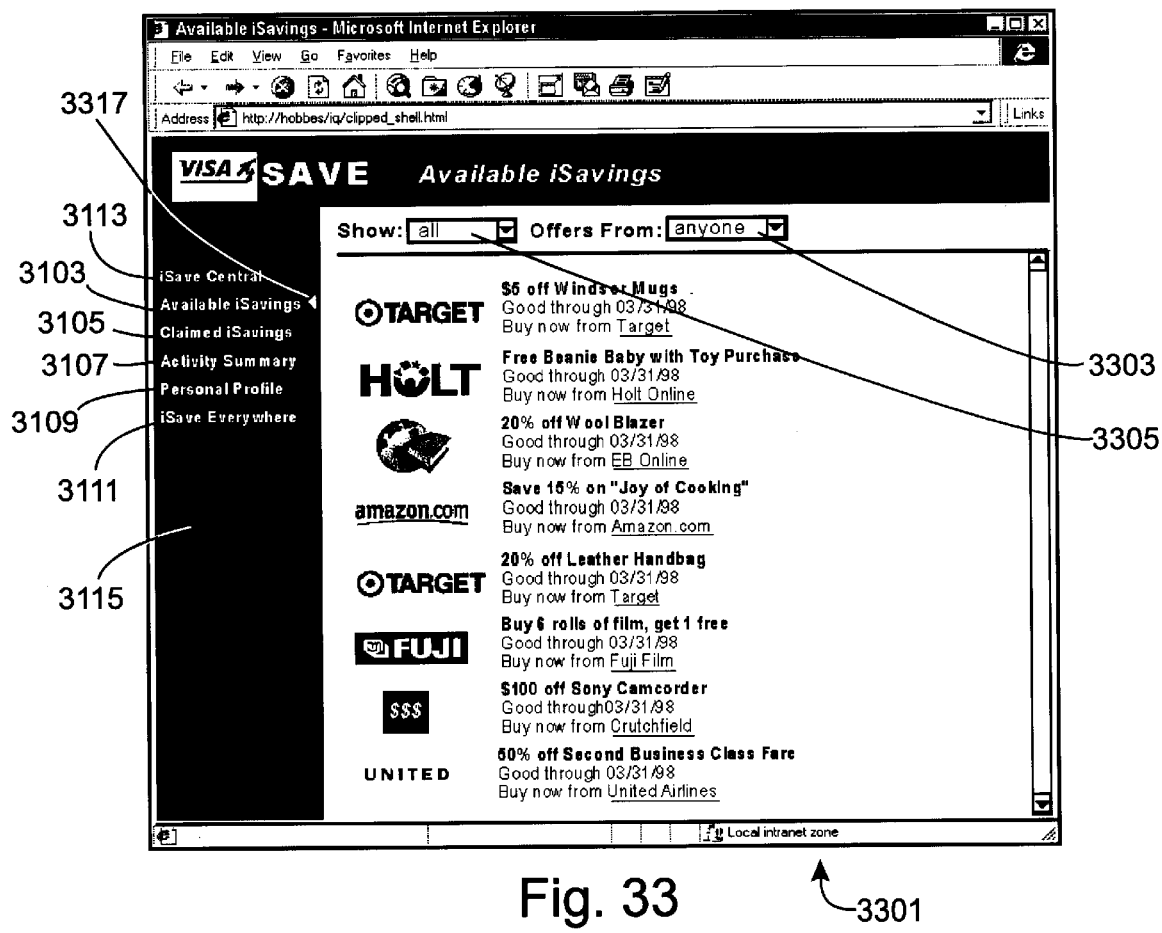
FIG. 33 shows an image of a screen displaying a member's clipped incentives as accessed via the service provider site according to one embodiment of the invention.
Figure 34:
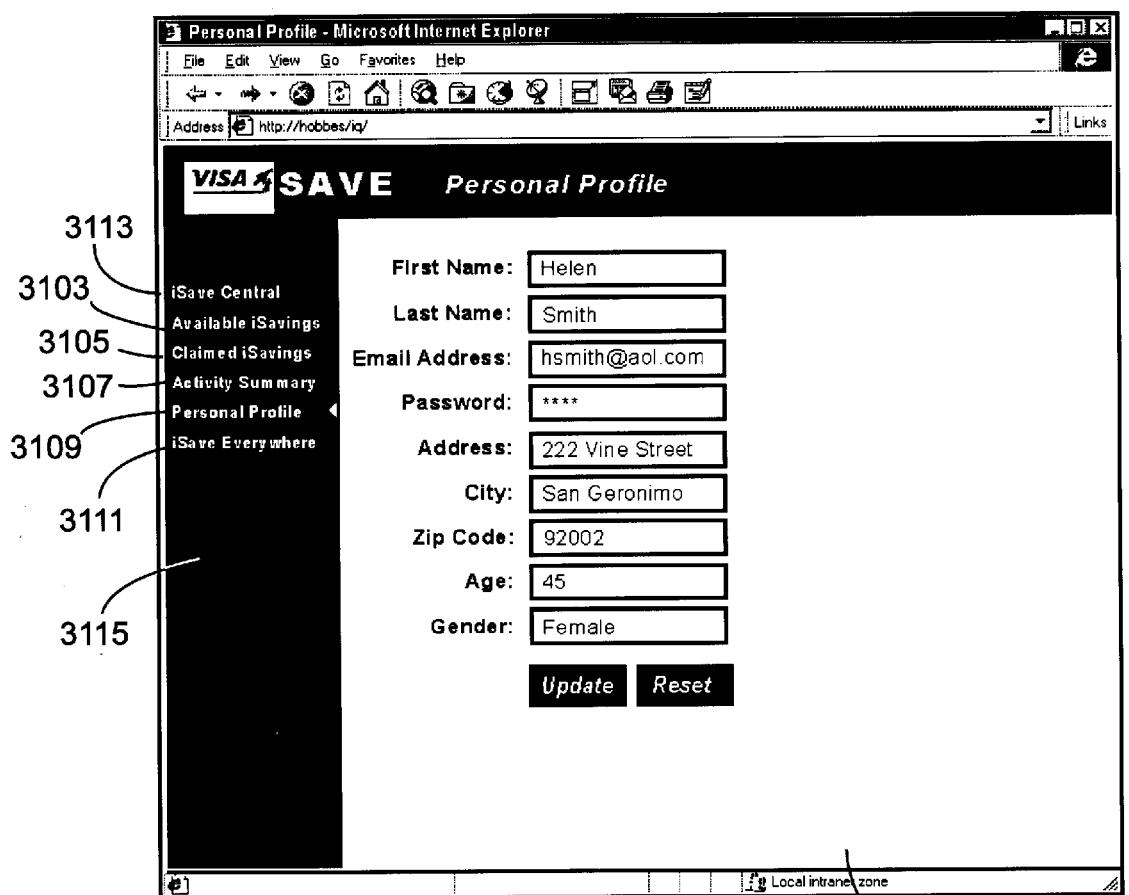
FIG. 34 shows an image of a personal profile page as accessed via the service provider site according to one embodiment of the invention.
Figure 35:
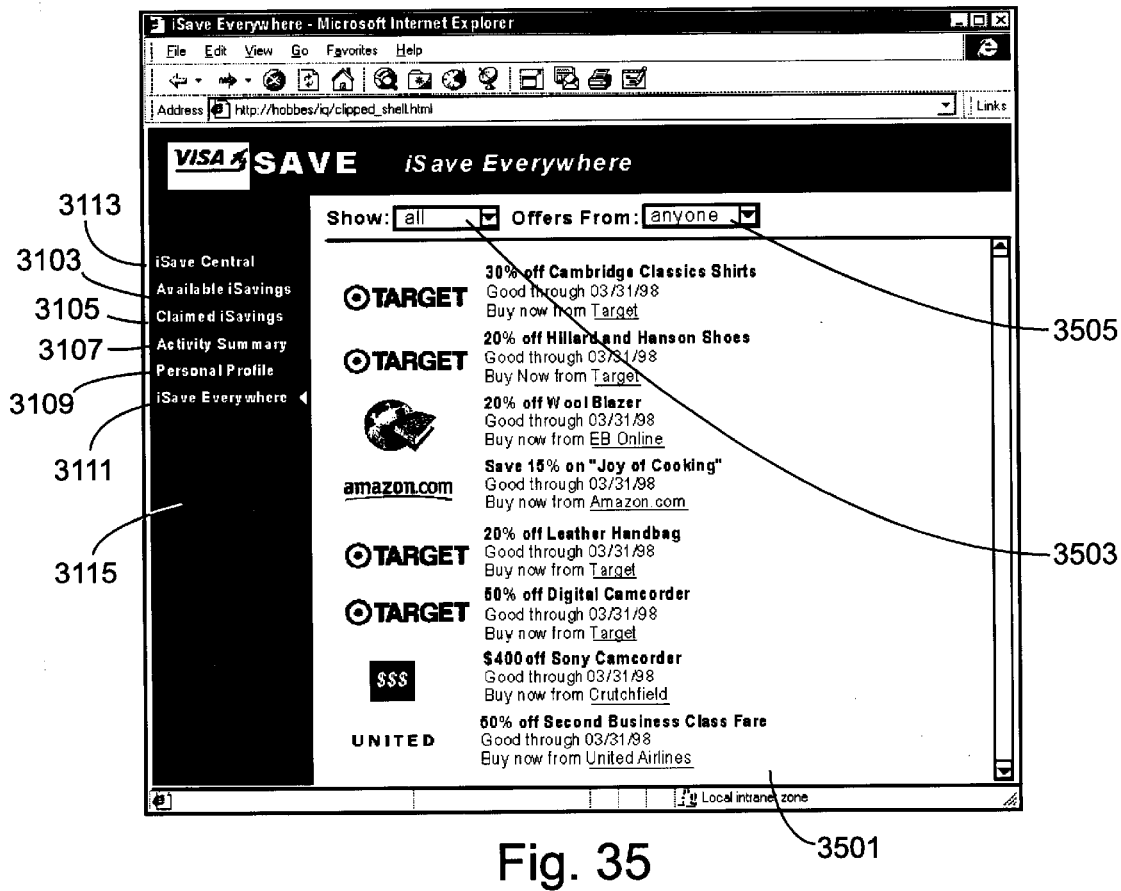
FIG. 35 shows an image of a summary of all available incentives as accessed via the service provider site according to one embodiment of the invention.
Figure 36:
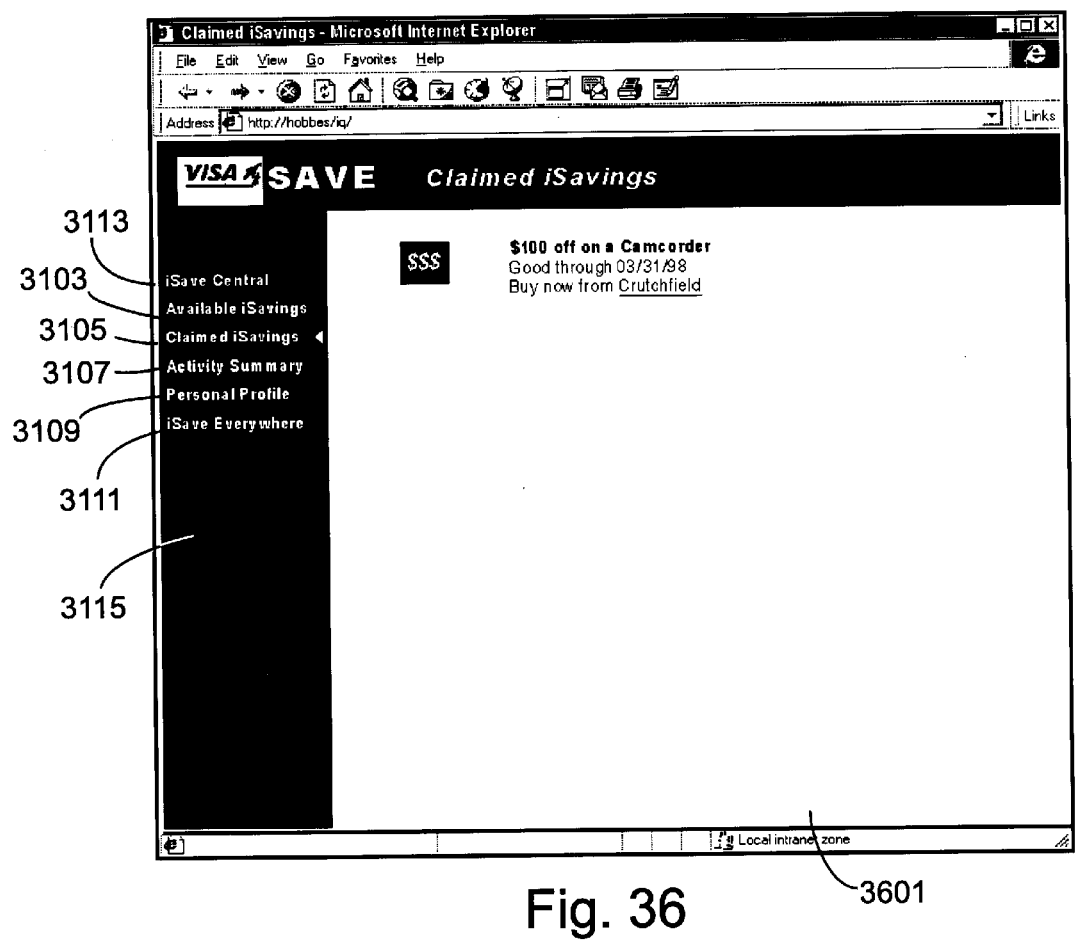
FIG. 36 shows an view of a member's redeemed incentives as accessed via the service provider site according to one embodiment of the invention.

A confirmed member may access various parts of the system. In the example of FIG. 31, the member may go to a page showing all the member's clipped incentives by pressing icon 3103 or hyperlink 3104. An example of such a page is shown as 3301 in FIG. 33. In this particular example areas 3303 and 3305 permit the member to restrict the display to particular types of offers, for example in particular categories, and also to particular merchants. Many designs are possible. Note that on any of the pages displayed, area 3115 always appears. This enables the user to choose any option without needing to go back to the main page shown in FIG. 31. An additional icon, shown as 3117 in FIG. 31 and 3317 in FIG. 33, shows what the member currently is viewing. Thus, referring to FIG. 33, a member may now choose to edit the personal profile by clicking on the "Personal Profile" icon 3109. (also possible by clicking the hyperlink 3110 from screen 3101 in FIG. 31). In such a case, a personal profile window appears on the page. An example of a personal profile page 3401 is shown in FIG. 34. A member is able to change any aspect of his or her personal profile by viewing and modifying such a page. In the preferred embodiment a member (and for some icons, non-members, depending on the display requirements of the icons) may view all the incentives available on the system (all the incentives sponsored by this particular promotion sponsor) by either clicking in area 3115 on the "View All Incentives" icon 3111, or from the main page by clicking on the corresponding hyperlink 3112 (FIG. 31). Area 3501 in FIG. 35 shows such a display of all incentives available to this particular member or non-member. Areas 3503 and 3505 may be used to select categories of incentives and/or incentives available from particular vendors similar to the mechanism shown in the clipped incentives display of FIG. 33. In addition, a consumer may view all incentives that have been redeemed, either by clicking on icon 3105 in 3115 in any of the windows for this account, or by clicking on the corresponding hyperlink 3106 on the main page, area 3101 shown in FIG. 31. FIG. 36 shows in area 3601 an example of the redeemed incentives for this particular member. In addition, a member may view a summary of all his or her activities by clicking on icon 3107 in area 3115 in any of the account windows or by clicking on the corresponding hyperlink 3108 in area 3101 on the main account window shown in FIG. 31. By clicking on this window, a member may see the running totals of all redeemed incentives and all clipped incentives, and can select for these totals to be shown by one or more categories. How to implement such a feature using the data available in database MMBR-DB 111 would be clear to one of ordinary skill in the art.

The ability of a member to view account details, especially redeemed incentives, is used as one of the measures to minimize the likelihood of fraudulent redemptions by merchants in one aspect of the invention. The security aspects of the invention are described below in the "Security Aspects of the Invention" section.

The Buy Now Button Redeeming an Incentive

Some incentives, for example discount incentives need to be redeemed for the member to realize the benefit. The implementation described herein provides for several convenient ways to redeem an incentive. One such convenience is the "Buy Now" button. In addition to being a convenience for the consumer, this aspect of the invention provides for increasing the rate of redemptions of incentives. It is known that for traditional printed coupon promotional campaigns, the redemption rate of a coupon is dependent on how close to the point of sale the coupon distribution is. If the coupon is dispensed close to the checkout counter the redemption rate will be significantly higher than if distributed to the consumer's home via a newspaper. The Ease-of-redemption aspect of present invention delivers the incentive to the consumer and then enables the consumer to benefit from redemption of the incentive by clicking on a button. The consumer is just a click away from the online equivalent of the supermarket checkout stand.

Buy Now

When the "Buy Now" button is pressed from any incentive display, including a clipped incentive or an unclipped incentive, a member may go to the site on the a Web for purchasing the goods or services, which may be the same site one is on, or at a different Web location, or corresponding to an offline merchant that does not have a Web site. In the preferred embodiment, when the Buy Now button is run, the Buy_Now procedure shown as 1301 in FIG. 13 is run. Normally, at this stage, the entry for the incentive in INCENT-DB would already be accessed. As a first step, Buy_Now examines whether the user is a member and if so, the incentive history entry for the incentive to make sure the member has clipped the incentive. If either the user is not a member or the incentive has not been clipped, the incentive is clipped by going to the procedure Clip_Incentive of FIG. 6. a pop-up purchase screen then is displayed, which in the same frame as the incentive, and replaces the incentive frame. In an alternative embodiment a new pop-up window containing the purchase screen is displayed. The screen preferably includes hyperlinks to all the online merchants that carry the associated goods or services. By clicking on an online merchant link, the member is then automatically transferred to the online store and may purchase the goods or services. The list to display (including any merchant icons) are obtained from the list of POS entry in INCENT-DB 107

In an alternate embodiment of the buy now procedure, the purchase screen is a pop-up that asks the member for all information necessary to complete the purchase (which may include the member's credit card number, address for shipping, and so on). When the member supplies the necessary information and clicks a "Confirm Buy Now" button, the service provider validates the credit card, and then sends the purchase order (including credit card number) electronically using a secure protocol to the vendor of the merchandise for processing. In an yet another alternate embodiment, the service provider actually charges the purchase to the member's credit card, and then informs the vendor of the transaction, giving the vendor all information necessary for the vendor to fulfill the purchase (i.e., to send the product to the member). The member then is provided with the necessary information to collect the goods or with a confirmation that delivery will take place. Since an actual incentive redemption took place, the redemption recording activities described below also need to take place take place.

Redemption

In the preferred embodiment, the online and offline redemption case is carried out slightly differently. The online case is described first.

In the online merchant case, each POS runs a computer system which is connected to the Internet, called a merchant server. In the preferred embodiment, the service provider provides to each participating online POS some code that operates within the merchant server, the code embodying a process called MRCHNT herein. MRCHNT communicates via the Internet with the SRVPRVD process. In one implementation, the first time a member buys a product from an online merchant, the consumer must hits an "apply incentives" button which is included by code which is part of the SRVPRVD process modifying the merchant provider system. This identifies the consumer as a member, and permit the merchant server to store a merchant server cookie that has the member ID in it in consumer computer 115. Future transactions with that member will automatically check the merchant-supplied cookie to see whether the consumer is a member of the incentives service. In another implementation, it no longer is necessary for an "apply incentives" button to be hit. Rather, the merchant provider system includes a set of protocols to follow in order to obtain the user ID and determine if the consumer is a member.

When a consumer shopping at an online POS gets to the point of being about to pay for a purchase consisting of one or more items (goods or services), before the total price is presented to the member by the merchant server, process MRCHNT in the merchant send to process SRVPRVD the consumer and goods information in the following form: A transaction ID number, member ID, and the goods or services (GOS) order, which is the list of items and prices. Procedure Adjust_Goods_&_Services_Order procedure shown as 1401 in FIG. 14 is now run. Adjust_Goods_&_ Services_Order first uses the member ID from the merchant placed cookie on consumer computer 115 checks that this is the member ID is valid. The procedure then accesses the ACCTPRVD process running on the member information computer 109, which looks up the member information in MMBR-DB 111 and transmits to process SRVPRVD the list of clipped incentives for that member, as determined by process ACCTPRVD by looking up the ACCNT-DB part of MMBR-DB. Procedure Adjust_Goods_&_Services_ Order now matches the member's incentives against the GOS order provided by process MRCHNT, and for each match, computes the adjusted price based on the incentives, thus determining a modified GOS order which reflects the incentives having been applied. The modified GOS order identified by the transaction ID number is returned back to process MRCHNT in the merchant server when procedure Adjust_Goods_&_Services_Order terminates.

The merchant server now may transact the order. If the order is transacted, process MRCHNT in the merchant server sends information to the process SRVPRVD at the service provider that the transaction has been complete by calling on procedure Record_Redemption shown as 1501 in FIG. 5. Record_Redemption accesses SRVPRVD and records the redeem for each redeemed incentive in the modified GOS order. In particular, the member ID, the time/date, and the URL from which the member redeemed the incentive is recorded. The system then goes to the post redemption activities described below.

In some implementations, for example, if the merchant wishes not to allow the service provider to see and record the GOS order, process SRVPRVD sends the clipped incentives that are applicable to the items being purchased to process MRCHNT to computer the discount locally at the POS.

In the preferred embodiment, the code for process MRCHNT is provided in one or more formats adapted to a variety of popular Web servers running as merchant servers. Thus, the code for process MRCHNT may be supplied as Java servlets, as Perl CGI programs, C implementations targeted at the ISAPI (Internet Server API, Microsoft's plug-in standard application programmers interface (API) for adding capability to Internet Information Server (IIS), Microsoft's Web server), C implementations targeted at the NSAPI (Netscape's plug-in standard API for adding capability to Netscape's Web server), other C-based implementations, and as Microsoft COM objects suitable for use by server side scripting environments such as ASP (Active Server Pages, available with Microsoft's IIS). The service provider typically may also need to provide installation assistance, and the installation in some cases may require some simple additional custom coding.

The offline case now is described. In the preferred implementation, the offline merchant's point-of-sale terminal includes software (called process OFFLINE-MRCHNT herein) that interacts with the service provider process in a somewhat similar manner to the online case. When the consumer gets to the point of being about to pay for a purchase, before the total price is presented to the consumer the merchant's point of sale system, the member identified himself or herself to the merchant for example by presenting a coded identification card that includes the member ID. Once OFFLINE-MRCHNT knows the consumer is a member, the process logs onto the incentive information computer (or the member information computer in alternate implementations) by, for example, a dial up telephone line or any other means, and as in the online case, sends the consumer's goods or services order to the service provider process. The service provider process SRVPRVD determines the total discount to apply to the GOS order and returns a modified GOS order. Upon confirming the sale, process OFFLINE-MRCHNT contacts the service provider again so that process SRVPRVD can record the redemption. Post redemption activities as described below are then carried out.

While the above method is preferred for offline merchants because of increased security, many alternatives also are possible within the scope of the invention. In one alternate offline case, when the incentive IDs have been downloaded as previously described, each offline point of sale accumulates a list clipped incentives that may be redeemed at that POS. The incentive information held at the POS for clipped incentives is a subset of the complete information held in the consumer's incentive account held in database MMBR-DB. Again, each offline POS runs some software process provided by the service provider called OFFLINE-MRCHNT-ALT. Process OFFLINE-MRCHNT-ALT goes through the list of items in the GOS and the identity of the member (provided again by the consumer presenting some ID), and for each item checks to see if there is a clipped incentive applying to that item in the database kept at the offline POS. A list of any matches and the amount of the discount for each discounted item is then applied to the GOS order. The process OFFLINE-MRCHNT-ALT now logs onto the incentive information computer and checks requests an update of clipped incentives (or requests only that member's incentives to be downloaded). Upon completion of the sale, the process OFFLINE-MRCHNT-ALT tells (either if still connected or by reconnecting) the service provider process about the redemptions, and process SRVPRVD goes through the post-redemption activities described below.

In yet another possible offline redemption implementation, Process OFFLINE-MRCHNT-ALT goes through the list of items in the GOS and the identity of the member (provided again by the consumer presenting some ID), and for each item checks to see if there is a clipped incentive applying to that item in the database kept at the offline POS. A list of any matches and the amount of the discount for each discounted item is then applied to the GOS order. The redemption now is recorded by process OFFLINE-MRCHNT-ALT. The offline POS system contacts the service provider process from time to time by process OFFLINE-MRCHNT-ALT communicating with process SRVPRVD. When process OFFLINE-MRCHNT next contacts the Service Provider tells the service provider about all the redemptions that have happened since the last contact, and for each, process SRVPRVD goes through the post-redemption activities described below.

In another embodiment, the member tells the service provider which retailers to send a clipped incentive to. This may be done at clipping time, by request by the member when wishing to redeem one or more incentive at some offline merchant. These incentives are downloaded to the offline POS, and the method continues as described in the paragraph above.

Many prior art systems for electronic distribution of promotional incentives store in an incentive the address and other identifying information of a consumer clipping the incentive. Because of the way incentives are redeemed in the preferred embodiment, there is no need to know the geographical location of the member. For using an online merchant, there is never a need for the system to know any geographical locations. For example, it is not the geographical location, but rather the "hypergeographical" location (the URL) of the member that is stored as part of an incentive instance. In an alternate embodiment, the geographic locations also can be added as one of the parameters stored. In another alternative offline merchant redemption method, the offline merchant system logs on to the service provider process SRVPRVD at predetermined times (e.g., every midnight), either via the Internet or directly over telephone lines, and receives an update of all the incentives (including member IDs) for all members who have clipped incentives. When a geography factor is included, this may be restricted to the members IDs for all members in the geographical are of the offline merchant.

Other implementations also are possible. For example, an arrangement may be made with an offline merchant to enable the service provider to charge a member's credit card for purchasing goods to which clipped incentives have been applied. A fax may then automatically be sent to the offline merchant informing the merchant of the sale and details of the member who will be collecting shipment of the goods or services (or to whom to ship the goods or services).

Post-redemption Activities

After a redeem action, the service provider process SRVPRVD logs the redemption action permanently in the incentive history entry for the incentive. In particular, the service provider connects to the account provider process ACCTPRVD and indicates that the clipped incentive stored for the member (identified by member ID) has been redeemed. Next, in those alternate embodiments where clipped incentives are sent to merchants, to minimize message traffic, any undelivered copies of the clipped incentive that was just redeemed are purged from the delivery queue of the system.

When the account provider process ACCNTPRVD is informed about a redeem action it updates the member's account in ACCNT-DB by removing the incentive from the list of clipped incentives (the history of clipped incentives field in ACCNT-DB) and adding the value of the incentive to the totals by category part of ACCNT-DB for the member. In some implementations, all instances of a clipped incentive are also automatically deleted from the history of clipped incentives field when such an incentive expires. In another embodiment, a record is kept of all clipped incentives even after expiration or redemption. However, a flag is set in the recorded instance in the history of clipped incentives to indicate redemption.

Settlement

Settlement is the act of the merchant being reimbursed for any incentives that have been applied to goods or services provided to a member by the merchant. The preferred embodiment enables many ways of doing this.

One method is to let the promotion agency take care of settlement in its own way. One aspect of the invention is providing the promotion agency (or any appropriate entity) the means for doing this. As described in previous sections, the service provider process SRVPRVD accumulates a log of the life cycle of all the incentives in the form of the incentive history log entries for each incentive in database INCENT-DB 107. In the preferred embodiment, there also is a promotion viewer process 355 run by or for the promotion agency (see FIG. 3) that is run from a Web page that allows per-redeemer or per-issuer reports to be generated and printed for given time periods. Using promotion viewer process 355, two kinds of reports in general are obtained, one for analyzing the effectiveness of the promotion and the second kind for use as invoices for incentive issuers. As another feature, these invoices themselves may be stored on behalf of the promotion agency in a database called the invoice database in the incentive information computer 117. Such invoices are persistent objects. By "persistent" we mean that when done they represent a snapshot that will never change even if the data from which they were derived were altered or lost. The persistence means one can later prove the redemptions happened.

In an alternate embodiment, the service provider process can send merchant invoices automatically to incentive issuers, and then provide settlement to merchants. This aspect provides a further revenue source for the service provider, which may charge a settlement fee for this service.

Aspects of the User Interface:

The invention described herein includes user interface features that offer advantages over previously known approaches to distributing and redeeming incentives. First is the pop-up window aspect of the incentive. When a user wishes to view an incentive, the incentive pops up in a small window allowing the user to stay in the context—e.g., the Web page describing the product or the purchase location page. A second aspect is the ability not only to view, but also to clip the incentive without leaving that location. This clipping may include the user clicking on a button or otherwise indicating to the system to clip the incentive. If sign-up for membership is required during the clipping, this, too, occurs without the user needing to leave the context by a separate window popping up.

When viewing incentives in a pop-up window, yet another aspect of the user interface is the means for the user to go to the purchase site for the goods or services for which the incentive applies. This means may be the Buy Now button or an icon or a hyperlink. The purchase site may be a different site than the one where the incentive was first viewed by the member. This offers a convenient way to purchase goods or services associated with an incentive. In another aspect, the member can complete the purchase by filling in a pop-up online form, still without necessarily leaving the context where the incentive icon was first viewed.

When viewing incentives in a pop-up window, another aspect of the user interface is the means for the member to view the member's clipped incentives (or alternatively any other information in the member's account), this means including the View Account button or a hyperlink. The account view may be in the same incentive pop-up window, or a new pop-up window. In the view account window, the member then can view all the incentives he or she has clipped. For small windows, means for scrolling through the window is included.

In another aspect of the user interface, when viewing incentives in a pop-up window, convenient means are provided for the user to view all other incentives that exist anywhere on the Web, this view either in same pop-up window, or a new pop-up, or a new Web page depending on the particular implementation. The means for viewing include one or more of a button, a hyperlink, or an icon to select. Other means for entering a command also are included in the scope of the invention.

Analysis Run on Promotions

Datamarts

A data warehouse is all the data collected by a service provider and the account provider. A datamart associated with a promotion agency (or with a promotion author) is the subset of the data warehouse, in this case, the set of consumers that have enrolled as a result of one or more promotions by said author together with the history of what each of these customers has done, including what they've clipped and what they've purchased and their demographics. Also included in the datamart are not only the customers who were enrolled by the author as a result of the promotion, but also information on all other enrolled members who respond to the author's promotion. Thus there are two groups in a datamart: enrolled members who are members acquired as a result of a specific promotion, and existing members who responded to a specific promotion.

In one embodiment of the invention, different data is included on enrolled members in a datamart and on non-enrolled members in a datamart. For example, all data on enrolled customers of all the author's promotions are included, but demographics of non-enrolled members are not included in the datamart.

The advantage of having these datamarts associated with each promotion author is that the information in this datamart is very precise, down to describing exactly what product each customer purchased. Such datamarts include data that is valuable to the promotion authors and this data would be made available to the author associated with this datamart. In addition, the service provider who provides the incentive scheme to multiple promotion authors may use filtered versions of the union of all the consumer data available, and make such data available to any author. For example, a promotion agency may want to make a particular promotion, or offer, to a specific demographic group. The service provider can provide to such an author access to all consumers who meet such demographics. The author can then contact such customers directly via e-mail or other methods to provide them with targeted promotional materials, etc. For example, such customers may be targeted by including HTML at several Web pages to display the incentive icons of specific incentives targeted for such customers by matching the customer characteristics to some of the parameters of any incentive, including for example the selection criteria.

Cleansing of Datamarts

Cleansing is defined as omitting some particular characteristic about the purchasing history of a particular consumer. Using the case of airlines as an example, it may be that the service provider stores the datamarts of two competitors, Airline "A" and Airline "B". Included in each consumer's incentive history data which forms one or more datamarts is information on the actual tickets purchased and the trips flown that are related to one or more promotions by the same author. To continue with the example, an example of cleansing would be if one of the airlines, say Airline A, wanted to target any consumers who have flown any airline, a cleansing would be providing this information about consumers, but without information as to which airline each consumer flew, or who the author of any incentive was. So basically it's a filtering operation with a filter of variable breadth that removes data, the data typically being proprietary data.

As would be clear to one of ordinary skill in the art, various different ways of forming subsets of the data warehouse, the subsets having particular value to one or more of the entities in the system, may be defined. Thus, the above datamart methodology may be defined differently for different interested parties in the incentives system, as would be clear to one of ordinary skill in the art.

IQ System Administration

In addition to the processes described above, the also is a separate System Administration Application (SYSADMIN) that can be run by the appropriate authority, typically either the account provider or the service provider or the promotion author. This permits the account provider or service provider to monitor the various entities in the system, and determine, for example, whether their databases are operating correctly (for example, the member database, etc.). In addition, the account provider, service provider, or incentive promotion author can each examine the details of its own infrastructure and make modifications. For example, a service provider can see all the account providers associated with it, but the service provider cannot alter the account provider status.

See below for a description of how each entity is provided with a different level of security in order to ensure security in the system in another aspect of the invention.

Security Aspects of the Invention

Another aspect of the invention is assuring security. In one embodiment, each entity—promotion author, the consumer who is a member, and the merchant (e.g., an online merchant) each have different security privileges. A member can display an incentive, and clip an incentive, and view and change his or her personal profile in the member's account information. The member also can view his or her account of clipped coupons and of coupons that have been redeemed. A merchant can only see if a particular consumer is a member, and can cause redemption of any incentives associated with a member's goods or services order, using the consumer's member ID. Such a merchant cannot see the incentive instances of the member: what incentives the member has clipped or their value or the date of clipping or the URLs, etc. The promotion creator can see how many people have clipped or redeemed any incentive, and some summary demographics in the form of statistics, but cannot access private member data, such as the identity or address of any individual member who has clipped or redeemed an incentive.

Such security aspects are now described in more detail.

Securing Member Data

A member's account may be accessed by a member using HTML and HTTP so that any member can view their account data using any standard Web browser. In order to prevent an attacker from observing this data as it travels over the Internet, the security protocol SSL is used to encrypt all communications.

HTTPS (HyperText Transport Protocol Secure) is the name popularly given to the protocol for accessing a secure Web server. Using "HTTPS" in the URL instead of "HTTP" directs the message to a secure port address rather than the default Web port address of 80. The session is then managed by a security protocol. A security protocol is a communications protocol that encrypts and decrypts a message for online transmission. Security protocols generally also provide authentication (use of digital signatures). The security protocols that have emerged on the Web are SSL, SHTTP, PCT, TLS and IPSec. Web browsers and Web servers are expected to support all the popular security protocols. In this invention, secure communications from browsers include SSL (Secure Socket Layer), a popular security protocol for use in communicating via the Internet. For example, for communicating between a browser and a Web server, when an SSL session is started, the browser sends its public key to the Web server so that the Web server can securely send a secret key to the browser. The browser and server exchange data via secret key encryption during that session. SSL is expected to be merged with other protocols and authentication methods by the into a new protocol known as Transaction Layer Security (TLS). The security aspects of this invention can be implemented with any protocol.

In the security aspects of the present invention, for authentication, a member needs to provide a member ID and password pair to the service. Since SSL is used, an attacker would not be able to steal this password as it is transmitted. After this initial authentication, a cookie is stored on the member's local computer so that the member will not have to manually authenticate for each use. The cookie is transmitted securely, so it should not be able to be stolen by an attacker over the Internet. See the section below entitled "Details for implementation on the Internet" for a discussion on cookies.

Securing Member Data From Merchants

Online merchants use merchant servers that need to identify a member to the service provider or to the account provider or to both (in the preferred embodiment, the service provider and the account provider are the same entity). In one embodiment, the merchant uses a different method to authenticate the member than does the member. This allows the service provider to provide different security capabilities to members and merchants. In particular, merchants are not able to access a member's demographic and clip data, and a member cannot redeem a coupon without a merchant.

Securing the Promotion Agency's Promotion Data

One of the important aspects of the system is securing the data generated as a result of a promotion, as well as the incentive template data. Such data is usually a trade secret of the promotion agency or incentive issuer, and an agency needs to be assured that competitors will not be able to get access to it. Secondly, the incentives within promotions represent money that the clients of these agencies are responsible to pay when redeemed. If it were possible for an attacker to modify an incentive, it would be possible to cause financial harm to the agency's clients (the incentive issuer). This might lead to liability concerns for both the incentive agency and the service provider.

In the preferred embodiment, each promotion agency resisters with the service provider and thus will be known to the service agency. Because of the implicit trust given to the service agency, this implicit trust being the result of the service agency's being the custodian of the incentive data, in the preferred embodiment, a private key is used to encrypt the data between a promotion editor process operating at any particular promotion agency and the service provider process. Each promotion agency would have its own key. The DES encryption method is used with preferably a 96 bit key. Fewer or more bits may be used. For example, for export, the number of bits is chosen to comply with US export regulations. The service provider process SRVPRVD knows the keys of each promotion agency and uses the appropriate key for encrypting data to an agency's promotion editor. The agency's promotion editor process PROMOEDIT similarly uses its private key to encrypt data sent to the service provider process SRVPRVD. Note that this is for the version that uses standalone program for PROMOEDIT, while in the embodiment in which PROMOEDIT is run by accessing one or more Web-page served by SRVPRVD, a standard secure protocol may be used. Back to the standalone case, several methods for key distribution are known. If the number of agencies is small, manual methods may be used, such as mail or personal distribution, or e-mailing encryption keys together with telephoning the passwords or phrases needed to used the keys. In addition to encryption, the integrity of the data sent from a promotion editor is protected by a digital signature. This assures that the data came from the promotion agency and was not modified en route (data authentication). The signature added to the data is determined by using a one-way hash function, in particular, the SHA-1 (Secure Hash Algorithm-1) hash algorithm commonly used to create digital signatures. A one-way hash function is, in cryptography, an algorithm that generates a unique fixed string of numbers from a message. The "one-way" means that is extremely difficult to turn the fixed string back into the message. Decrypting the data and applying the one way hash function to the received data should give the same signature as was sent, assuring data integrity.

In an alternate embodiment for security between the promotion editor process and the service provider service, a public key encryption method such as that available from RSA Data Security, Inc. (Redwood City, Calif.) is used for all communications between the service provider and any of promotion agency promotion editor.

Fraudulent Redemptions

A common concern in the promotional incentive industry is fraudulent redemption. For example, suppose a customer clipped a Sony Camcorder coupon, but after browsing through an online store decided that not to buy from that store. However, during browsing, the store was able to determine the customer ID and claimed to the service provider that the coupon was redeemed. Providing product IDs with the redemption to "prove" that the redemption was valid would be easy. In order for the service provider to prove fraud, they would need to depend on the quality of the merchant's records, not an easy task.

One aspect of the present invention is minimizing such fraud by providing different access privileges to the different entities. In the preferred embodiment, only a member has access to the incentives clipped by that member. A merchant, for example, would not have access to that data, even if the merchant knew that the consumer was a member and knew the member ID of the member. Similarly, it is impossible for a merchant to clip an incentive into a member's account without the member's intervention.

In the preferred embodiment, merchants similarly cannot directly redeem a clipped incentive, for example based on the incentive ID. Rather, a secure merchant redemption occurs by the merchant redeeming on a redemption ID for the entire transaction as follows: at purchase preview time, the online (or offline) merchant sends the service provider a "shopping cart" of items (the "goods or services" or GOS order), and all determination of what incentives to apply to the GOS order is determined by the service provider process. The service provider process returns a total discount amount to apply to the GOS order along with a redemption ID. When the purchase is about to happen, the merchant (online or offline) again sends the shopping cart (the GOS order) and the redemption ID. Since a redemption ID is tied to a specific purchase by a specific member, the merchant cannot attempt to redeem an incentive without going through the whole purchase process for a member. When the merchant provides the GOS order to the service provider, it is the service provider who checks for the existence of the appropriate coupons and that they indeed have been clipped by the member whose member ID is included in the GOS order.

Yet another level of fraudulent redemption prevention in the preferred embodiment is includes providing detailed redemption information to members. This is obtained from the history of redeemed incentives field in the account database entry for a member. Thus, a member gets a statement that is analogous to a credit card statement in that it itemizes all that member's redemptions. For example, a member's statement might say something like "You redeemed your $100 off a Sony Camcorder coupon at Crutchfield's Online (http://www.crutchfield.com) on Dec. 17, 1997". If a member did not actually redeem this incentive, they could help the service provider identify fraud much in the same way that customers do today with credit cards.

In addition, in the preferred embodiment, the service provider process SRVPRVD keeps a log of all transactions. Periodically and on a regular basis, a detailed analysis of the log is made. In one implementation, such an analysis may include applying a heuristic that seeks repeated failed attempts to redeem coupons. In another implementation, the analysis includes applying a heuristic that looks for excessive activity on a single member's account at a particular merchant. This heuristic picks out merchants that may be using bogus member accounts to redeem coupons. Yet another implementation includes tracking average redemption levels at similar types of stores (e.g., consumer electronics stores, or online bookstores), and identifying stores with much larger dollar values of redemptions than average. Yet another implementation includes applying a heuristic that searches for large numbers of members with bogus addresses who all redeemed coupons at the same merchant. Many other analyses may be applied to the detailed logs to seek suspicious patterns and all such tests are included in the scope of the invention.

Another advantage of keeping logs and having means for analyzing the logs as described above is that this would justify a service provider contractually requiring that merchants that are suspected of fraud using any of the objective measures described above as obtained by the means for analyzing logs prove innocence or accept responsibility for the cost of redemption. This avoids explicitly requiring a merchant to accurately record transactions, but implicitly requires that a merchant is able to prove that any given redemption was valid.

In yet another implementation, a redemption is tied at the time of payment for a purchase to a payment vehicle such as a credit card or online payment system used for the purchase. Thus, only redemptions that are concurrent with purchases using a payment vehicle are enabled. This would make it impossible for a vendor to redeem an incentive from a member that did not actually purchase the applicable goods or services, and would make data analysis easier (perhaps by matching dollars spent to the estimated value of the items supposedly purchased). In one implementation, only vendors who reach a particular level of suspicion based on one or more of the above described objective measures using means for analysis of logs are restricted to redemptions that are concurrent with purchases using a payment vehicle.

Denial of Service Attacks

Denial of service attacks include flooding the service provider process SRVPRVD to effectively take the service provider servers off the Internet, preventing members from viewing and clipping, preventing members from redeeming, and preventing agencies from editing and viewing promotion data. Standard preventive measures are taken to minimize the likelihood of denial of service attacks, including checking the integrity of all software, both that specifically implementing the aspects of the incentive system, and the operating system and other commercial software that the specific software runs on. The software modules implementing the system are written in such a way as to limit the number of modules that can be communicated with directly from the Internet, and to limit how many ways there are to talk to such software modules that need to be exposed. In addition, all of the entry points of the software need to be extensively tested for denial of service issues.

In addition, extensive logging preferably is used in order to help detect attempted denial of service attacks. Such logging may alert the service provider or account provider that someone is trying to break into parts of the system, and can help block otherwise successful attacks before such an attack happens. The code which handles bogus data and makes an effort not to crash or misbehave as a result of such data, should log the fact that a potential attack happened, and the source of the communication that caused the problem.

In another aspect, redundancy can be used to minimize the effect of denial of service attacks. This means that even if one of the service provider's machines is rendered non-functional, or is otherwise unavailable, there is another machine ready to handle the load normally handled by the currently unavailable machine. Ideally, these machines may be located in geographically disparate places. This may require replicating promotional and customer data across the Internet. There are methods for minimizing data inconsistency problems, replication failures, and other problems that may occur with geographically distributed servers and databases, which would be known to one of ordinary skill in the art.

The following three books describe security protocols and procedures commonly used for Internet commerce which may be used in different implementations of the above described security aspects of the invention:

Schneier, Bruce: *Applied Cryptography*, New York, N.Y.: John Wiley & Sons, 1994.

Ford, Warwick, and Baum, Michael S: *Secure Electronic Commerce*, Englewood-Cliffs, N.J.: Prentice-Hall, 1997.

Minoli, Daniel and Minoli, Emma: *Web Commerce Technology Handbook*, New York, N.Y.: McGraw Hill, 1998.

Details for Implementation on the Internet

For completeness, the following information is provided about implementing aspects of the invention on the Internet.

Networks and the Internet

A network as used herein is a many-to-many communications link with two way communications possible. A computer network provides this link between computers. An internet is a large network made up of a number of smaller computer networks. "The" Internet is a worldwide internet of hundreds of thousands (or more) of interconnected networks in over 100 countries, comprised of commercial, academic and government networks. Originally developed for the military, the Internet became widely used for academic and commercial research. It is now readily accessible by both consumers and businesses. Other examples of networks are the private online networks run by companies such as CompuServe and America Online, Inc. (Dulles, Va). Today, these online networks are accessible via the Internet. Additional public networks include interactive television networks, cable television networks, etc. An "Intranet" is a recent term for an Internet-like internet that runs within an organization or firm.

While the preferred embodiments of aspects of the present the invention are implemented on the Internet, the scope of those aspects is not limited to the Internet and the embodiments may be modified to run on any network, and how to so modify the embodiments would be clear to those of ordinary skill in the art.

The World Wide Web, URLs and HTML.

The Internet has become extremely popular in recent years because of the easy access to information via World Wide Web (the Web, WWW) using graphics-based Web browsers such as Netscape Navigator (Netscape Communications Corporation, Mountain View, Calif.) and Microsoft Internet Explorer (Microsoft Corporation, Redmond, Wash.). The Web is an interlocking system of records, each record usually either a page of hypertext or a directory or a file, each record located on some location (computer) in the Internet. A Universal Record Locator, also called Uniform Resource Locator (URL), is a standard way of referring to a record on the Web, and comprises an address and a protocol type, possibly with local information (parameters), and takes the syntactic form <protocol_type>://<host_address>/<local_info>. The <protocol_type> specifies the protocol to use for fetc.hing the record, and the most commonly used protocol, used for fetc.hing and displaying hypertext objects such as HTML documents from remote computers, is the HyperText Transfer Protocol, with <protocol type>=HTTP. Other protocols include, for example, the File Transfer Protocol (FTP) for file transfers, etc. >/<local_info> is a string (often a file name or parameters) passed to the protocol handler on the remote computer. Protocols such as HTTP and FTP are based on TCP/IP which is the computer networking protocol that provides for the reliable delivery of streams of data from one computer to another. <host_address> is the Internet name of the host on which to find the object. Thus, the URL http://www.iq.com/index is an address of a page (a file called index) on the computer system identified on the Internet by www.iq.com. As another example, in this case using FTP, the URL ftp://ftp.iq.com/updates/update2.exe is the location of a file called update2.exe on the computer system identified on the Internet by www.iq.com, and typically, FFP may be used for transferring (downloading) the file over the Internet to a local location.

The Internet (or other computer networks) may be accessed by a local computer or a local computer terminal many ways, and two popular methods include via electronic mail (e-mail) and using a browser such as Internet Explorer or Netscape Navigator. In the future, browsers may become integrated into computer environments such as the operating system, and thus not need to be explicitly invoked by a user. Browsers display one or more pages from remote (or local) computers on the local computer, each page identified by its URL, and written in languages such as HyperText Markup Language (HTML). Such pages may display images, icons, links to other local and remote pages (identified by URLs), etc. In addition, accessing a page or clicking on a displayed icon on the local computer may invoke a program to be loaded and executed on the local computer, and the program may first be downloaded from a remote location to the local computer.

Web pages are built with HTML tags, or codes, embedded in the text. HTML defines the page layout, fonts and graphic elements as well as the hypertext links to other documents on the Web. Each link contains the URL of a Web page residing on the same computer or any computer worldwide, hence "World Wide" Web. HTML 2.0 was defined by the Internet Engineering Task Force (IETF) with a basic set of features including interactive forms capability. Subsequent versions added more features such as blinking text, custom backgrounds and tables of contents. However, each new version requires agreement on the tags (codes) used and browsers must be modified to implement those tags. Although programming-like statements are being added to HTML, it is not a full-blown programming language such as JAVA or JavaScript (see below). Rather it could be considered a "presentation language"." HTML is derived from SGML, the Standard Generalized Markup Language, which is widely used to publish documents.

Accessing a Web document requires typing in or otherwise inputting the address, or URL, of the home page in a Web browser. The "home page" is an HTML document, which contains hypertext links to other HTML documents that can be stored on the same server or on a server anywhere in the world.

Alternate implementations may use other commonly understood markup languages. For example, XML (EXtensible Markup Language) which, like HTML, is a subset of the SGML document language designed for use on the Web and sanctioned by the W3C (World Wide Web Consortium). It provides more flexibility for designing Web pages than HTML, which itself is a document type of SGML. Whereas HTML uses a fixed set of tags (codes) to describe the pages, XML maintains the flexible meta-language characteristic of SGML by defining the codes that will be used in each document. See HTML and SGML.

Servers

The term server as used herein means a computer in a network shared by multiple users. The users of a server are referred to as clients. The term server may refer to both the hardware and software or just the software that performs the service. Similarly, the term client may refer to the software or the hardware or both. Web server may refer to the Web server software on a computer (that may run other applications) that makes Web documents available on a network or to a computer that also runs other applications, or, it may refer to a computer system dedicated only to the Web server application. There would be several dedicated Web servers in a large Web site. A browser for example, is usually referred to as a client for a Web-based server of HTML pages. The computer running the browser also is a client when running the browser software. The following types of servers are known, and their meaning would be clear from the name: application server (for application software); audio server (for digitized audio information); database server (for databases); fax server (for fax documents); file server (for files); mail server (for e-mail); merchant server (see below); telephony server (for telephone data); video server (for video data such as digitized movies); Web server (for any Web document), etc.

A merchant server is a server in a network that handles online purchases and credit card transactions. It implements an electronic commerce protocol that ensures a secure transmission between the clients and cooperating merchants and between the merchants and banks. The term may refer to the entire computer system or just the software that provides this service. A merchant server is also called a commerce server.

Web servers including merchant servers are available as commercial programs, and many aspects of the present invention may be embodied using such servers. In particular, the present invention uses as the Web server for the incentive information service provider process Microsoft Internet Information Server (IIS) (Microsoft Corporation, Redmond Wash.). This is Web server software that runs under Microsoft's Windows NT operating system and supports the SSL security protocol. Within IIS, a plug-in is used to allow the running of JAVA servlets. In particular, the JRUN plug-in by Live Software, San Diego, Calif., is used. See below on JAVA and JAVA servlets.

The following book is a reference on Microsoft Internet Information Server: Mueller, John Paul and Sheldon, Tom: *Microsoft Internet Information Server 4: The Complete Reference*, New York, N.Y.: Osborne McGraw-Hill, 1998.

Java Programming Language and the JAVA Platform

The computer world currently has many "platforms" where a platform as used herein to mean an operating environment such as an operating system. Some commonly used platforms include Microsoft Windows (Windows 95, Windows NT, etc.), Macintosh OS, OS/2, UNIX® and NetWare®. Software, even if written in a common popular language such as C++, must be compiled separately to run on each platform. The binary file for an application that runs on one platform cannot run on another platform, because the binary file is platform-specific. The JAVA® programming language running on the JAVA platform is a recent software platform for delivering and running highly interactive, dynamic, and secure applications on networked computer systems. JAVA is a trademark of Sun Microsystems, Inc. Mountain View, Calif. What sets the JAVA platform apart from many other common platforms is that it sits on top of these other platforms, and compiles to "bytecodes", which are not specific to any physical machine, but are machine instructions for a "virtual machine". A program thus is written in the JAVA language and compiled to a bytecode file that can run wherever the JAVA platform is present, on any underlying operating system. In other words, the same exact bytecode file can run on any operating system that is running the JAVA platform, each bytecode instruction being interpreted by the "Java Virtual machine". Thus, while each underlying platform may have its own implementation of the Java Virtual Machine, there is only one virtual machine specification. Because of this, the JAVA platform can provide a standard, uniform programming interface to applications on any hardware. The JAVA platform is therefore ideal for the Internet, where one program should be capable of running on any computer in the world. Thus, one typically uses the JAVA language to write source code for JAVA-powered applications. The source code is compiled once to an intermediate, portable form of bytecodes that will run anywhere the JAVA platform is present.

For more details on JAVA, see, for example, Naughton, Patrick and Morrison, Michael: *The Java Handbook*, New York, N.Y.: Osborne/McGraw-Hill, 1996 (ISBN: 0-078-82199-1), or Arnold, Ken and Gosling, James: *The Java Programming Language*, 2nd Edition, Reading, Mass.: Addison-Wesley, 1998 (ISBN: 0-201-31006-6).

JavaScript

JavaScript is an object based scripting language developed by Netscape that is supported in modern browsers and can be embedded in HTML pages. JavaScript is easier to use than JAVA, but not as powerful. It also is often confused with JAVA. JavaScript uses the HTML page as its user interface, whereas JAVA, being a full programming language, can generate a completely custom interface. On the client, JavaScript scripts are maintained as part of the HTML in source code. On the server side, JavaScript scripts usually are compiled into an intermediate language, similar to the way JAVA programs are compiled into bytecode. JavaScript does not have the programming overhead of Java, but can be used in conjunction with it. For example, a JavaScript script could be used to display a data entry form and validate the input, while a Java program can then be used to process the information.

JavaScript is extensively used in the preferred embodiment of the present invention in the HTML pages used by members and other consumers viewing and clipping incentives in the consumer computer. The JavaScript is embedded into the HTML pages, and is used for the opening of pop-up windows, in particular, the sizing, positioning, etc. Alternate implementations, clearly, may use JAVA applets or other means.

JavaScript is described in Flanagan, David: *JavaScript: The Definitive Guide*, Sebastopol, Calif.: O'Reilly & Associates, 1997.

Applets and Servlets: Extending Servers and Browsers with Programs

In addition to serving HTML documents, a Web server, such as a merchant server, and the server used herein on the service provider computer implementing aspects of the present invention, can run programs that interact with clients or can send programs to clients that run on the client computer. Applications that run on the server computer are called server-side applications. Applications that are downloaded to the client and run on the client machine are called client-side applications.

An "applet" is a small application, such as a utility program or limited-function spreadsheet or word processor. JAVA programs written to be downloaded to and run on a browser are usually called JAVA applets or simply applets. When run only on the server side, JAVA programs are called servlets herein. Thus, a JAVA™ applet is a JAVA program that can be included in an HTML page, much as an image can be included. When one uses a JAVA-compatible browser to view a page that contains a JAVA applet, the applet's code, referred to by its URL on the page, is transferred to the client computer and executed by the browser.

A modern Web server such as the server used to implement aspects of the present invention can provide Web page server functionality, send JAVA applets and JavaScript programs to clients, and run the following server-side applications:

Servlets (written in JAVA);
Server-side JavaScript applications;
Server-side programs conforming to a standard known as Common Gateway Interface (CGI) programs. CGI programs can be written in C, Perl, or other programming languages, and what makes them all CGI programs is the standard way they pass information between clients and servers; and Plug-in programs, which extend or replace a server's features. For example, one can use plug-ins to provide a different way to control access, or different logging mechanisms, etc.

CGI programs, JavaScript applications and JAVA servlets are each triggered by a client sending or requesting information from a URL. When one installs a server-side application, one gives it a name which determines the application URL, i.e., the URL that clients use to access the application or the JAVA applet (servlet). Application URLs are of the form http://server.domain/appName/page.html where server is the name of the HTTP server, domain is the Internet domain (including any subdomains), appName is the application name and page is the name of a page in the application. When a client requests this URL, the server runs the server-side application (a servlet in the preferred embodiment), and generates HTML for the specified page in the server-side application and sends the HTML to the client.

When one installs a server side application, one may want to restrict its use to only certain users. One can do this by applying a "configuration style" to the application which restricts access to certain users from certain URLs etc.

Installing Client-side Programs.

There are two types of client-side programs for use on the Web with modern Web browsers: JAVA applets and JavaScript programs. Client-side JAVA applets are executable files identified in an HTML document. When a client accesses the page or clicks on a particular link, the JAVA applet is retrieved from the server, and executed on the client. The applets can reside anywhere under the server's primary document root. Client-side JavaScript programs, on the other hand, are embedded in HTML files and executed on the client.

Once a client side JAVA applet is created, one copies it into a directory from which the server can deliver it. To send it to a client, it must be referenced in an HTML file.

Client-side JavaScript programs are created by lines of JavaScript code embedded in HTML files. The HTML files travel from the server to the client. Once the files reach the client, a modern browser interprets the JavaScript code and performs the specified actions.

Cookies

A cookie is a small piece of information stored on a client machine, for example as a file. Cookies are used in the preferred embodiment of the invention in a consumer's computer to identify the member to the service provider process SRVPRVD.

In general, one can manipulate cookies explicitly, with a CGI program or a JAVA applet or servlet, or programmatically, with client-side JavaScript using the cookie property of the document object. Typically, cookie information may be added to a HTTP header using a syntax such as

```
Set-Cookie:
name=value
[;EXPIRES=dateValue]
[;DOMAIN=domainName]
[;PATH=pathName]
[;SECURE]
``` where name=value is a sequence of characters excluding semicolon, comma and white space, EXPIRES=dateValue specifies a date string that defines the valid life time of that cookie, DOMAIN=domainName specifies the domain attributes for a valid cookie, PATH=pathName specifies the path attributes for a valid cookie, and SECURE specifies that the cookie is transmitted only if the communications channel with the host is a secure. Only HTTPS (HTTP over SSL) servers are currently secure. If SECURE is not specified, the cookie is considered sent over any channel.

A server sends cookie information to the client in the HTTP header when the server responds to a request. Included in that information is a description of the range of URLs for which it is valid. Any future HTTP requests made by the client which fall in that range will include a transmittal of the current value of the stated object from the client back to the server.

The Computer Systems

The system can be implemented on any network (with the broad definition of network) with consumers viewing icons and incentives on a consumer computer (with the broad definition of computer to include any network appliance such as a television, TV set-top box, telephone device, etc.). The engine behind the promotion infrastructure is the service provider process SRVPRVD, which can be implemented as a computer program run on any computer system, and preferably is a secure, fault-tolerant process maintained on a 24 hours a day, 7 days a week basis by the service provider on the incentive information computer 105. In the preferred embodiment, a standard commercial Web server is used to serve incentives and associated JavaScripts, and also to run JAVA servlets at the server location.

When the consumer clicks on an incentive icon, it is desirable that the incentive pops up as quickly as possible and as reliably as possible. Similarly, when the consumer clicks on a button to view his or her account on the account database ACCNTDB, it should appear quickly, accurately, and reliably.

In the preferred embodiment, the network topology used by the service provider has been carefully designed to optimize network performance. Clearly this is advantageous but not necessary for the operation of the invention. The following methods have been used to optimize the service performance, and many alternatives are known:

Minimizing Hop Count: A single trip that a data packet takes from one router or intermediate point to another within the Internet is called a hop, and the number of hops a packet has taken towards its destination is called its hop count. Data packets that accumulate very large hop counts are typically discarded and must be resent. The hop count is one of the most important factors determining the speed of response to user actions on a network such as the Internet. In the preferred embodiment, the service provider minimizes its hop count by locating the service provider servers close to the Internet backbone, utilizing peering arrangements with major Internet service providers (ISPs), major in the sense that they contribute backbone links for the Internet, so that multiple routes are available to a given destination, and load-balancing occurs among the ISPs so that packets will be delivered via the shortest possible route.

Network Redundancy: In the preferred embodiment of the system, the ISP utilized by the assignee of the present invention, acting as the service provider, buys and owns transit from all the major ISPs. As a result, any customer request (e.g., from a member or other consumer, an online merchant, a promotion agency, etc.) can be fulfilled regardless of the availability of any ISP. If any ISP begins to encounter unacceptable packet loss, traffic is immediately rerouted to the next best route through another Internet service provider.

Server Load Balancing: The incentive information computer is implemented with multiple high-capacity computer systems configured as server computers. These are computer systems running commercial Web server software under the Windows NT operating system (Microsoft Corporation, Redmond, Wash.). Clearly, the Internet implementation invention can work with any server under any operating system. Load balancing is used to provide the fastest possible response to consumer requests. When a consumer requests incentive information, each server machine responds with its availability utilizing the domain name server (DNS) round-robin concept. The first server computer to respond receives the request.

The reliability of a 24 hours a day, 7 days a week service is dependent upon the capabilities of the facilities the servers are housed in, specifically the power subsystem and the fire suppression system. The server computers used preferably receive a continuous supply of clean power. Equipment co-located at the service provider ISP facility is protected by two fire fighting systems.

Multiply redundant storage systems. The disk subsystems on the incentive information computer 105 and on the member information computer 109 are fault tolerant RAID-5 systems. RAID (Redundant Array of Independent Disks) is a way of storing the same data in different places (thus, redundantly) on multiple hard disks. Using multiple disks increases the mean time between failure (MTBF), thereby increasing fault-tolerance. Also, by placing data on multiple disks, I/O operations can overlap in a balanced way, improving performance.

Fault-tolerant network connections. The incentive information computer 105 and the member information computer 109 each have multiple network interface cards that the operating system treats as a single network interface. As a result, a network card hardware failure does not affect the machine's operations.

Software

Each of the server computers runs a commercial Web server on a standard computer system operating under the Windows NT operating system and the SRVPRVD and ACCNTPRVD processes described herein that implement the adaptive incentive behavior aspects of the present invention. These are implemented in JAVA language and incorporated into the Web server as servlets executing on the server and as database instructions communicating with the database systems. The programming instructions implementing the various aspects of the preferred embodiment of the invention are structured as a set of self-contained modules that communicate with each other. In the preferred implementation, module-to-module communications is simplified by is deploying the same unified set of code and content across any number of Web servers operated by the service provider. In an alternate implementation, the module-to-module communication is via industry standard CORBA (Common Object Request Broker Architecture) technology, a standard from The Object Management Group (OMG) for communicating between distributed objects. CORBA provides a way to execute programs written in any language no matter where they reside in the network or what platform they run on, and thus enables complex systems to be built across an entire enterprise. With CORBA, each module is capable of executing on any machine. For example, when a module executing on machine A makes a request for service, the request is made to a common interface known as the Object Request Broker or ORB. The ORB directs the request to the appropriate machine (e.g., machine B) that contains the object (e.g., another module) and redirects the results back to the requester. The required object might also be run on the same machine as the requester. CORBA is also often described as an "object bus", because it is a communications interface through which objects are located and accessed. CORBA 2 was introduced to support interoperability between ORBs, so that an ORB from one software vendor (e.g., Microsoft) can communicate directly to an ORB from another (e.g., Sun Microsystems).

Implementing the system of the present invention in this way means there is no limit to how many machines can be added, providing scalability to meet increasing demand as incentives network activity grows.

CORBA is described in Orfali, Robert and Harkey, Dan: *Client/Server Programming with Java and CORBA*, New York, N.Y.: John Wiley & Sons, 1997.

Database

In the preferred embodiment, duplicate copies of each of the databases INCENT-DB and MMBR-DB exist in a two-machine, master-slave configuration which mirrors write operations to both machines. In the event that the network connection to one of the database servers is lost, the remaining server continues to process requests. When the machine that went down returns online, its copy of the database is immediately synchronized with the current database from the machine whose operation was not interrupted.

Any database software system may be used, such as a relational database management system, an object-oriented database system, etc. The preferred embodiment uses a standard relational database system called Microsoft SQL Server (Microsoft Corporation, Redmond, Wash.). The industry standard SQL (Structured Query Language) commands are used to interrogate and process data in the relational database. Alternate implementations may use other database technologies, e.g., object oriented databases.

The following three books are reference on Microsoft SQL Server: Panttaja, Jim, Panttaja, Mary and Prendergast, Bruce: *The Microsoft SQL Server Survival Guide*, New York, N.Y.: John Wiley & Sons, New York, 1996, Rensin, David and Fedorchek, Andrew: *SQL Server 6.5 Secrets*, Foster City, Calif.: IDG Books Worldwide, 1996, and Soukup, Ron: *Inside Microsoft SQL Server 6.5*, Redmond, Wash.: Microsoft Press, 1997.

As will be understood by those skilled in the art, the skilled practitioner may make many changes in the methods and apparatuses as described above without departing from the spirit and scope of the invention. The true spirit and scope of the invention should be limited only as set forth in the claims that follow.

Appendix A: Specific Databases and Schemas

This Appendix A includes fully documented Microsoft SQL Server scripts that define in detail the schema of tables used in example relational database systems for the incentives database and the member database (which in this implementation includes the account database). Not all the features described herein above in the detailed description may be implemented in these example database systems. However, adding such features, and any other features of the preferred and alternate embodiments described above would be straightforward and clear to one of ordinary skill in the art. Also, many ways of implementing databases for including the features of this invention are possible, and this Appendix provides one such example.

The following described the attached schema:

Account Provider Database (called MMBR-DB herein above and which includes the information ACCNT-DB) includes the following tables:

Table "dbo.t_account" holds member account information. Each member gets one member identifier string value (member-ID) which describes all the rows of information for a particular member. As an example, the demographics information of a member is stored in the form of the bytes of the JAVA serialization of a "Demog" object. The Demog object is a subclass of the JAVA Hashtable object, and it can be arbitrarily deep.

Note that in the database, JAVA objects in general are stored in their JAVA serialization form. As the term implies, JAVA serialization converts JAVA objects into a serial byte stream, which can then be easily stored to a file or stored in a database. When the serial data is later read, the byte stream can be easily converted to the original objects. The Java Developer Kit (JDK) from Sun Microsystems Inc. (Mountain View, Calif.) defined a standard serialization methodology. Tools also are available for exchanging JAVA objects with C++ programs using JAVA serializations.

Table dbo.t_config holds the account provider configuration information. This includes HTML templates and human-readable labels for each demographic item ("First Name", "Last Name", etc.).

Table dbo.t_log is the table that contains the account provider system activity log. Each log entry has a unique ID, and each entry stores the date/time of the log entry, the severity (i.e., whether a warning, error, or information message) of the log entry and a human-readable message.

The service provider database "SBSERVICE" includes the following tables.

Table dbo.t_config contains the configuration information for the service provider, including the categories, the general purpose incentive artworks, such as buttons, and generic incentive images, and also configuration information (password for access using the promotion editor application) for each promotion author that is registered.

Table dbo.t_inctmplt holds the incentives The "iqitem_id" column in this table holds the unique incentive identification string. The incentive is stored as the bytes of a JAVA serialization of an Incentive object.

Table dbo.t_inctrans holds the transaction history for each incentive (where a transaction is a view, a clip or a redemption. The "iqname" column always contains "inctrans". For each incentive, there is a "iqbytesvalue" column containing the bytes of the JAVA serialization of an incentive transaction object.

Table dbo.t_log is the table that contains the service provider system logging information. Each log entry has a unique ID, and each entry stores the date/time of the log entry, the severity (i.e., whether a warning, error, or information message) of the log entry and a human-readable message.

Table dbo.t_promo is the table of promotions. The "iqitem_id" column holds the unique promotion name. The iqbytesvalue column holds the bytes of a JAVA serialization of a promotion object.

```
/* Microsoft SQL Server - Scripting */
/* Server: ERIK */
/* Database: SBACCOUNT */
/* Creation Date Feb. 18, 1998 2:59:32 PM */
DESCRIPTIONS OF COLUMNS THAT OCCUR IN MULTIPLE
TABLES:
These columns are common across many of the tables that make up the
   databases. Nearly every column defines a type-specific value for that
   row, like "string" or "float". Typically only one of the "type"
   columns would be filled in per row, the other "type" columns having a
   NULL value.
Non-"type" columns:
iqentry_id: A unique system-wide id that identifies the row in the
   table.
iqitem_id: The top-level "clustering" identifier. Rows having the same
   "iqitem_id" value define a cluster, or set of information that has
   meaning as a set.
iqgroup: A second-level (below the cluster) grouping mechanism. Rows
   having the same "iqgroup" value define a "group" of items that have
   meaning as a set.
iqname: The name of the item (within its group).
The "type" columns:
iqstringvalue: The string value of the item (<=255 characters)
iqlongstringvalue: The long string value of the item (> 255 characters)
iqintvalue: The integer value of the item.
iqfloatvalue: The float value of the item.
iqdatevalue: The date/time value of the item.
iqbytesvalue: The binary (blob) value of the item.
iqenumname: The enumerated-type value of the item.
Table-specific column descriptions (refinements on the above general
   scheme) appear below as comments within the table definition SQL
   script.
*/
/****** Object: Table dbo.t_account Script Date: Feb. 18, 1998 2:59:32
   PM ******/
/*
This table holds member account information.
The "iqitem_id" column holds unique member identifier strings. Each
   member gets one and only one value for this. In keeping with the
   general "clustering" notion above, the iqitem_id" in the t_account
   table describes all the rows of information for a particular member.
   Given a particular unique member identification string, one can query
   the table to get all the rows of info for that member.
"Group" values defined for t_account:
-------------------------------------
"demog" stores the member's demographic info. There are three "name"
   values defined in this group:
   "demog" - the iqbytesvalue column holds the bytes of the JAVA
```

```
serialization of a "Demog" object. The Demog object is a subclass of
   the JAVA Hashtable object, and it can be arbitrarily deep.
   "e-mail" - the iqstringvalue that contains the member's e-mail
   address.
   "password" - the iqstringvalue that contains the member's password.
"savings" stores the member's monetary savings per category. The
   "iqname" values in this group are the categories in which the member
   has realized savings by redeeming incentives using the promotional
   incentive system. Example name values: "electronics", "travel",
   "music", etc. The "type" column that would be filled out is the
   "iqfloatvalue".
The last groups defined in t_account each represent one incentive
   incident (such as view, clip, or redeem). The group values are each a
   unique string.
Each of these groups consists of only one row of information.
The one and only "name" value for the row is one of:
   "viewed" - the iqbytesvalue holds the bytes of the JAVA serialization
   of an "Incentive" object.
   "clipped" - the iqbytesvalue holds the bytes of the JAVA
   serialization of an "Incentive" object.
   "redeemed" - the iqbytesvalue holds the bytes of the JAVA
   serialization of an "Incentive" object.
*/
CREATE TABLE dbo.t_account
(
   iqentry_id varchar (255) NOT NULL ,
   iqitem_id varchar (255) NULL ,
   iqgroup varchar (255) NULL ,
   iqname varchar (255) NOT NULL ,
   iqstringvalue varchar (255) NULL ,
   iqlongstringvalue text NULL ,
   iqintvalue int NULL ,
   iqfloatvalue float NULL ,
   iqdatevalue datetime NULL ,
   iqbytesvalue image NULL ,
   iqenumname varchar (255) NULL ,
   CONSTRAINT PK_t_account_5A997CFE PRIMARY KEY
   CLUSTERED
   (
      iqentry_id
   )
)
GO
CREATE INDEX IQACCOUNTIDX ON dbo.t_account(iqitem_id)
GO
/*
Here is the t_account data for a sample member, in comma-separated
   format.
This would be easy to copy into a spreadsheet for viewing . . .
"iqentry_id", "iqitem_id", "iqgroup", "iqname", "iqstringvalue",
   "iqlongstringvalue", "iqintvalue", "iqfloatvalue", "iqdatevalue",
   "iqbytesvalue", "iqenumname"
"206.14.232.41:cee609ea46:1", "206.14.232.41:cee609ea3c:0", "demog",
   "demog", <Null>, <Null>, <Null>, <Null>, <Null>,
   0xACED000573720008 . . . , <Null>
"206.14.232.41:cee609ea46:2", "206.14.232.41:cee609ea3c:0", "demog",
   "e-mail", "jblow@foo.com", <Null>, <Null>, <Null>, <Null>, <Null>,
   <Null>
"206.14.232.41:cee609ea46:3", "206.14.232.41:cee609ea3c:0", "demog",
   "password", "foo", <Null>, <Null>, <Null>, <Null>, <Null>, <Null>
"206.14.232.41:cee609ec31:4", "206.14.232.41:cee609ea3c:0",
   "uiDemogName", "CONT/ADR", "Address:", <Null>, <Null>, <Null>,
   <Null>, <Null>, <Null>
"206.14.232.41:cee609ec31:5", "206.14.232.41:cee609ea3c:0",
   "uiDemogName", "CONT/FN", "Name:", <Null>, <Null>, <Null>,
   <Null>, <Null>, <Null>
"206.14.232.41:cee609ec3b:6", "206.14.232.41:cee609ea3c:0",
   "uiDemogName", "DEMO/AGE", "Age:", <Null>, <Null>, <Null>,
   <Null>, <Null>, <Null>
"206.14.232.41:cee609ec3b:7", "206.14.232.41:cee609ea3c:0",
   "uiDemogName", "DEMO/CITY", "City:", <Null>, <Null>, <Null>,
   <Null>, <Null>, <Null>
"206.14.232.41:cee609ec3b:8", "206.14.232.41:cee609ea3c:0",
   "uiDemogName", "DEMO/G", "Gender:", <Null>, <Null>, <Null>,
   <Null>, <Null>, <Null>
"206.14.232.41:cee609ec3b:9", "206.14.232.41:cee609ea3c:0",
   "uiDemogName", "DEMO/ZIP", "Zipcode:", <Null>, <Null>, <Null>,
   <Null>, <Null>, <Null>
"206.14.232.41:cee609ec3b:a", "206.14.232.41:cee609ea3c:0",
   "uiDemogName", "e-mail", "E-mail address:", <Null>, <Null>, <Null>,
   <Null>, <Null>, <Null>
"206.14.232.41:cee609ec3b:b", "206.14.232.41:cee609ea3c:0",
   "uiDemogName", "familyName", "Last Name:", <Null>, <Null>,
   <Null>, <Null>, <Null>, <Null>
"206.14.232.41:cee609ec3b:c", "206.14.232.41:cee609ea3c:0",
   "uiDemogName", "givenName", "First Name:", <Null>, <Null>,
   <Null>, <Null>, <Null>, <Null>
"206.14.232.41:cee609ec3b:d", "206.14.232.41:cee609ea3c:0",
   "uiDemogName", "password", "Password:", <Null>, <Null>, <Null>,
   <Null>, <Null>, <Null>
"206.14.232.41:cee623e4f8:0", "206.14.232.41:cee609ea3c:0",
   "206.14.232.41:cee623e213:48", "viewed", <Null>, <Null>, <Null>,
   <Null>, <Null>, 0xACED000573720010 . . . , <Null>
"206.14.232,41:cee62402c7:1", "206.14.232.41:cee609ea3c:0",
   "206.14.232.41:cee62402b3:4b", "redeemed", <Null>, <Null>, <Null>,
   <Null>, <Null>, 0xACED000573720010 . . . , <Null>
"206.14.232.41:cee63ca3d2:0", "206.14.232.41:cee609ea3c:0",
   "206.14.232.41:cee63ca0e3:0", "viewed", <Null>, <Null>, <Null>,
   <Null>, <Null>, 0xACED000573720010 . . . , <Null>
"206.14.232.41:cee63cd183:1", "206.14.232.41:cee609ea3c:0",
   206.14.232.41:cee63cd16f:3", "clipped", <Null>, <Null>, <Null>,
   <Null>, <Null>, 0xACED000573720010 . . . , <Null>
"206.14.232.41:cee6444f4f:2", "206.14.232.41:cee609ea3c:0", "savings",
   "Electronics", <Null>, <Null>, <Null>, 100.0, <Null>, <Null>, <Null>
"206.14.232.41:cef3e2baf8:2", "206.14.232.41:cee609ea3c:0",
   "206.14.232.41:cef3e2b921:4", "viewed", <Null>, <Null>, <Null>,
   <Null>, <Null>, 0xACED000573720010 . . . , <Null>
"206.14.232.41:cef41a37a6:3", "206.14.232.41:cee609ea3c:0",
   "206.14.232.41:cef41a2e6b:6", "viewed", <Null>, <Null>, <Null>,
   <Null>, <Null>, 0xACED000573720010 . . . , <Null>
"206.14.232.41:cef420b054:4", "206.14.232.41:cee609ea3c:0",
   "206.14.232.41:cef420addd:8", "viewed", <Null>, <Null>, <Null>,
   <Null>, <Null>, 0xACED000573720010 . . . , <Null>
"206.14.232.41:cef42116c8:5", "206.14.232.41:cee609ea3c:0",
   "206.14.232.41:cef4211429:a", "viewed", <Null>, <Null>, <Null>,
   <Null>, <Null>, 0xACED000573720010 . . . , <Null>
"206.14.232.41:cef4211d6e:6", "206.14.232.41:cee609ea3c:0",
   "206.14.232.41:cef4211d5a:d", "clipped", <Null>, <Null>, <Null>,
   <Null>, <Null>, 0xACED000573720010 . . . , <Null>
"206.14.232.41:cef42c1f64:7", "206.14.232.41:cee609ea3c:0",
   "206.14.232.41:cef42c1d5b:e", "viewed", <Null>, <Null>, <Null>,
   <Null>, <Null>, 0xACED000573720010 . . . , <Null>
"206.14.232.41:cef4ad44cc:1c", "206.14.232.41:cee609ea3c:0",
   "206.14.232.41:cef4ad4237:1c", "viewed", <Null>, <Null>, <Null>,
   <Null>, <Null>, 0xACED000573720010 . . . , <Null>
*/
/****** Object: Table dbo.t_config Script Date: Feb. 18, 1998 2:59:33
   PM ******/
/*
Account Provider configuration info. Includes HTML templates and
   human-readable labels for each demographic item ("First Name",
   "Last Name", etc.).
*/
CREATE TABLE dbo.t_config (
   iqentry_id varchar (255) NOT NULL ,
   iqitem_id varchar (255) NULL ,
   iqgroup varchar (255) NULL ,
   iqname varchar (255) NOT NULL ,
   iqstringvalue varchar (255) NULL ,
   iqlongstringvalue text NULL ,
   iqintvalue int NULL ,
   iqfloatvalue float NULL ,
   iqdatevalue datetime NULL ,
   iqbytesvalue image NULL ,
   iqenumname varchar (255) NULL ,
   CONSTRAINT PK_t_config_57BD1053 PRIMARY KEY
   CLUSTERED
   (
      iqentry_id
   )
)
GO
CREATE INDEX IQCONFIGIDX ON dbo.t_config(iqgroup, iqname)
GO
/****** Object: Table dbo.t_log Script Date: Feb. 18, 1998 2:59:33 PM
   ******/
/* Account Provider system activity log. */
CREATE TABLE dbo.t_log (
```

```
    iqentry_id varchar (255) NOT NULL , /* Unique id of the log entry. */
    iqdate datetime NOT NULL , /* The date/time of the log entry. */
    iqseverity int NOT NULL , /* Severity of the log entry. */
    iqmessage text NOT NULL , /* The human-readable message. */
    CONSTRAINT PK_t_log_632EC2FF PRIMARY KEY CLUSTERED
    (
        iqentry_id
    )
)
GO
/* Microsoft SQL Server - Scripting */
/* Server: ERIK */
/* Database: SBSERVICE */
/* Creation Date Feb. 18, 1998 3:00:14 PM */
/*
DESCRIPTIONS OF COLUMNS THAT OCCUR IN MULTIPLE
TABLES:
These columns are common across many of the tables. Nearly every
    column defines a type-specific value for that row, like "string" or
    "float". Typically only one of the "type" columns would be filled
    in per row, the other "type" columns having a NULL value.
Non-"type" columns:
iqentry_id: A unique system-wide id that identifies the row in the
    table.
iqitem_id: The top-level "clustering" identifier. Rows having the same
    "iqitem_id" value define a cluster, or set of information that has
    meaning as a set.
iqgroup: A second-level (below the cluster) grouping mechanism. Rows
    having
the same "iqgroup" value define a "group" of items that have meaning as
a set.
iqname: The name of the item (within its group).
The "type" columns:
iqstringvalue: The string value of the item (<=255 characters)
iqlongstringvalue: The long string value of the item (> 255 characters)
iqintvalue: The integer value of the item.
iqfloatvalue: The float value of the item.
iqdatevalue: The date/time value of the item.
iqbytesvalue: The binary (blob) value of the item.
iqenumname: The enumerated-type value of the item.
Table-specific column descriptions (refinements on the above general
    scheme) appear below as comments within the table definition SQL
    script.
*/
/****** Object: Table dbo.t_config Script Date: Feb. 18, 1998 3:00:15
    PM ******/
/*
Configuration info for the Service Provider.
The "iqitem_id" column is unused in this table.
GROUPS DEFINED:
"general" - general purpose info. The only iqname value defined in this
    group is "playerName", whose iqstringvalue holds the player name
    ("AccountProvider" or "ServiceProvider").
"image" - each name represents a piece of incentive artwork, such as a
    button or incentive image.
"incCategory" - each name is a category name (i.e., "electronics",
    "music", etc.) and the iqstringvalue holds the member-visible name
    for that category (typically just correct capitalization, i.e.,
    "Electronics", "Music", etc.).
Finally, a group is created for each distributor (promotion agency) that
    edits incentives (e.g., "Joe's Promo Agency", "Promo's 'R Us"). The
    only iqname value in this group is "password", which holds the
    promotion author's password to use the Promotion Editor application.
*/
CREATE TABLE dbo.t_config (
    iqentry_id varchar (255) NOT NULL ,
    iqitem_id varchar (255) NULL ,
    iqgroup varchar (255) NULL ,
    iqname varchar (255) NOT NULL ,
    iqstringvalue varchar (255) NULL ,
    iqlongstringvalue text NULL ,
    iqintvalue int NULL ,
    iqfloatvalue float NULL ,
    iqdatevalue datetime NULL ,
    iqbytesvalue image NULL ,
    iqenumname varchar (255) NULL ,
    CONSTRAINT PK_t_config_03668867 PRIMARY KEY
    CLUSTERED
    (
        iqentry_id
    )
)
GO
CREATE INDEX IQCONFIGIDX ON dbo.t_config(iqgroup, iqname)
GO
/****** Object: Table dbo.t_inctmplt Script Date: Feb. 18, 1998 3:00:15
    PM ******/
/* Incentives.
The "iqitem_id" column in this table holds the unique incentive
    identification string.
Groups defined:
"general" - the only "name" value defined in this group is "iqitem_id".
    This one row has the iqbytesvalue holding the bytes of a JAVA
    serialization of an Incentive object.
*/
CREATE TABLE dbo.t_inctmplt (
    iqentry_id varchar (255) NOT NULL ,
    iqitem_id varchar (255) NULL ,
    iqgroup varchar (255) NULL ,
    iqname varchar (255) NOT NULL ,
    iqstringvalue varchar (255) NULL ,
    iqlongstringvalue text NULL ,
    iqintvalue int NULL ,
    iqfloatvalue float NULL ,
    iqdatevalue datetime NULL ,
    iqbytesvalue image NULL ,
    iqenumname varchar (255) NULL ,
    CONSTRAINT PK_t_inctmplt_091F61BD PRIMARY KEY
    CLUSTERED
    (
        iqentry_id
    )
)
GO
CREATE INDEX IQINCTMPLTIDX ON dbo.t_inctmplt(iqitem_id)
GO
/****** Object: Table dbo.t_inctrans Script Date: Feb. 18, 1998 3:00:15
    PM ******/
/*
The transaction history for each incentive (view, clips, redeems).
The "iqitem_id" column contains the incentive id string.
The "iqgroup" column is unused.
The "iqname" column always contains "inctrans".
The "iqbytesvalue" column contains the bytes of the JAVA serialization
    of an inctrans object.
*/
CREATE TABLE dbo.t_inctrans (
    iqentry_id varchar (255) NOT NULL ,
    iqitem_id varchar (255) NULL ,
    iqgroup varchar (255) NULL ,
    iqname varchar (255) NOT NULL ,
    iqstringvalue varchar (255) NULL ,
    iqlongstringvalue text NULL ,
    iqintvalue int NULL ,
    iqfloatvalue float NULL ,
    iqdatevalue datetime NULL ,
    iqbytesvalue image NULL ,
    iqenumname varchar (255) NULL ,
    CONSTRAINT PK_t_inctrans_14911469 PRIMARY KEY
    CLUSTERED
    (
        iqentry_id
    )
)
GO
CREATE INDEX IQINCTRANSIDX ON
dbo.t_inctrans(iqitem_id)
GO
/****** Object: Table dbo.t_log Script Date: Feb. 18, 1998 3:00:15 PM
    ******/
/* System logging information. */
CREATE TABLE dbo.t_log (
    iqentry_id varchar (255) NOT NULL , /* Unique id of the log entry. */
    iqdate datetime NOT NULL , /* The date/time of the log entry. */
    iqseverity int NOT NULL , /* Severity of the log entry. */
    iqmessage text NOT NULL , /* The human-readable message. */
    CONSTRAINT PK_t_log_1D265A6A PRIMARY KEY
    CLUSTERED
```

-continued

```
(
    iqentry_id
)
)
GO
/****** Object: Table dbo.t_promo Script Date: Feb. 18, 1998 3:00:15
    PM ******/
/* Promotions.
The "iqitem_id" column holds the unique promotion name.
Groups defined:
"general" - the only name value defined in this group is:
    "promo" - the iqbytesvalue column holds the bytes of a JAVA
    serialization of a Promotion object.
*/
CREATE TABLE dbo.t_promo (
    iqentry_id varchar (255) NOT NULL ,
    iqitem_id varchar (255) NULL ,
    iqgroup varchar (255) NULL ,
    iqname varchar (255) NOT NULL ,
    iqstringvalue varchar (255) NULL ,
    iqlongstringvalue text NULL ,
    iqintvalue int NULL ,
    iqfloatvalue float NULL ,
    iqdatevalue datetime NULL ,
    iqbytesvalue image NULL ,
    iqenumname varchar (255) NULL ,
    CONSTRAINT PK_t_promo_0BFBCE68 PRIMARY KEY
    CLUSTERED
    (
        iqentry_id
    )
)
GO
CREATE INDEX IQPROMOIDX ON dbo.t_promo(iqitem_id)
GO
```

What is claimed is:

1. A method for distributing incentives residing on an incentive information computer over a network, the incentive information computer connected to the network and coupled to an incentive database containing the incentives, each incentive having a set of parameters of the incentive, the set of parameters including a value, the value based on meeting a set of one or more match criteria, the method comprising the steps of:

for a particular incentive,
    publishing a selecting mechanism for the particular incentive, the publishing at one or more locations of the network.

2. The method of claim 1, wherein the selecting mechanism for the incentive includes a reference to the whereabouts of one or more parameters of the particular incentive on the network.

3. The method of claim 1, wherein at least one of the locations is a Web page.

4. The method of claim 1, wherein the selecting mechanism is programmed to select the particular incentive depending on one or more characteristics of the consumer.

5. The method of claim 1, wherein the set of parameters of the particular incentive comprises an incentive existence message and wherein the selecting mechanism for the particular incentive selects the incentive existence message of the particular incentive.

6. The method of claim 5, wherein the selecting mechanism for the particular incentive includes the incentive existence message of the particular incentive.

7. The method of claim 1, wherein the value is based on applying an incentive formula.

8. The method of claim 1, further comprising:
    a consumer computer accessing one of the locations where the selecting mechanism of the particular incentive exists, the consumer computer able to be connected to the network, the consumer computer operable by a consumer, and the consumer computer including a display device for communicating information to the consumer; and displaying a first set of one or more parameters of the particular incentive on the consumer computer when the consumer computer accesses one of the locations containing the selecting mechanism of the particular incentive.

9. The method of claim 8, wherein the set of parameters of the particular incentive comprises an incentive existence massage and wherein the displayed first set of parameters includes the incentive existence message.

10. The method of claim 8, wherein at least one parameter of the particular incentive is dependent on one or more characteristics of the consumer.

11. The method of claim 8, wherein the selecting mechanism for the incentive existence message includes means for the consumer to interact with the selecting mechanism, and the displaying occurs in response to the consumer interacting with the interacting means of the selecting mechanism.

12. The method according to claim 1, wherein the network is the Internet.

13. A system for distributing and redeeming incentives, each incentive having a set of parameters of the incentive, the set of parameters including a value of the incentive, the value based on meeting a set of one or more match criteria, the system comprising:

an incentive information computer, the incentive information computer connected to a network;

an incentive database containing the incentives, the incentive database coupled to the incentive information computer;

means for creating a particular incentive in the incentive database, the means for creating including means for entering the data defining the set of parameters of the particular incentive in the incentive database;

means for publishing the particular incentive on the network, the publishing comprising publishing a selecting mechanism for the particular incentive at one or more locations, of the network;

a consumer computer operable by a consumer, the consumer computer able to be connected to the network and including a display device for presenting information to the consumer;

means for displaying a first set of one or more parameters of the particular incentive when the consumer accesses one of the locations containing the selection mechanism of the particular incentive.

14. The system according to claim 13, wherein the selection mechanism comprises a reference to at least one parameter of the particular incentive.

15. The system according to claim 13, wherein the network is the Internet and wherein at least one of the locations is a Web page.

16. The system according to claim 13, wherein at least one of the locations is an e-mail message.

17. The system according to claim 13, wherein the set of parameters further comprises one or more of a visual representation, an associated product/service, pointers to related incentives, and pointers to related products/services.

18. The system according to claim 13, wherein the creating means and the publishing means are connected to the network.

19. The system according to claim 13, wherein the selecting mechanism is programmed to cause the display of the first set of parameters automatically upon the consumer accessing one of the locations that include the selecting mechanism.

20. The system according to claim 13, wherein the selecting mechanism includes consumer activation means, and wherein the selecting mechanism is programmed to cause the display of the first set of parameters to occur upon the consumer activating the consumer activation means.

21. The system according to claim 13, wherein the set of parameters of the particular incentive includes an incentive existence message and wherein one parameter of the displayed first set includes the incentive existence message.

22. The system according to claim 13, further comprising:
a member information computer connected to the network;
a member database coupled to the member information computer, the member database including member information on consumers, the member information including member identification information;
a consumer computer operable by a particular consumer and coupled to the network;
an identification means for the particular consumer to be identified to the system by transmitting identification information over the network from the consumer computer to the member information computer; and
joining means for the particular consumer to be added to the member database by transmitting joining information over the network from the consumer computer to the member information computer.

23. The system according to claim 22, wherein the joining means comprises means for storing referral data about the consumer in the consumer computer, and wherein the identification means accesses the referral data to determine the identification information for transmission over the network.

24. The system according to claim 22, wherein the joining means comprises means for the particular consumer to voluntarily be added to the member database.

25. The system according to claim 22, wherein the joining means comprises means for the particular consumer to be automatically and involuntarily added to the member database as a result of some action by the consumer.

26. The system according to claim 13, wherein one parameter of the displayed first set is the incentive value.

27. The system according to claim 13, wherein at least one parameter of the displayed first set depends on at least one characteristic of the consumer including a member of the set consisting of the present time, the present date, and the location accessed by the consumer computer where the selecting mechanism for the particular incentive exists.

28. The system according to claim 27, further comprising:
a member information computer connected to the network;
a member database coupled to the member information computer, the member database including member information on consumers, the member information including member identification information;
a consumer computer operable by a particular consumer and coupled to the network;
an identification means for the consumer to be identified to the system as a member by transmitting identification information over the network from the consumer computer to the member information computer; and
joining means for the particular consumer to be added to the member database by transmitting joining information over the network from the consumer computer to the member information computer.

29. The system according to claim 28, wherein the at least one parameter of the displayed first set also depends on one or more of the set consisting of demographics of the member, a purchasing history of the member, known preferences of the member, credit history of the member, previous incentives displayed to the member, and previous incentives clipped by the member.

30. The system according to claim 27, wherein at least one parameter of the displayed first set also depends on one or more of the set consisting of the number of responses to-date to the particular incentive, and, in the case that the set of incentive parameters of the particular incentive include an associate goods/service that has an inventory value, the inventory value of the associated goods/service, the system further comprising:
means for storing responses to the particular incentive in the incentive database.

31. The system according to claim 13, wherein one parameter of the displayed first set comprises means for interacting.

32. The system according to claim 31, further including means for recording interaction occurrence information on any interaction by the consumer with the interacting means.

33. The system according to claim 32, wherein the consumer is a member by having consumer identification data stored in a member database coupled to a member information computer, the member information computer connected to the network, wherein the interaction occurrence information recording means records the identification of the member, and one or more of set consisting of the location on the network where the first set was displayed, the present time, and the present date, the recording being in the incentive database.

34. The system according to claim 31, wherein the parameter that includes the responding means is an incentive existence message.

35. The system according to claim 34, wherein at least one characteristic of the incentive existence message is dependent on one or more characteristics of the consumer.

36. The system according to claim 35, wherein one of the consumer characteristics on which the at least one message characteristic is dependent is the location accessed by the consumer computer where the selecting mechanism of the particular incentive exists.

37. The system according to claim 13, further comprising: means for modifying at least one parameter of the incentive in the incentive database as a result of displaying the first set of one or more parameters of the particular incentive.

38. The system according to claim 22, further comprising:
clipping means for the consumer to clip the particular incentive, the clipping means including means for storing incentive instance information about the particular incentive in the member database.

39. The system according to claim 38, wherein the clipping means comprises means for saving clipping information in the incentive database, the clipping information including the identification of the consumer, and the incentive instance information comprising an indicator of the value of the incentive, and one or more of the set consisting of other characteristics of the consumer, the present time, and the present date.

40. The system according to claim 39, the system further comprising:
means for transmitting targeted information about the incentive to the member, the targeted information including one or more of the set consisting of: information that the incentive may soon expire, information that the incentive's value has changed, information on related incentives, and information that there are related incentives new since the last clipping.

41. The system according to claim 39, wherein the means for transmission comprises one or more of the set consisting of means for sending e-mail, means for making a telephone call, means for sending postal mail, means for programming selection mechanisms on particular locations to display targeted information whenever the consumer is displayed an incentive, and means for displaying the targeted information whenever the member clips an incentive.

42. The system according to claim 38, further comprising:
redemption means for the member to redeem the clipped particular incentive.

43. The system according to claim 42, further comprising: means for the modifying one or more parameters of the incentive in the incentive database as a result of a consumer redeeming the incentive.

44. The system of claim 42, further comprising:
means for online redemption, the online redemption means connected to the network;
wherein the match criteria of the particular incentive may be met by online matching at a redemption location, and wherein the online redemption means is automatically activated upon the consumer meeting the match criteria at the online redemption location.

45. The system of claim 44, wherein the match criteria for the particular incentive comprises purchase of associated goods/services, and wherein redemption means includes means for matching a basket of goods and services to the set of clipped incentives stored for the member in the member database and means for applying the incentives to the basket of goods and services.

46. The system according to claim 42, further comprising:
means for online purchase of goods and services, the online purchase means connected to the network;
wherein the redemption means includes activating means for matching a basket of goods and services to set of clipped incentives stored for the member in the member database, and for applying the clipped incentive incentives to the basket of goods and services, the activating means matching and applying at the request of the member.

47. The system according to claim 38, further comprising:
means for the modifying one or more parameters of the incentive in the incentive database as a result of a member clipping the incentive.

48. The system according to claim 22, the system further comprising:
means for transmitting targeted information about incentives in the incentive database to the member.

49. The system according to claim 48, wherein the means for transmission comprises one or more of the set consisting of means for sending e-mail, means for making a telephone call, means for sending postal mail, means for programming selection mechanisms on particular locations.

50. The system according to claim 22, further comprising:
means for a consumer to reject an incentive, the rejecting including storing rejection information about the rejecting in one or more of the incentive database and the member database.

51. A method for presenting incentives residing on an incentive information computer, the incentive information computer connected to a network and coupled to an incentive database containing the incentives, each incentive having a set of parameters of the incentive, the set of parameters including a value, the value based on meeting a set of one or more match criteria, the method comprising the steps of:
for any particular incentive,
displaying a first set of one or more parameters of the particular incentive on a consumer computer, the consumer computer operable by a consumer and connected to the network at a particular location where at least one parameter of the particular incentive is published on the network, the consumer computer comprising a display device for communicating information to the consumer, the displaying being on the display device,
wherein at least one parameter of the particular incentive is dependent on one or more characteristics of the consumer, wherein the set of parameters of the particular incentive comprises an incentive existence message published at the particular location, and wherein one parameter of the displayed first set of incentive parameters is the incentive existence message,
wherein at least one characteristic of the incentive existence message is dependent on one or more characteristics of the consumer; and
wherein the incentive existence message includes an incentive icon having audiovisual characteristics and wherein at least some of the audiovisual characteristics of the incentive icon are dependent on one or more characteristics of the consumer.

52. A method for presenting incentives residing on an incentive information computer, the incentive information computer connected to a network and coupled to an incentive database containing the incentives, each incentive having a set of parameters of the incentive, the set of parameters including a value, the value based on meeting a set of one or more match criteria, the method comprising the steps of:
for any particular incentive,
displaying a first set of one or more parameters of the particular incentive on a consumer computer, the consumer computer operable by a consumer and connected to the network at a particular location where at least one parameter of the particular incentive is published on the network, the consumer computer comprising a display device for communicating information to the consumer, the displaying being on the display device;
transmitting consumer identification data via the network to a member information computer connected to the network; and
storing consumer identification data of the consumer in a member database coupled to a member information computer, the member information computer connected to the network,
wherein at least one parameter of the particular incentive is dependent on one or more characteristics of the consumer.

53. The method of claim 52, further comprising:
recording the occurrence information about displaying the first set of incentive parameters to the member.

54. The method of claim 53, wherein the occurrence information comprises a member identifier and the recording includes recording the occurrence information in the incentive database.

55. The method of claim 52, further comprising:
storing referral data about the consumer in the consumer computer, the referral data enabling rapid identification of the consumer.

56. The method of claim 16, wherein the one or more characteristics of the consumer on which the at least one parameter of the particular incentive is dependent includes one or more of the set consisting of consumer identification, any demographics of the consumer stored in the member database, any purchasing history of the consumer stored in the member database, the particular location on the network, the present time, and the present date.

57. A method for presenting incentives residing on an incentive information computer, the incentive information computer connected to a network and coupled to an incentive database containing the incentives, each incentive having a set of parameters of the incentive, the set of parameters including a value, the value based on meeting a set of one or more match criteria, the method comprising the steps of:

for any particular incentive,
displaying a first set of one or more parameters of the particular incentive on a consumer computer, the consumer computer operable by a consumer and connected to the network at a particular location on the network, the consumer computer comprising a display device for communicating information to the consumer, the displaying on the display device, wherein at least one parameter of the particular incentive is dependent on one or more characteristics of the consumer, wherein the set of parameters of the particular incentive comprises an incentive existence message and wherein one parameter of the displayed first set of incentive parameters is the incentive existence message, and wherein the incentive existence message includes interaction means for the consumer to interact with the particular incentive and wherein the displaying of the second set of parameters is in response to the consumer interacting with the interaction means, the method further comprising:
displaying a second set of one or more of the parameters of the particular incentive on the display device of the consumer computer.

58. A method for presenting incentives residing on an incentive information computer, the incentive information computer connected to a network and coupled to an incentive database containing the incentives, each incentive having a set of parameters of the incentive, the set of parameters including a value, the value based on meeting a set of one or more match criteria, the method comprising the steps of:

for any particular incentive,
displaying a first set of one or more parameters of the particular incentive on a consumer computer, the consumer computer operable by a consumer and connected to the network at a particular location on the network, the consumer computer comprising a display device for communicating information to the consumer, the displaying on the display device, wherein at least one parameter of the particular incentive is dependent on one or more characteristics of the consumer, and wherein the displayed first set of parameters comprises interaction means for the consumer to interact with the particular incentive, the method further comprising:
transmitting consumer identification data via the network to a member information computer connected to the network;
storing consumer identification data of the consumer in a member database coupled to a member information computer, the member information computer connected to the network; and
recording the interaction occurrence information about any interactions by the consumer with the interaction means.

59. The method of claim 57, wherein the consumer interaction causes a new display window to appear on the display device and the displaying of the second set of parameters occurs in the new display window.

60. The method of claim 23, wherein the displayed second set of parameters includes additional interaction means for the consumer to interact with the incentive.

61. The method of claim 57, further comprising:
the consumer negotiating one or more of the incentive parameters displayed; and
modifying the negotiated one of more incentive parameters as a result of the negotiating.

62. The method of claim 57, wherein at least one parameter of the displayed second set of incentive parameters depends on one or more of the set consisting of the present time, the present date, and the particular location on the network.

63. The method of claim 57, wherein the displayed second set of parameters includes the incentive value, the method further comprising:
the consumer negotiating the incentive value; and
modifying the incentive value as a result of the negotiating.

64. A method for presenting incentives residing on an incentive information computer, the incentive information computer connected to a network and coupled to an incentive database containing the incentives, each incentive having a set of parameters of the incentive, the set of parameters including a value, the value based on meeting a set of one or more match criteria, the method comprising the steps of:

for any particular incentive,
displaying a first set of one or more parameters of the particular incentive on a consumer computer, the consumer computer operable by a consumer and connected to the network at a particular location on the network, the consumer computer comprising a display device for communicating information to the consumer, the displaying on the display device, wherein at least one parameter of the particular incentive is dependent on one or more characteristics of the consumer, and wherein the set of parameters of the particular incentive comprises an incentive existence message and wherein one parameter of the displayed first set of incentive parameters is the incentive existence message, the method further comprising:
the consumer entering consumer identification data at the consumer computer;
transmitting the consumer identification data via the network to a member information computer connected to the network; and
storing the consumer identification data in a member database coupled to the member information computer.

65. The method of claim 64, further comprising:
storing referral data about the consumer in the consumer computer, the referral data enabling rapid identification of the consumer.

66. The method of claim 64, further comprising:
periodically transmitting targeted information to the consumer about incentives in the incentive database.

67. The method of claim 66, wherein the transmitting is by one or more of email, telephone, postal mail, and placement of information at one or more locations one the network.

68. The method of claim 57, wherein at least one parameter of the displayed second set of parameters depends on one or more characteristics of the consumer, the method further comprising:

transmitting consumer identification data via the network to a member information computer connected to the network; and storing the consumer identification data in a member database coupled to the member information computer.

69. The method of claim 68, further comprising:

the consumer entering at least some of the consumer identification data at the consumer computer.

70. The method of claim 68, wherein the one or more characteristics of the consumer on which the displayed second set depends includes one or more of the consumer identification, the consumer demographics, the consumer purchasing history, the particular location accessed by the consumer computer where the selecting mechanism of the particular incentive exists, the present time, and the present date.

71. A method for presenting incentives residing on an incentive information computer, the incentive information computer connected to a network and coupled to an incentive database containing the incentives, each incentive having a set of parameters of the incentive, the set of parameters including a value, the value based on meeting a set of one or more match criteria, the method comprising the steps of:

for any particular incentive, displaying a first set of one or more parameters of the particular incentive on a consumer computer, the consumer computer operable by a consumer and connected to the network at a particular location where at least one parameter of the particular incentive is published on the network, the consumer computer comprising a display device for communicating information to the consumer, the displaying being on the display device;

wherein at least one parameter of the particular incentive is dependent on one or more characteristics of the consumer and wherein at least one parameter of the displayed first set of incentive parameters includes means for clipping the particular incentive, the method further comprising:

transmitting consumer identification data via the network to a member information computer connected to the network;

storing the consumer identification data in a member database coupled to the member information computer; and the consumer clipping the incentive by interacting with the means for clipping, the clipping leading to storing of clipping information about the clipped incentive in the member.

72. The method of claim 57, wherein at least one parameter of the displayed second set of incentive parameters includes means for clipping the particular incentive, the method further comprising:

transmitting consumer identification data via the network to a member information computer connected to the network;

storing the consumer identification data in a member database coupled to the member information computer; and the consumer clipping the incentive by interacting with the means for clipping, the clipping leading to storing of clipping information about the clipped incentive in the member database.

73. The method of claim 72, further comprising:

storing clipping instance information in the incentive database, the clipping instance information includes the present date, an indicator of the present value of the incentive, and one or more characteristics of the consumer, the consumer characteristics in the clipping instance information including the consumer identification.

74. The method of claim 73, further comprising:

periodically transmitting targeted information to the consumer related to incentives previously clipped by the consumer.

75. The method of claim 74, wherein the transmitting is by one or more of email, telephone, postal mail, and placement of information in one or more locations on the network.

76. The method of claim 74, wherein the targeted information related to a specific clipped incentive includes one or more of information that the specific clipped incentive is soon to expire, information that the value for the specific clipped incentive has changed for the consumer, and information on the existence of new related incentives.

77. The method of claim 72, further comprising:

displaying on the consumer computer one or more parameters of one or more valid incentives previously clipped by the consumer.

78. The method of claim 72, further comprising:

the consumer redeeming the clipped incentive.

79. The method of claim 78, wherein the set of parameters of the incentive includes an online point of redemption for redeeming the particular incentive, the online point of redemption connected to the network, the redeeming comprising causing a redemption display to appear on the consumer computer enabling the consumer to redeem the value at the online point of redemption upon meeting the match criteria.

80. The method of claim 79, wherein redemption display appears on a separate redemption window on the consumer computer display.

81. The method of claim 57, further comprising:

the consumer redeeming the particular incentive.

82. The method of claim 81, wherein the set of parameters of the incentive includes an online point of redemption for redeeming the incentive, the online point of redemption connected to the network, the redeeming comprising causing a redemption display to appear on the consumer computer enabling the consumer to redeem the value at the online point of redemption upon meeting the match criteria.

83. The method of claim 82, wherein redemption display appears on a separate redemption window on the consumer computer display.

84. A network-based incentive system for operation in a network, comprising:

at least one consumer computer able to be connected to the network and for operation by a consumer;

an incentive information computer connected to the network;

an incentive database containing a set of parameters describing an incentive, the incentive having a value based on applying an incentive formula, the incentive database coupled to the incentive information computer;

a consumer information computer connected to the network; and a member database containing information on one or more members, the member database coupled to the consumer information computer, wherein the consumer computer is programmed to display an incentive existence message indicating the existence of the incentive in the incentive system when the consumer computer is connected to one of a set of one or more locations on the network, the incentive existence message published at the one or more locations.

* * * * *